(12) United States Patent
Geng et al.

(10) Patent No.: US 11,372,247 B2
(45) Date of Patent: Jun. 28, 2022

(54) DISPLAY DEVICE WITH DIFFUSIVE DISPLAY AND SEE-THROUGH LENS ASSEMBLY

(71) Applicant: Facebook Technologies, LLC, Menlo Park, CA (US)

(72) Inventors: Ying Geng, Bellevue, WA (US); Brian Wheelwright, Sammamish, WA (US); Jacques Gollier, Sammamish, WA (US); Yusufu Njoni Bamaxam Sulai, Snohomish, WA (US); Babak Amirsolaimani, Redmond, WA (US); Weichuan Gao, Redmond, WA (US); Gang Li, Bothell, WA (US); Mengfei Wang, Seattle, WA (US); Adrian Travis, Paris (FR)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/810,494

(22) Filed: Mar. 5, 2020

(65) Prior Publication Data

US 2021/0080726 A1    Mar. 18, 2021

Related U.S. Application Data

(60) Provisional application No. 62/901,706, filed on Sep. 17, 2019.

(51) Int. Cl.
*G02B 27/01* (2006.01)
*G02B 3/08* (2006.01)
(Continued)

(52) U.S. Cl.
CPC ........... *G02B 27/0172* (2013.01); *G02B 3/08* (2013.01); *G02B 5/0289* (2013.01);
(Continued)

(58) Field of Classification Search
CPC ............... G02B 27/0172; G02B 27/10; G02B 27/0176; G02B 27/106; G02B 27/283;
(Continued)

(56) References Cited

U.S. PATENT DOCUMENTS 6,075,651 A    6/2000 Hoppe
6,094,242 A    7/2000 Yamanaka
(Continued)

FOREIGN PATENT DOCUMENTS

FR    2690534 A1    10/1993
GB    2384059 A    7/2003
(Continued)

OTHER PUBLICATIONS

Aye et al., "Compact HMD opics based on multiplexed aberration-compensated hologrphic optical elements," Proceedings of SPIE, Event: Aerospace/Defense Sensing, Simulation, and Controls, 2001, Orlando, FL, 10 pgs.
(Continued)

*Primary Examiner* — David D Davis
(74) *Attorney, Agent, or Firm* — Morgan, Lewis & Bockius LLP

(57) ABSTRACT

A display device includes a projector and a display that has a first surface and a second surface. The projector is configured to project image light toward the display. The display is configured to output diffused image light from the first surface and to transmit ambient light from the second surface to the first surface. The display device also includes an optical assembly that has a substrate with substantially uniform thickness. The optical assembly is configured to receive the diffused image light and transmit a portion of the diffused image light output from the first surface of the display at a first optical power. The optical assembly is also configured to receive the ambient light and transmit a
(Continued)

portion of the ambient light through the optical assembly at a second optical power that is less than the first optical power.

18 Claims, 60 Drawing Sheets

(51) Int. Cl.
| | |
|---|---|
| *G02B 5/02* | (2006.01) |
| *H04N 9/31* | (2006.01) |
| *G02B 5/18* | (2006.01) |
| *G02B 5/30* | (2006.01) |
| *G02B 27/10* | (2006.01) |
| *G02B 27/28* | (2006.01) |
| *G02F 1/1334* | (2006.01) |
| *G02F 1/137* | (2006.01) |

(52) U.S. Cl.
CPC ......... *G02B 5/1819* (2013.01); *G02B 5/3025* (2013.01); *G02B 27/0176* (2013.01); *G02B 27/10* (2013.01); *G02B 27/106* (2013.01); *G02B 27/283* (2013.01); *G02F 1/137* (2013.01); *G02F 1/1334* (2013.01); *H04N 9/3152* (2013.01); *G02B 2027/0178* (2013.01); *G02B 2027/0187* (2013.01); *G02F 1/13345* (2021.01)

(58) Field of Classification Search
CPC .. G02B 5/1819; G02B 5/3025; G02B 5/0289; G02B 3/08; G02B 2027/0187; G02B 2027/0178; G02B 2027/0118; G02B 2027/0174; G02B 5/3041; G02F 1/1334; G02F 1/137; G02F 1/13345; H04N 9/3152
See application file for complete search history.

(56) References Cited

U.S. PATENT DOCUMENTS

| | | | |
|---|---|---|---|
| 6,373,603 B1 | 4/2002 | Popovich et al. | |
| 6,563,638 B2 | 5/2003 | King et al. | |
| 7,573,640 B2 | 8/2009 | Nivon et al. | |
| 7,946,708 B2 | 5/2011 | Sakata et al. | |
| 8,305,690 B2 | 11/2012 | Ruhle et al. | |
| 8,570,656 B1 | 10/2013 | Weissman | |
| 8,698,713 B2 | 4/2014 | Hajjar et al. | |
| 8,724,206 B2 | 5/2014 | Spitzer et al. | |
| 8,941,559 B2 | 1/2015 | Bar-Zeev et al. | |
| 8,964,298 B2 | 2/2015 | Haddick et al. | |
| 9,087,471 B2 | 7/2015 | Miao | |
| 9,251,745 B2 | 2/2016 | Sprague | |
| 9,507,066 B2 | 11/2016 | Kollin et al. | |
| 9,519,084 B1 | 12/2016 | Thomas | |
| 9,557,568 B1 | 1/2017 | Ouderkirk et al. | |
| 10,095,036 B2 | 10/2018 | Carollo et al. | |
| 10,274,805 B2 | 4/2019 | Tabirian et al. | |
| 10,429,647 B2 | 10/2019 | Gollier et al. | |
| 10,495,798 B1 | 12/2019 | Peng et al. | |
| 10,578,873 B2 | 3/2020 | Lee et al. | |
| 10,634,907 B1 | 4/2020 | Geng et al. | |
| 10,663,745 B2 | 5/2020 | Ouderkirk et al. | |
| 10,976,551 B2 | 4/2021 | Cobb | |
| 10,996,466 B2 | 5/2021 | Amirsolaimani et al. | |
| 11,002,970 B2 | 5/2021 | Martinez et al. | |
| 11,022,803 B2 | 6/2021 | Lee | |
| 11,054,648 B2 | 7/2021 | Carollo et al. | |
| 11,067,810 B2 | 7/2021 | Yonekubo et al. | |
| 11,086,127 B2 | 8/2021 | Nishiyama et al. | |
| 11,269,123 B2 | 3/2022 | Sharp et al. | |
| 2004/0108971 A1 | 6/2004 | Waldern et al. | |
| 2004/0109208 A1 | 6/2004 | Amanai et al. | |
| 2006/0221448 A1 | 10/2006 | Nivon et al. | |
| 2010/0053121 A1 | 3/2010 | Sprague | |
| 2011/0096100 A1 | 4/2011 | Sprague | |
| 2013/0101253 A1 | 4/2013 | Popovich et al. | |
| 2013/0314793 A1 | 11/2013 | Robbins et al. | |
| 2014/0168034 A1 | 6/2014 | Luebke et al. | |
| 2014/0268879 A1* | 9/2014 | Mizuyama | G02B 6/005 362/618 |
| 2015/0235460 A1 | 8/2015 | SchoWengerdt et al. | |
| 2015/0378074 A1* | 12/2015 | Kollin | G02B 5/3016 349/185 |
| 2016/0026253 A1 | 1/2016 | Bradski et al. | |
| 2016/0363777 A1 | 12/2016 | Flynn et al. | |
| 2017/0016594 A1* | 1/2017 | Di Trapani | G02B 5/0242 |
| 2017/0068102 A1 | 3/2017 | Wong et al. | |
| 2017/0153454 A1 | 6/2017 | Callier et al. | |
| 2017/0255015 A1* | 9/2017 | Geng | G02B 6/0005 |
| 2017/0285347 A1 | 10/2017 | Cai et al. | |
| 2017/0293148 A1 | 10/2017 | Park et al. | |
| 2017/0336552 A1 | 11/2017 | Masuda et al. | |
| 2018/0029319 A1* | 2/2018 | Kalima | B29C 41/22 |
| 2018/0107007 A1 | 4/2018 | Wyrwas et al. | |
| 2018/0172988 A1* | 6/2018 | Ahmed | H01L 33/58 |
| 2018/0180788 A1 | 6/2018 | Ambur et al. | |
| 2018/0239147 A1 | 8/2018 | Schowengerdt et al. | |
| 2018/0267222 A1 | 9/2018 | Ambur et al. | |
| 2019/0018480 A1 | 1/2019 | Aleem et al. | |
| 2019/0018481 A1 | 1/2019 | Aleem et al. | |
| 2019/0025602 A1 | 1/2019 | Qin et al. | |
| 2019/0041642 A1 | 2/2019 | Haddick et al. | |
| 2019/0060602 A1 | 2/2019 | Tran et al. | |
| 2019/0072767 A1 | 3/2019 | Vallius et al. | |
| 2019/0094549 A1 | 3/2019 | Nicholson et al. | |
| 2019/0235235 A1 | 8/2019 | Ouderkirk et al. | |
| 2019/0265477 A1 | 8/2019 | Perreault et al. | |
| 2019/0353906 A1 | 11/2019 | Gollier et al. | |
| 2019/0369403 A1 | 12/2019 | Leister | |
| 2020/0050008 A1 | 2/2020 | Seo et al. | |
| 2020/0089002 A1 | 3/2020 | Lee | |
| 2020/0096816 A1 | 3/2020 | Lee et al. | |
| 2020/0124858 A1 | 4/2020 | Cakmakci | |
| 2020/0133005 A1 | 4/2020 | Yonekubo et al. | |
| 2020/0133017 A1 | 4/2020 | Ide | |
| 2020/0249480 A1 | 8/2020 | Martinez et al. | |
| 2020/0348530 A1 | 11/2020 | Xiao et al. | |
| 2020/0379226 A1 | 12/2020 | Steiner et al. | |
| 2021/0080726 A1* | 3/2021 | Geng | G02B 5/3041 |
| 2021/0271082 A1 | 9/2021 | Smith et al. | |
| 2021/0278679 A1 | 9/2021 | Ouderkirk et al. | |
| 2021/0286183 A1 | 9/2021 | Ouderkirk et al. | |
| 2021/0294012 A1 | 9/2021 | Wong et al. | |

FOREIGN PATENT DOCUMENTS

| | | |
|---|---|---|
| WO | WO-2018221867 A1 | 12/2018 |
| WO | WO2019/104046 A1 | 5/2019 |

OTHER PUBLICATIONS

LaRussa et al., "The Holographic Pancake Window," Proceedings of SPIE 1978, Event: 22nd Annual Technical Symposium, 1978, San Diego, 11 pgs.

Margarinos et al., "Wide Angle, Color, Hologrpahic Infinity Optics Display—Final Report," Farrand Optical Co., Valhalla, NY, Rort No. AFHRL-TR-80-53, Mar. 1981, downloaded from https://files.eric.ed.gov/fulltext/ED202467.pdf, 93 pgs.

Facebook Technologies, LLC, International Search Report and Written Opinion, PCT/US2020/050782, dated Mar. 9, 2021, 16 pgs.

Geng, Office Action, U.S. Appl. No. 16/810,445, dated Oct. 26, 2020, 11 pgs.

Geng, Notice of Allowance, U.S. Appl. No. 16/810,445, dated Jan. 27, 2021, 9 pgs.

Geng, Quayle Office Action, U.S. Appl. No. 16/810,417, dated Dec. 1, 2020, 9 pgs.

Geng, Notice of Allowance, U.S. Appl. No. 16/810,417, dated Jan. 12, 2021, 6 pgs.

(56) References Cited

OTHER PUBLICATIONS

International Search Report and Written Opinion for International Application No. PCT/US2020/050776, dated Mar. 15, 2021, 23 Pages.
International Search Report and Written Opinion for International Application No. PCT/US2021/013968, dated Jun. 30, 2021, 13 pages.
Invitation to Pay Additional Fees for International Application No. PCT/US2021/013968, dated May 7, 2021, 9 pages.
Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.
Non-Final Office Action dated Sep. 3, 2021 for U.S. Appl. No. 16/810,471, filed Mar. 5, 2020, 21 pages.
Notice of Allowance dated Mar. 19, 2021 for U.S. Appl. No. 16/810,485, filed Mar. 5, 2020, 12 pages.
Non-Final Office Action dated Oct. 7, 2021 for U.S. Appl. No. 16/782,604, filed Feb. 5, 2020, 17 Pages.
Non-Final Office Action dated Oct. 7, 2021 for U.S. Appl. No. 16/784,718, filed Feb. 7, 2020, 14 Pages.
Non-Final Office Action dated Jul. 29, 2021 for U.S. Appl. No. 16/810,431, filed Mar. 5, 2020, 12 Pages.
Final Office Action dated Nov. 15, 2021 for U.S. Appl. No. 16/810,431, filed Mar. 5, 2020, 14 pages.
Final Office Action dated Feb. 4, 2022 for U.S. Appl. No. 16/810,458, filed Mar. 5, 2020, 20 pages.
Non-Final Office Action dated Feb. 2, 2022 for U.S. Appl. No. 17/241,921, filed Apr. 27, 2021, 7 pages.
Non-Final Office Action dated Feb. 9, 2022 for U.S. Appl. No. 16/532,311, filed Aug. 5, 2019, 10 pages.
Notice of Allowance dated Feb. 8, 2022 for U.S. Appl. No. 16/782,604, filed Feb. 5, 2020, 9 pages.
Notice of Allowance dated Feb. 8, 2022 for U.S. Appl. No. 16/784,718, filed Feb. 7, 2020, 9 pages.
Final Office Action dated Apr. 21, 2022 for U.S. Appl. No. 16/810,471, filed Mar. 5, 2020, 24 pages.
International Preliminary Report on Patentability for International Application No. PCT/US2020/050776, dated Mar. 31, 2022, 18 pages.
International Preliminary Report on Patentability for International Application No. PCT/US2020/050782, dated Mar. 31, 2022, 12 pages.
Non—Final Office Action dated Mar. 23, 2022 for U.S. Appl. No. 16/848,652, filed Apr. 14, 2020, 13 pages.
Notice of Allowance dated Apr. 15, 2022 for U.S. Appl. No. 16/810,431, filed Mar. 5, 2020, 10 pages.

* cited by examiner

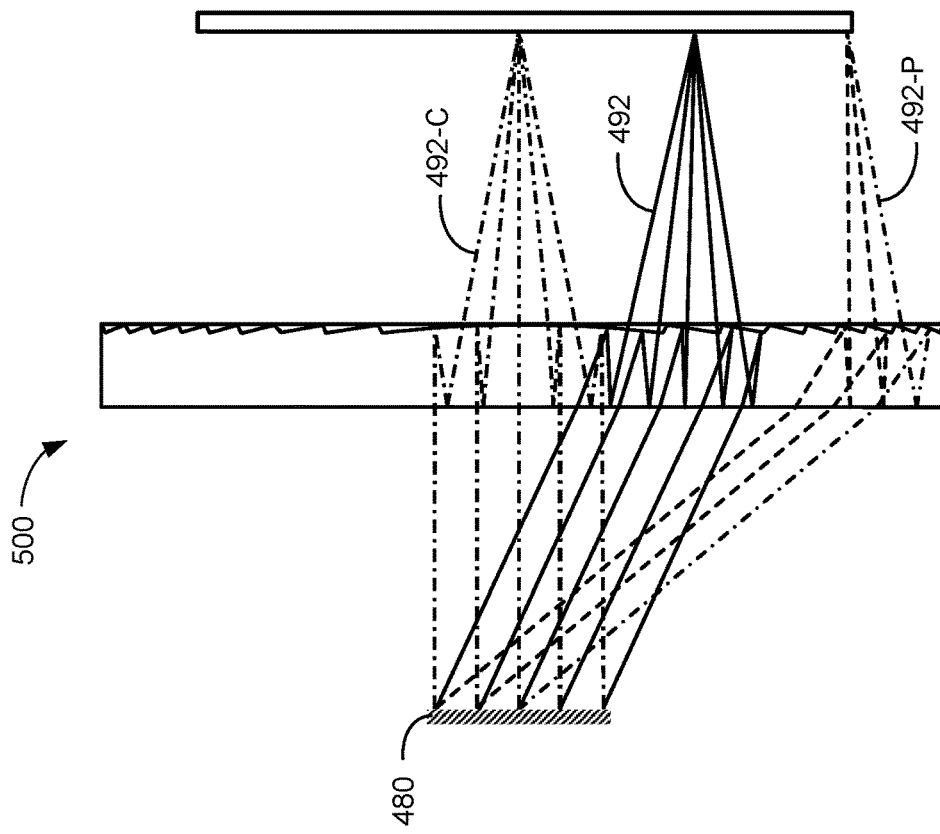
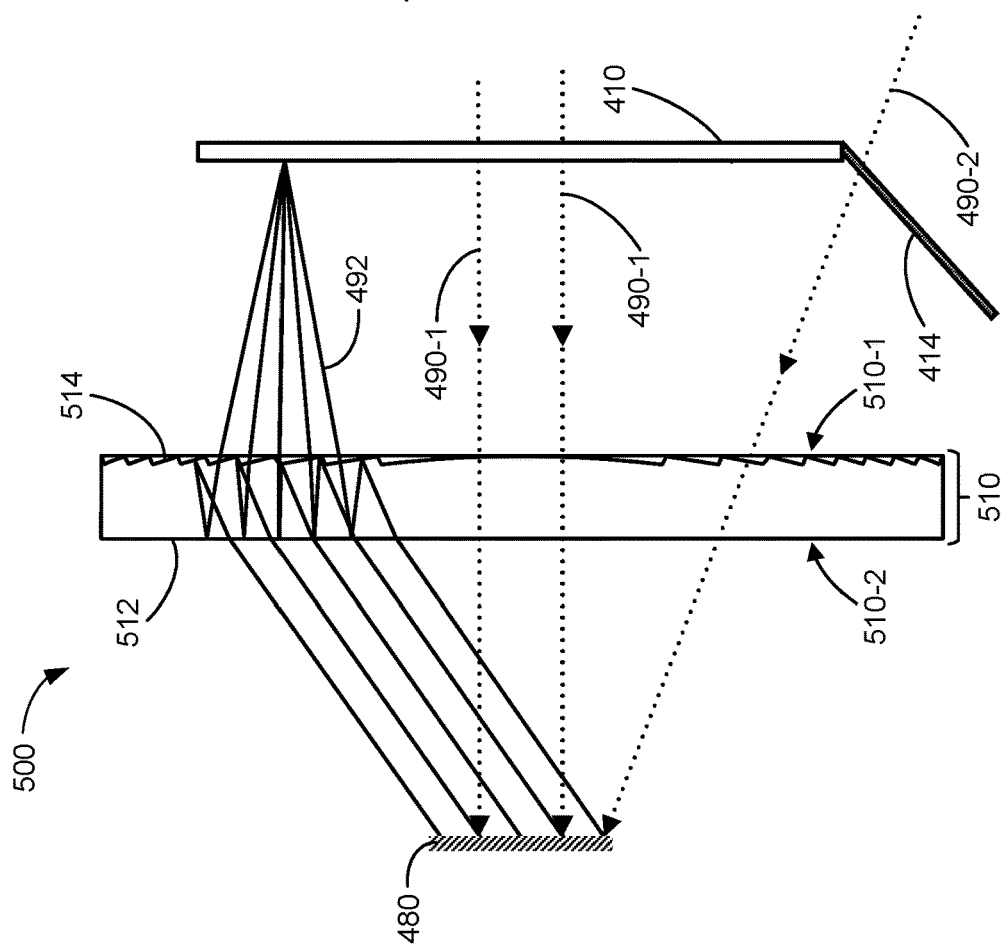
Figure 5B
Figure 5A

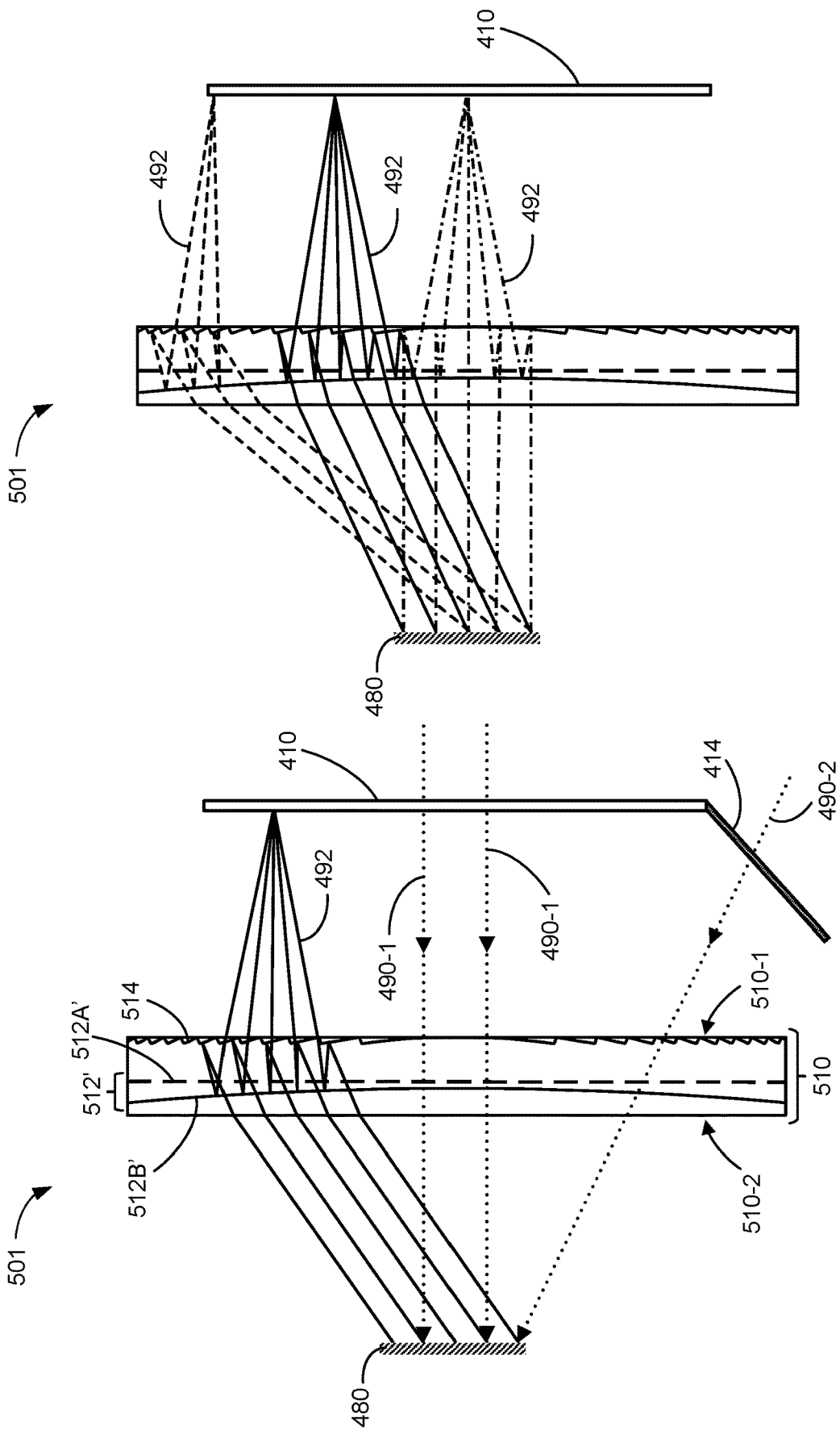

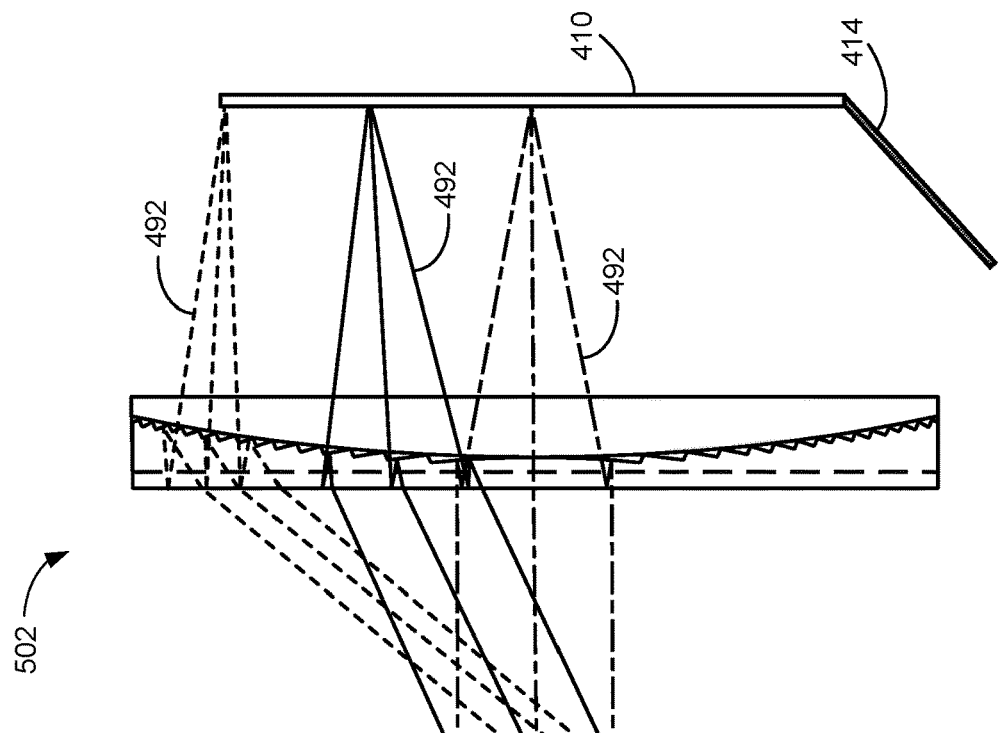
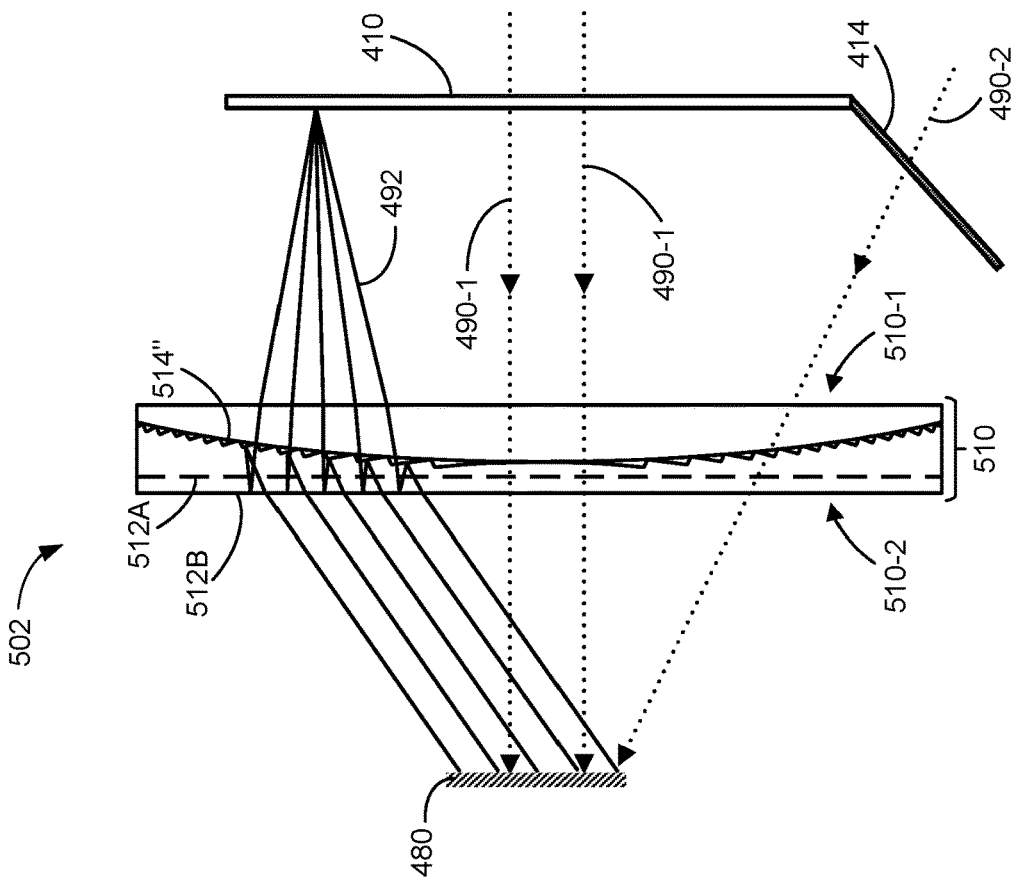
Figure 5J
Figure 5I

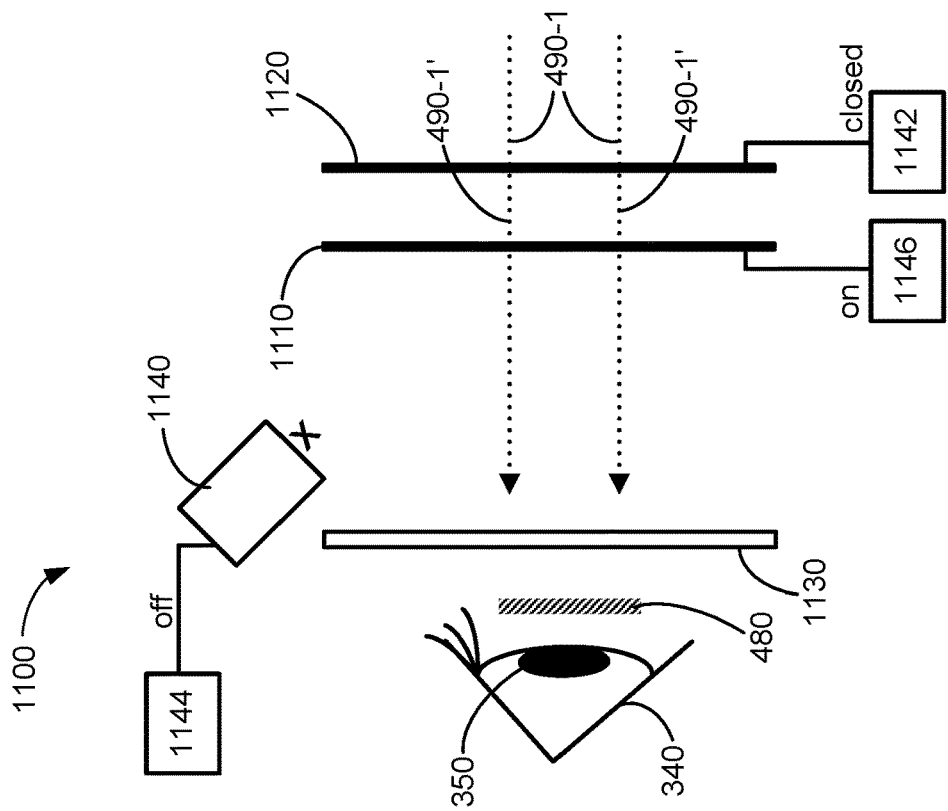
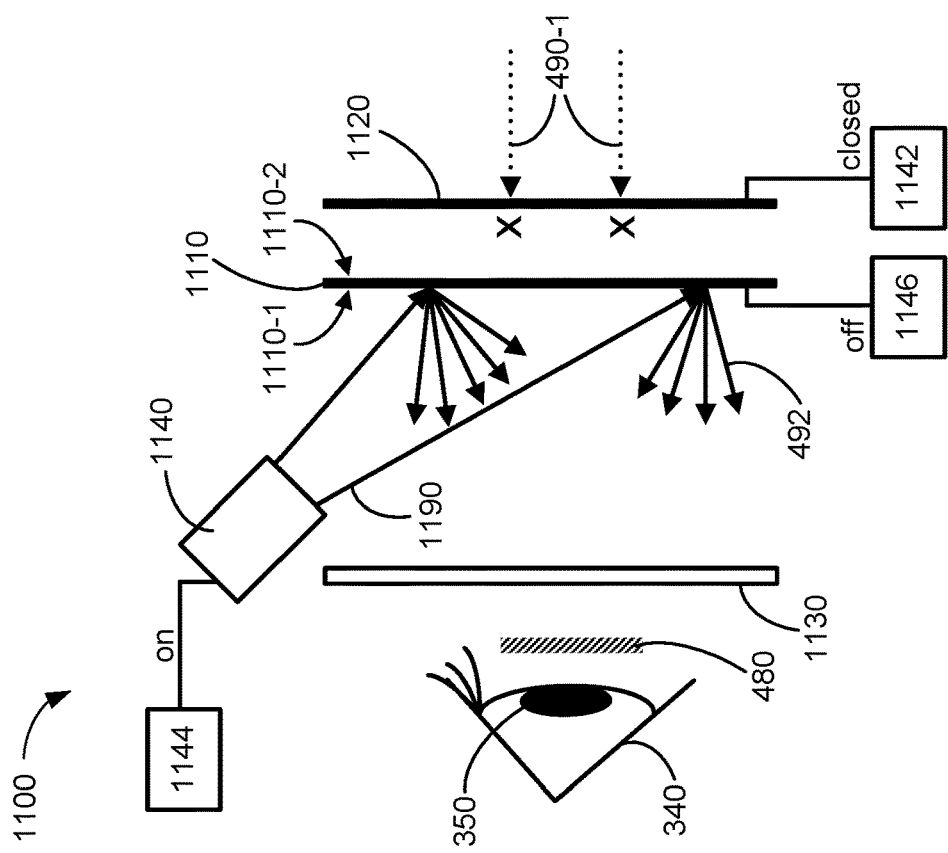
Figure 11C
Figure 11D

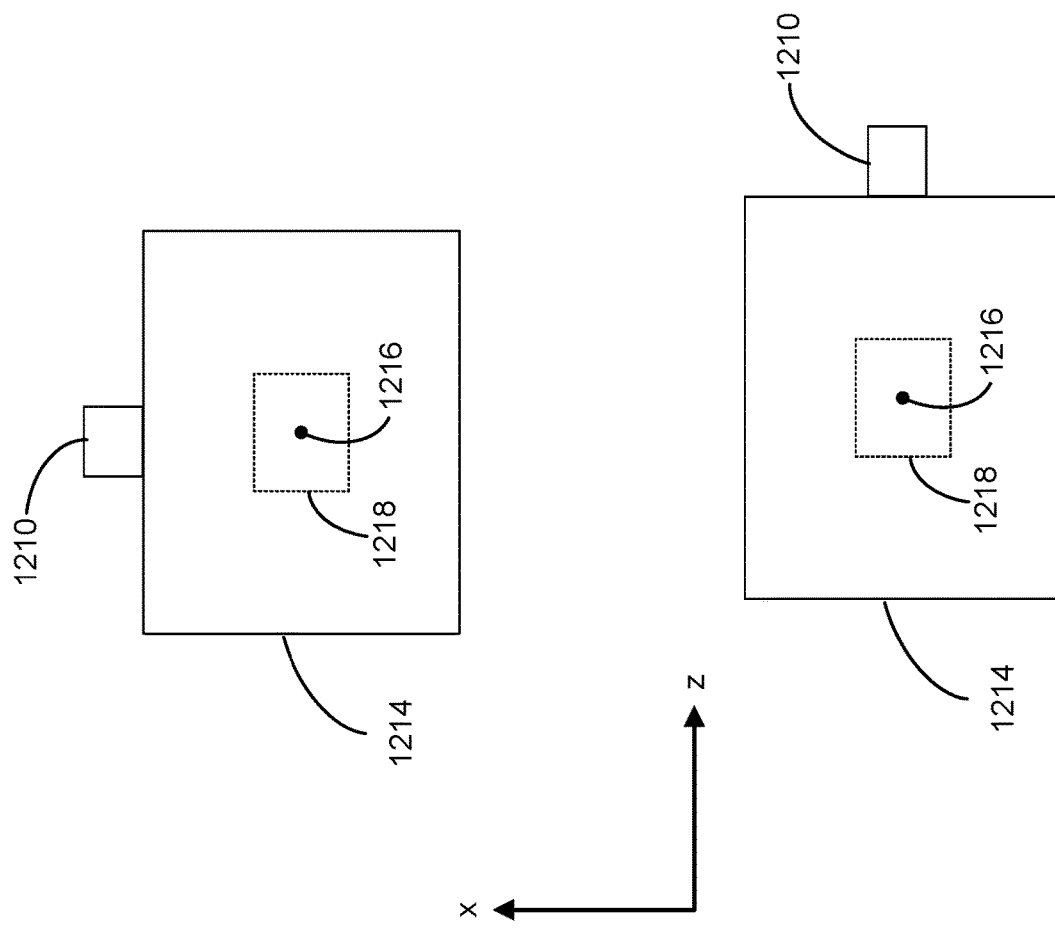
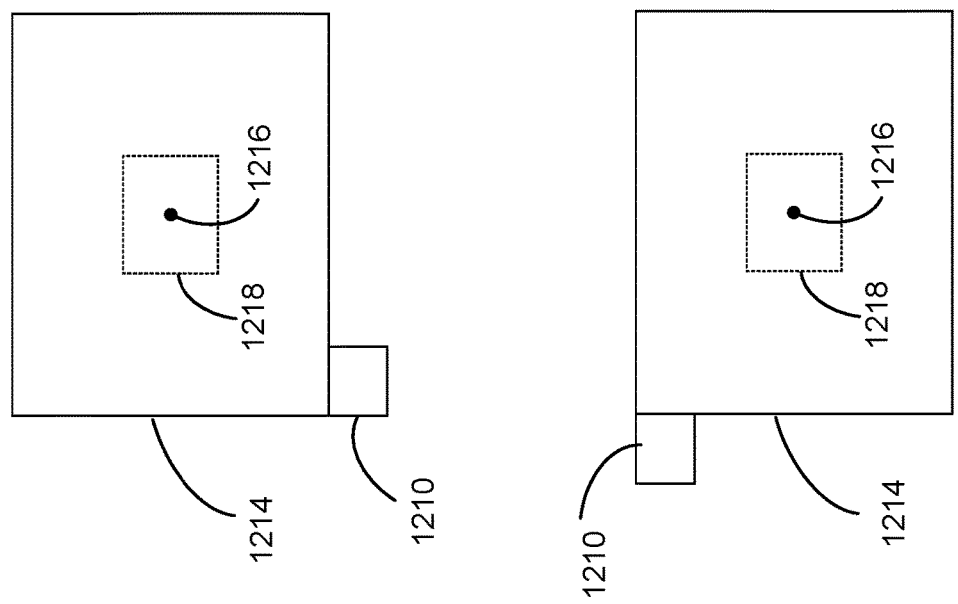
Figure 12B

1700

A method of transmitting light through an optical assembly includes:

1710 — Transmitting image light includes:

1712 — Receiving the image light at a first surface of a substrate, the substrate having a second surface that is opposite to and substantially parallel with the first surface, a reflector, and a volume Bragg grating that is configured to transmit light incident upon the volume Bragg grating at an incident angle that is within a first predetermined angular range, and reflect light incident upon the volume Bragg grating at an incident angle that is within a second predetermined angular range that is distinct from the first predetermined angular range.

1714 — Outputting the image light from the second surface at a first optical power via an optical path that includes reflection at the reflector and at the volume Bragg grating.

1720 — Transmitting ambient light in a second optical path that is different from the first optical path includes:

1722 — Receiving the ambient light at the first surface.

1724 — Outputting the ambient light from the second surface at a second optical power via a second optical path that does not include reflection at either the reflector or the volume Bragg grating. The second optical power is less than the first optical power.

Figure 17

DISPLAY DEVICE WITH DIFFUSIVE DISPLAY AND SEE-THROUGH LENS ASSEMBLY

RELATED APPLICATIONS

This application claims the benefit of, and priority to, U.S. Provisional Application Ser. No. 62/901,706, filed Sep. 17, 2019, which is incorporated by reference herein in its entirety.

This application is related to (1) U.S. patent application Ser. No. 16/810,417, filed Mar. 5, 2020, now U.S. Pat. No. 10,989,928, entitled "Thin See-Through Pancake Lens Assembly and Display Device Including the Same,", (2) U.S. patent application Ser. No. 16/810,431, filed Mar. 5, 2020, entitled "Curved See-Through Pancake Lens Assembly and Display Device Including the Same,", (3) U.S. patent application Ser. No. 16/810,445, filed Mar. 5, 2020, now U.S. Pat. No. 11,016,304, entitled "Lens Assembly Including a Volume Bragg Grating and Display Device Including the Same,", (4) U.S. patent application Ser. No. 16/810,458, filed Mar. 5, 2020, entitled "Display Device with Transparent Emissive Display and See-Through Lens Assembly,", (5) U.S. patent application Ser. No. 16/810,471, filed Mar. 5, 2020, entitled "Display Device with Holographic Diffuser Display and See-Through Lens Assembly, ", and (6) U.S. patent application Ser. No. 16/810,485, filed Mar. 5, 2020, now U.S. Pat. No. 11,073,700, entitled "Display Device with Switchable Diffusive Display and See-Through Lens Assembly", all of which are incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, some head-mounted display devices are used for virtual reality and augmented reality operations.

When using head-mounted display devices for AR applications, it may be desirable for the display device to seamlessly transmit ambient light to a user's eyes while projecting one or more images to the user's eyes.

SUMMARY

Accordingly, there is a need for a head-mounted display device that can project image light to a user's eyes and transmit ambient light to a user's eyes with reduced optical aberrations. In optical systems, optical aberrations are deviations from perfect or ideal optical performance of the optical elements in the optical system. These deviations can lead to reduced image quality, resulting in, for example, blurry or distorted images. Fortunately, with careful lens design, many optical aberrations can be corrected, allowing a perfect or near-perfect optical system to produce images with reduced optical aberrations (in the ideal case, minimal or no optical aberrations).

Thus, the above deficiencies and other problems associated with conventional head-mounted display devices are reduced or eliminated by the disclosed display devices.

In accordance with some embodiments, an optical assembly includes a substrate that has a first surface and a second surface opposite to and substantially parallel with the first surface. The optical assembly also includes a reflector and a beam splitter, each of which are coupled to the substrate. The optical assembly is also configured to transmit first light received at the first surface in an optical path that includes reflection at the reflector and at the beam splitter before the first light is output from the second surface. The optical assembly is also configured to transmit second light received at the first surface such that the second light is output from the second surface without undergoing reflection at either the reflector or the beam splitter.

In accordance with some embodiments, a display device includes a display and an optical assembly. The display is configured to output image light and to transmit ambient light. The optical assembly includes a substrate that has a first surface and a second surface opposite to and substantially parallel with the first surface. The optical assembly also includes a reflector and a beam splitter, each of which are coupled to the substrate. The optical assembly is also configured to transmit first light received at the first surface in an optical path that includes reflection at the reflector and at the beam splitter before the first light is output from the second surface. The optical assembly is also configured to transmit second light received at the first surface such that the second light is output from the second surface without undergoing reflection at either the reflector or the beam splitter.

In accordance with some embodiments, a method of transmitting light through an optical assembly includes transmitting image light in a first optical path and transmitting ambient light in a second optical path that is different from the first optical path. Transmitting the image light includes receiving the image light at a first surface of a substrate that includes a second surface that is opposite to and substantially parallel with the first surface, a reflector coupled to the substrate, and a beam splitter coupled to the substrate. Transmitting the image light also includes outputting the image light from the second surface such that the first optical path includes reflection at the reflector and at the beam splitter. Transmitting the ambient light includes receiving the ambient light at the first surface and outputting the ambient light from the second surface without undergoing reflection at either the reflector or the beam splitter.

In accordance with some embodiments, an optical assembly includes a substrate that has a first surface that has a has a first curved profile and a second surface has a second curved profile and is opposite and parallel with the first surface. The optical assembly also includes a beam splitter that is disposed on the first surface and conforms with the first curved profile of the first surface. The optical assembly further includes a reflector that is disposed on the second surface and conforms with the second curved profile of the second surface. The optical assembly is configured to receive first light at the first surface and to reflect the first light at the reflector and subsequently at the beam splitter before outputting the first light from the reflector. The first light is transmitted through the optical assembly at a first optical power. The optical assembly is also configured to transmit second light through the optical assembly without reflection at the reflector. The second light is transmitted through the optical assembly at a second optical power that is less than the first optical power.

In accordance with some embodiments, a display device includes a display that is configured to output image light and is configurable to transmit ambient light. The display device also includes an optical assembly that includes a first surface having a first curved profile and a second surface having a second curved profile and being parallel with the first surface. The optical assembly also includes a beam splitter that is disposed on the first surface and conforms with the first curved profile of the first surface. The optical assembly also includes a reflector that is disposed on second surface and conforms with the second curved profile of the second surface. The optical assembly is configured to receive the image light at the first surface and reflect the image light at the reflector and subsequently at the beam splitter before outputting the image light from the reflector. The image light is transmitted through the optical assembly at a first non-zero optical power. The optical assembly is also configured to transmit the ambient light through the optical assembly without reflection at the reflector. The ambient light is transmitted through the optical assembly at a second optical power that is less than the first optical power.

In accordance with some embodiments, a method of transmitting light through an optical assembly includes transmitting image light in a first optical path and transmitting ambient light in a second optical path that is different from the first optical path. Transmitting image light includes receiving the image light at a first surface of a substrate that has a first curved profile. Transmitting the image light also includes reflecting the image light at a that has a second curved profile and is substantially parallel to the first surface of the substrate, reflecting the image light at a beam splitter that is disposed on the first substrate and conforms with the first curved profile of the first surface, and outputting the image light from the reflector at a first optical power. Transmitting the ambient light, includes receiving the ambient light at the first surface, transmitting the ambient light through the optical assembly without reflection at the reflector, and outputting the ambient light from the optical assembly at a second optical power that is less than the first optical power.

In accordance with some embodiments, an optical assembly includes a substrate that has a first surface and a second surface that is opposite to and substantially parallel with the first surface. The optical assembly also includes a reflector coupled to the substrate and a volume Bragg grating coupled to the substrate. The volume Bragg grating is configured to transmit light that is incident upon the volume Bragg grating at an incident angle that is within a first predetermined angular range and to reflect light that is incident upon the volume Bragg grating at an incident angle that is within a second predetermined angular range distinct from the first angular range. The optical assembly is configured to transmit first light received at the first surface in an optical path that includes reflection at the reflector and at the volume Bragg grating before the first light is output from the second surface. The optical assembly is also configured to transmit second light received at the first surface such that the second light is output from the second surface without undergoing reflection at either the reflector or the volume Bragg grating.

In accordance with some embodiments, a display device includes a display and an optical assembly. The display is configured to output image light and to transmit ambient light. The optical assembly includes a substrate that has a first surface and a second surface that is opposite to and substantially parallel with the first surface. The optical assembly also includes a reflector coupled to the substrate and a volume Bragg grating coupled to the substrate. The volume Bragg grating is configured to transmit image incident upon the volume Bragg grating at an incident angle that is within a first predetermined angular range, reflect image light incident upon the volume Bragg grating at an incident angle that is within a second predetermined angular range distinct from the first angular range, and to transmit the ambient light. The optical assembly is configured to transmit the image light at the first surface in an optical path that includes reflection at the reflector and at the volume Bragg grating before the image light is output from the second surface. The optical assembly is also configured to transmit the ambient light such that the ambient light is output from the second surface without undergoing reflection at either the reflector or the volume Bragg grating.

In accordance with some embodiments, a method of transmitting light through an optical assembly includes transmitting image light in a first optical path and transmitting ambient light in a second optical path that is different from the first optical path. Transmitting the image light includes receiving the image light at a first surface of a substrate. The substrate includes a second surface that is opposite to and substantially parallel with the first surface, a reflector coupled to the substrate, and a volume Bragg grating coupled to the substrate. The volume Bragg grating is configured to transmit the image light incident upon the volume Bragg grating at an incident angle that is within a first predetermined angular range and to reflect the image light incident upon the volume Bragg grating at an incident angle that is within a second predetermined angular range distinct from the first angular range. The method of transmitting the image light also includes outputting the image light from the second surface at a first optical power via an optical path that includes reflection at the reflector and at the volume Bragg grating. Transmitting the ambient light includes receiving the ambient light at the first surface and outputting the ambient light from the second surface at a second optical power via an optical path that does not include reflection at either the reflector or the volume Bragg grating. The second optical power is less than the first optical power.

In accordance with some embodiments, a display device includes a display and an optical assembly. The display has a front surface and an opposing back surface. The display is configured to output image light from the front surface and to transmit ambient light from the back surface to the front surface. The optical assembly includes a substrate that has a substantially uniform thickness, a beam splitter coupled to the substrate, and a reflector coupled to the substrate. The optical assembly is configured to receive the image light and transmit a portion of the image light output from the front surface of the display at a first non-zero optical power via an optical path that includes reflections at the reflector and at the beam splitter. The optical assembly is also configured to receive the ambient light and transmit a portion of the ambient light through the optical assembly at a second optical power without reflection at the reflector. The second optical power is less than the first optical power.

In accordance with some embodiments, a method of displaying one or more images includes outputting image light from a front surface of a display. The display also includes a back surface opposite to the front surface. The method also includes transmitting ambient light from the back surface to the front surface, receiving the image light output from the front surface at an optical assembly, and transmitting a portion of the image light at a first optical power. The method further includes receiving the ambient light output from the front surface at the optical assembly and transmitting a portion of the ambient light at a second optical power that is different from the first optical power.

In accordance with some embodiments, a display device includes an optical diffuser configured to output diffuse image in response to receiving image light. The diffused image light output from the optical diffuser has a same polarization as the received image light. The optical diffuser is also configured to receive ambient and to output at least a first portion of the ambient light without changing its polarization. The display device also includes an optical assembly that includes a substrate having a first surface and a second surface opposite to and substantially parallel with the first surface, a reflector coupled to the substrate, and a beam splitter coupled to the substrate. The optical assembly is configured to transmit the diffused image light at a first non-zero optical power by reflecting the diffused image light at the reflector and at the beam splitter. The optical assembly is also configured to transmit a second portion of the ambient light through the optical assembly without reflection at the reflector or the beam splitter such that the second portion of the ambient light is transmitted through the optical assembly at a second optical power that is less than the first optical power.

In accordance with some embodiments, a method includes receiving image light at an optical diffuser, outputting diffused image light from the optical diffuser, and transmitting the diffused image light through an optical assembly at a first non-zero optical power. The diffused image light output from the optical diffuser has a same polarization as the received image light. The method also includes receiving ambient light at the optical diffuser and outputting, from the optical diffuser, at least a first portion of the ambient light. The method further includes transmitting a second portion of the ambient light through the optical assembly at a second optical power that is less than the first optical power. The optical assembly includes a substrate having a first surface and a second surface opposite to and substantially parallel with the first surface, a reflector coupled to the substrate, and a beam splitter coupled to the substrate. Transmitting the diffused image light through the optical assembly at the first non-zero optical power includes reflecting the diffused image light at the reflector and at the beam splitter. The second portion of the ambient light is transmitted through the optical assembly without reflection at the reflector or the beam splitter such that the second portion of the ambient light is transmitted through the optical assembly at the second optical power.

In accordance with some embodiments, a display device includes a display that has a front surface, a back surface that is opposite to the front surface, and optically anisotropic molecules that are disposed between the front surface and the back surface. The display is configurable to either receive image light at the front surface and diffuse the image light to output diffused image light from the front surface or receive ambient light at the back surface and output the ambient light from the front surface. The display device also includes an optical assembly that has an optical assembly substrate with substantially uniform thickness, a reflector coupled to the optical assembly substrate, and a beam splitter coupled to the optical assembly substrate. The optical assembly is configurable to transmit a portion of the diffused image light at a first optical power via an optical path including reflections at the reflector and at the beam splitter and to transmit a portion of the ambient light output from the front surface of the display at a second optical power without reflection at the reflector. The second optical power is less than the first optical power.

In accordance with some embodiments, a method for operating a display device includes operating the display device in a first mode. Operating the display device in the first mode includes receiving image light at a front surface of a display, diffusing the image light to output diffused image light from the front surface, and transmitting a portion of the diffused image light through an optical assembly at a first optical power via a first optical path that includes at least one fold. The method for operating the display device also includes operating the display device in a second mode. Operating the display device in the second mode includes receiving ambient light at a back surface opposite to the front surface of the display, transmitting the ambient light through the display, and transmitting a portion of the ambient light through the optical assembly at a second optical power via a second optical path. The second optical power is less than the first optical power and the second optical path does not include any folds.

In accordance with some embodiments, a display device includes one or more projectors configured to project image light, and a display having a first surface and a second surface. The display is configured to: receive the image light from the one or more projectors, output diffused image light from the first surface, receive ambient light at the second surface, and output the ambient light from the first surface. The display device also includes an optical assembly that has a substrate having a substantially uniform thickness, a beam splitter coupled to the substrate, and a reflector coupled to the substrate. The optical assembly is configured to receive the diffused image light output from the first surface of the display and transmit a portion of the diffused image light at a first optical power via an optical path including reflections at the reflector and at the beam splitter. The optical assembly is also configured to receive the ambient light output from the first surface of the display and transmit a portion of the ambient light through the optical assembly at a second optical power without reflection at the reflector. The second optical power is less than the first optical power.

In accordance with some embodiments, a method of displaying one or more images includes: projecting image light from one or more projectors; receiving, at a display, the image light projected from the one or more projectors; diffusing the image light at the display; and outputting diffused image light from a first surface of the display. The method also includes receiving ambient light at a second surface of the display and outputting the ambient light from the first surface of the display. The second surface is opposite to the first surface. The method further includes receiving, at an optical assembly, the diffused image light and the ambient light output from the first surface of the display, transmitting the diffused image light in a first optical path that includes one or more folds, and transmitting the ambient light in a second optical path that is different from the first optical path.

Thus, the disclosed embodiments provide a display device that includes an optical assembly that can direct image light having a first polarization and is capable of transmitting ambient light that has a polarization different from the first polarization without adding significant aberration or distortion.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A-5E are schematic diagrams illustrating an optical assembly including Fresnel structures in accordance with some embodiments.

FIGS. 5F-5H are schematic diagrams illustrating an optical assembly including Fresnel structures in accordance with some embodiments.

FIGS. 5I-5K are schematic diagrams illustrating an optical assembly including Fresnel structures in accordance with some embodiments.

FIGS. 11C-11D are schematic diagrams illustrating operation of a display device that includes a switchable display and a shutter assembly in accordance with some embodiments.

FIGS. 12A-12B are schematic diagrams illustrating a display device in accordance with some embodiments.

FIG. 17 is a flowchart illustrating a method of transmitting light through an optical assembly that includes a volume Bragg grating in accordance with some embodiments.

These figures are not drawn to scale unless indicated otherwise.

DETAILED DESCRIPTION

The present disclosure provides a head-mounted display device (or display device) that projects image light as well as transmits ambient light towards a user's eyes. The ambient light is transmitted to the viewer without significant optical aberrations from the optical components of the display device, in order to allow the user of the display device to accurately perceive and interact with objects in the outside environment.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
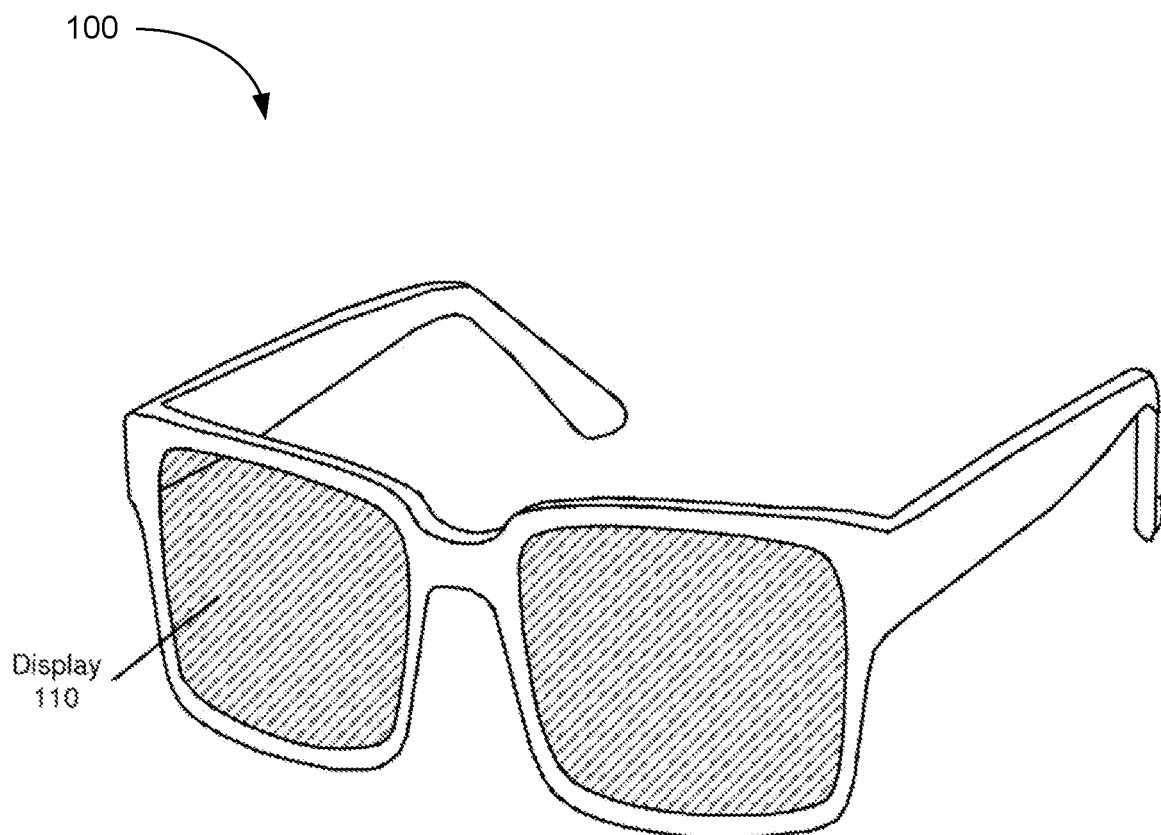
FIG. 1 is a perspective view of a display device in accordance with some embodiments.

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user.

Figure 2:
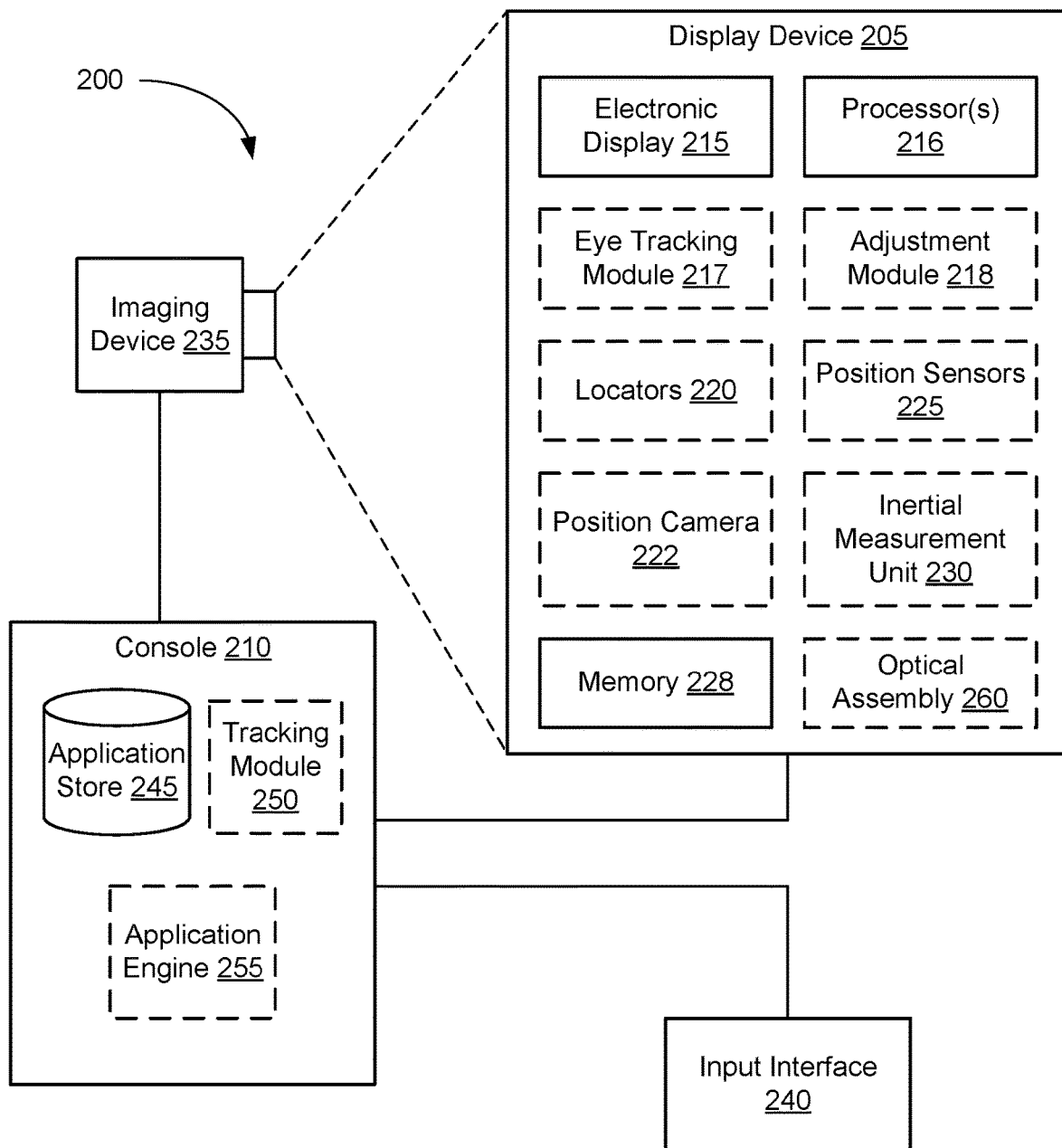
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user.

In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
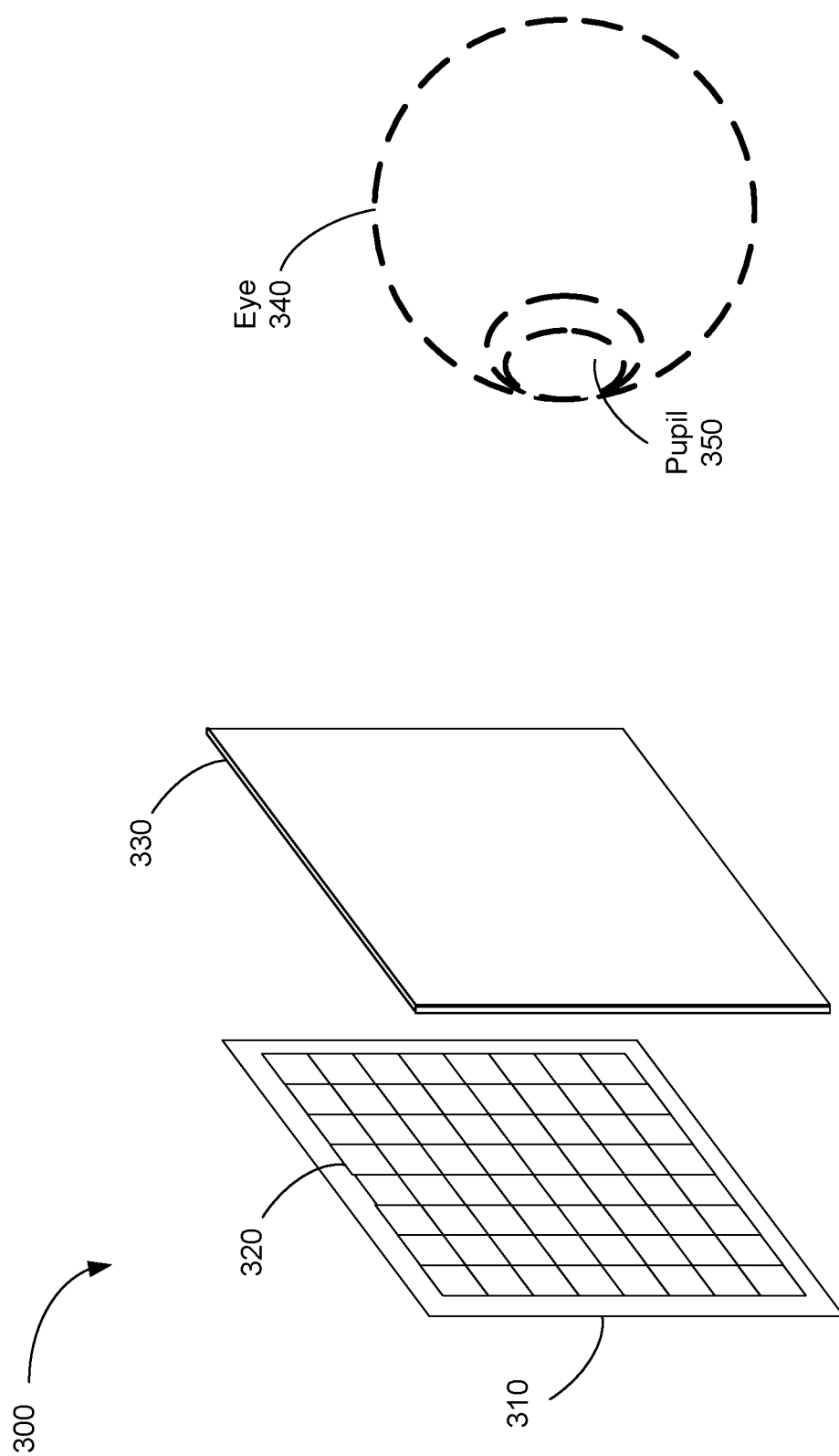
FIG. 3 is an isometric view of a display device in accordance with some embodiments.

FIG. 3 is an isometric view of a display device 300, which corresponds to part of or all of display device 100 (see FIG. 1) in accordance with some embodiments. In some embodiments, display device 300 includes a light emission device array 310 (e.g., a light emission device array or reflective element), and an optical assembly (e.g., optical assembly 260) having one or more optical components 330 (e.g., lenses). In some embodiments, display device 300 also includes an IR detector array.

In some embodiments, light emission device array 310 emits image light and optional IR light toward the optical components 330. Light emission device array 310 may be, e.g., an array of LEDs, an array of microLEDs, an array of OLED s, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission device array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from light emission device array 310, and direct the image light to a detected or presumed location of the pupil 350 of an eye 340 of a user. In some embodiments, the one or more optical components include one or more optical assemblies 260.

Figure 4A:
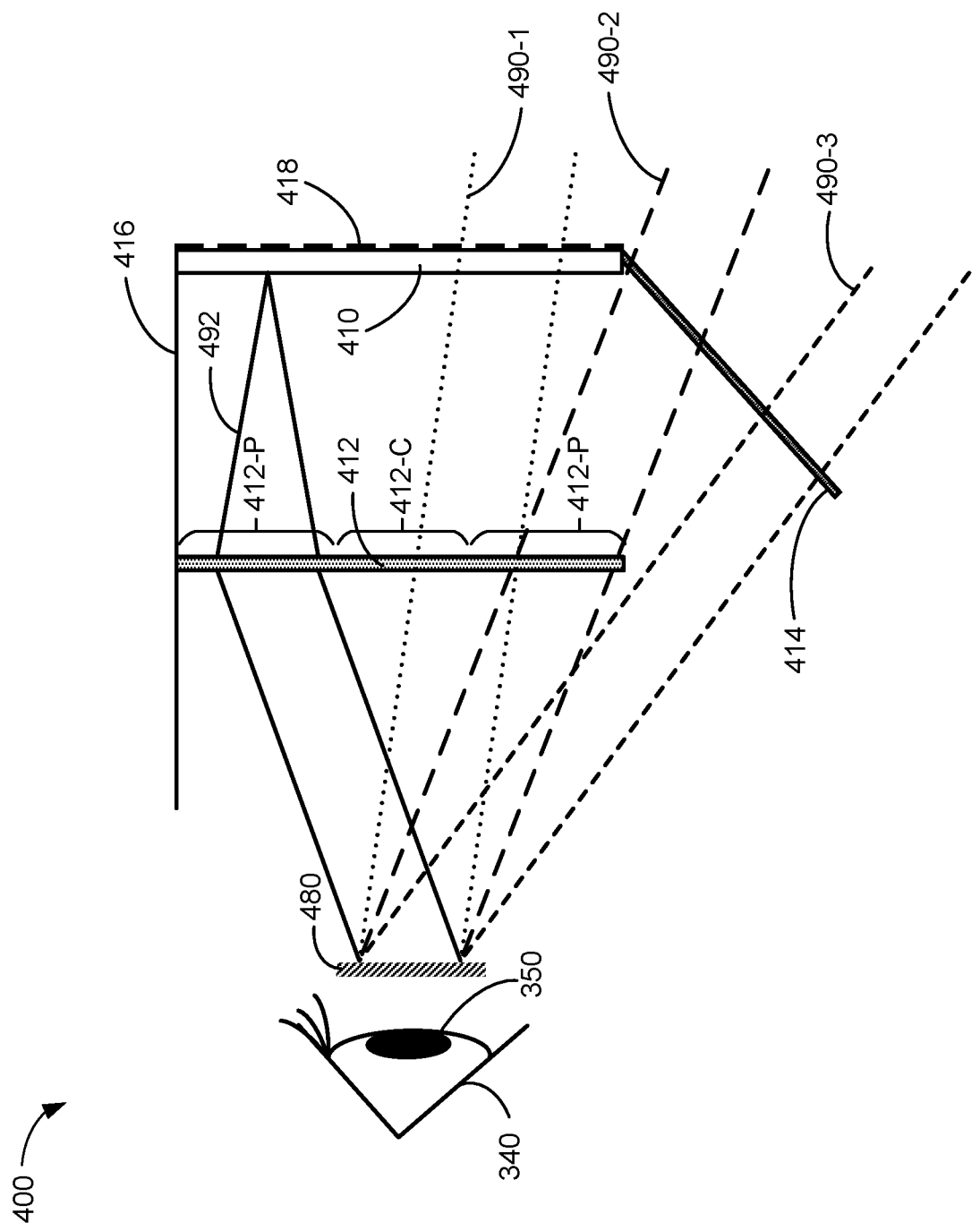
FIGS. 4A-4B are schematic diagrams illustrating a display device in accordance with some embodiments.
Figure 4B:
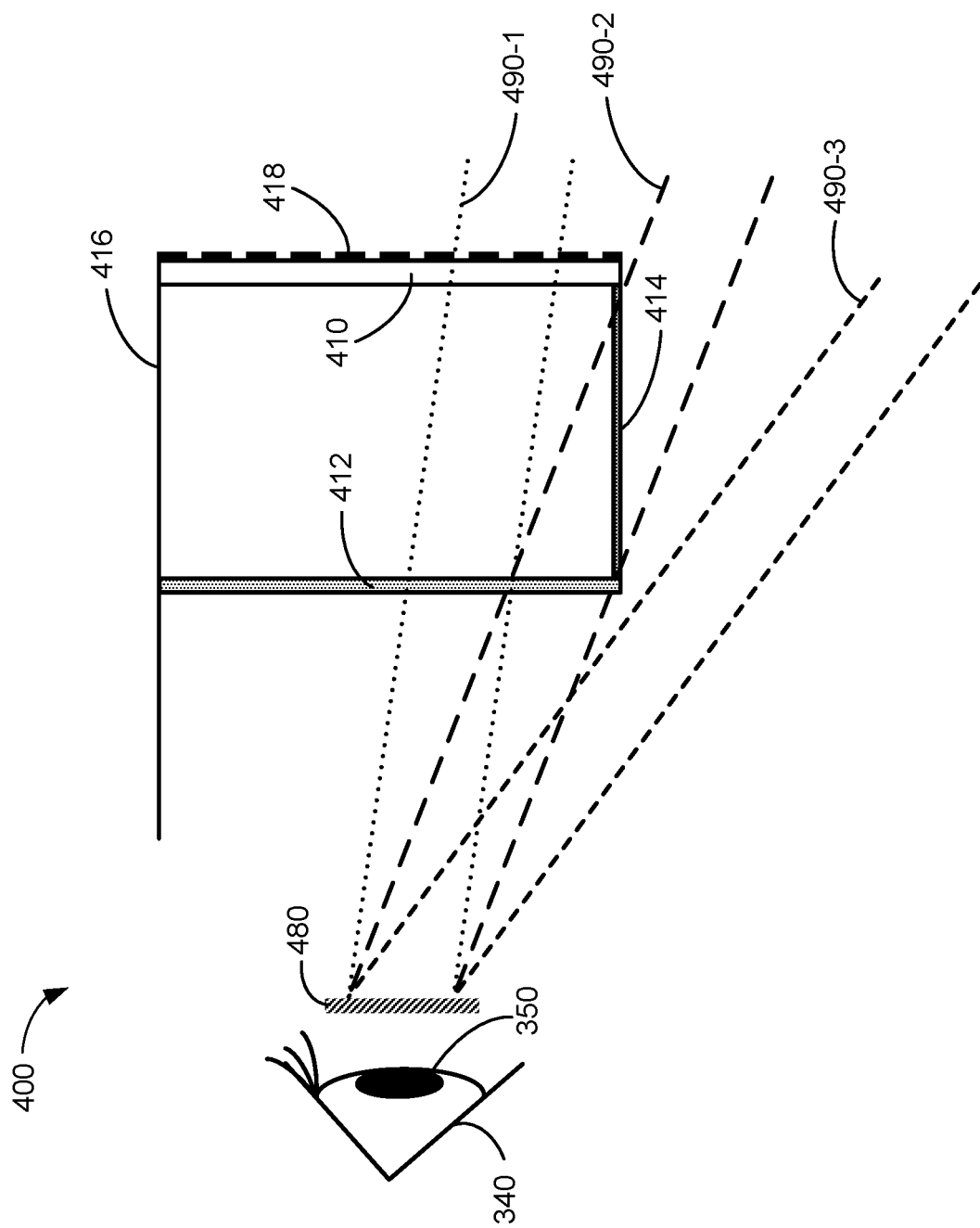

FIGS. 4A-4B are schematic diagrams illustrating display device 400 in accordance with some embodiments. As shown in FIG. 4A, display device 400 includes display 410 and optical assembly 412. In some embodiments, display device 400 may also include one or more of switchable window 414 and frame 416. In some embodiments, frame 416, display 410, and switchable window 414 form a housing and define an interior space for display device 400. In some embodiments, as shown, display device 400 may also include shutter assembly 418. In such cases, shutter assembly 418, frame 416, and switchable window 414 form a housing and define an interior space for display device 400. Optical assembly 412 is disposed inside the housing (e.g., in the interior space) between display 410 and a user's eyes 340 (when the device is in use), and display 410, which is also disposed inside the housing, is disposed between optical assembly 42 and shutter assembly 418.

In some embodiments, display device 400 is a head-mounted display device, and the shape and dimensions of frame 416 and optical assembly 412 are designed to avoid interference with a user's brow bone.

In some embodiments, switchable window 414 and shutter assembly 418 are configurable to block or to allow transmission of ambient light 490-1, 490-2, and 490-3 originating from outside the housing, such as light from the environment outside display device 400. As shown, some of ambient light (e.g., ambient light 490-1) is transmitted through shutter assembly 418 (when present), display 410, and optical assembly 412 before reaching eyebox 480. Also shown, some of ambient light (e.g., ambient light 490-2) is transmitted through switchable window 414 and optical assembly 412 before reaching eyebox 480, and some of ambient light (e.g., ambient light 490-3) enters the interior space for display device 400 through switchable window 414 and propagates towards eyebox 480 without being transmitted through optical assembly 412.

Figure 4D:
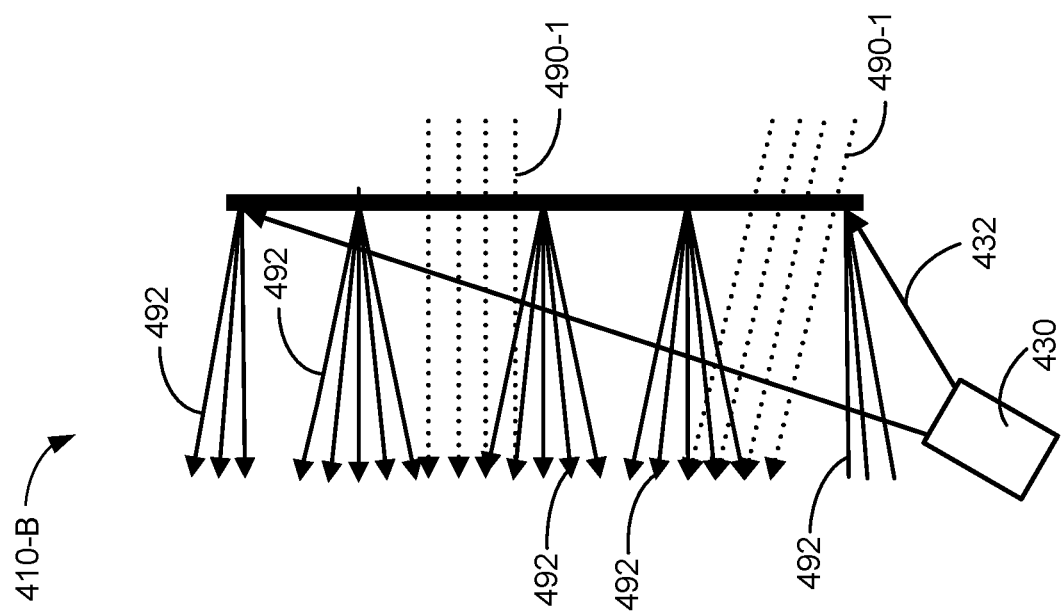
FIG. 4D is a schematic diagram illustrating a transparent non-emissive display in accordance with some embodiments.
Figure 4C:
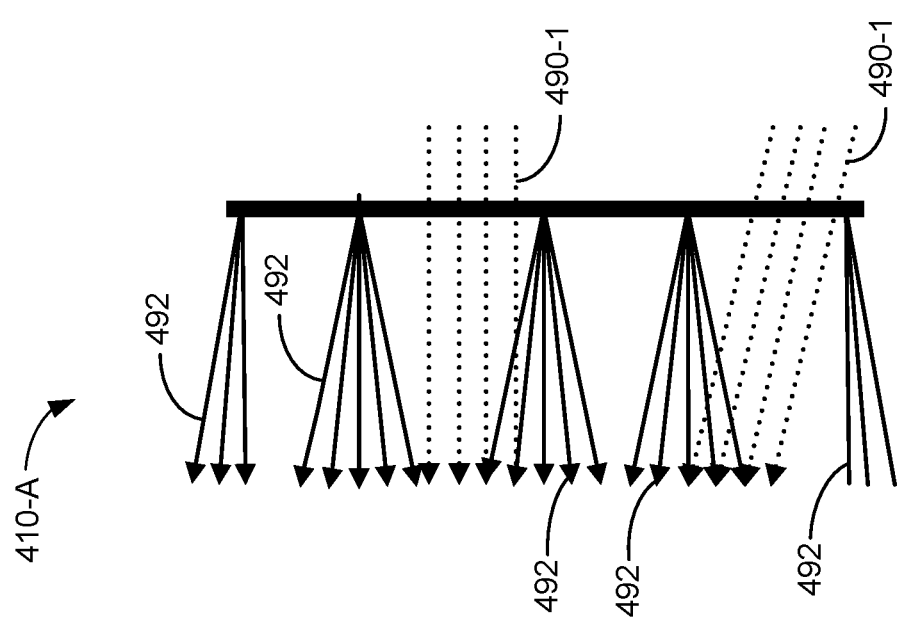
FIG. 4C is a schematic diagram illustrating a transparent emissive display in accordance with some embodiments.

In some embodiments, display 410 is a transparent display configured to transmit ambient light 490-1 and to output image light 492. Optical assembly 412 is configured to receive image light 492 output from display 410 and to transmit image light 492 at a first optical power toward an eyebox 480 representing the pupil 350 of an eye 340 of a user. Optical assembly 412 is also configured to transmit any of ambient light 490-1 and ambient light 490-2 toward eyebox 480 at a second optical power that is less than the first optical power. In some embodiments, the second optical power is zero. In some embodiments, optical assembly 412 is configured to transmit any of the ambient light 490-1 and the ambient light 490-2 without adding significant optical aberrations. As shown in FIG. 4C, display 410 may be a transparent emissive display 410-A that is configured to emit image light 492. Alternatively, as shown in FIG. 4D, display 410 may be a transparent non-emissive display 410-B that is configured to receive image light 432 projected from one or more light sources 430, such as a projector, and to output (e.g., reflect, diffuse) diffused image light 492 in response to receiving the image light 432.

In some embodiments, as shown in FIG. 4B, switchable window 414 may be disposed between display 410 and optical assembly 412 such that a first edge of switchable window 414 is adjacent to display 410 and a second edge, opposite the first edge, of switchable window 414 is adjacent to optical assembly 412.

Figure 5C:
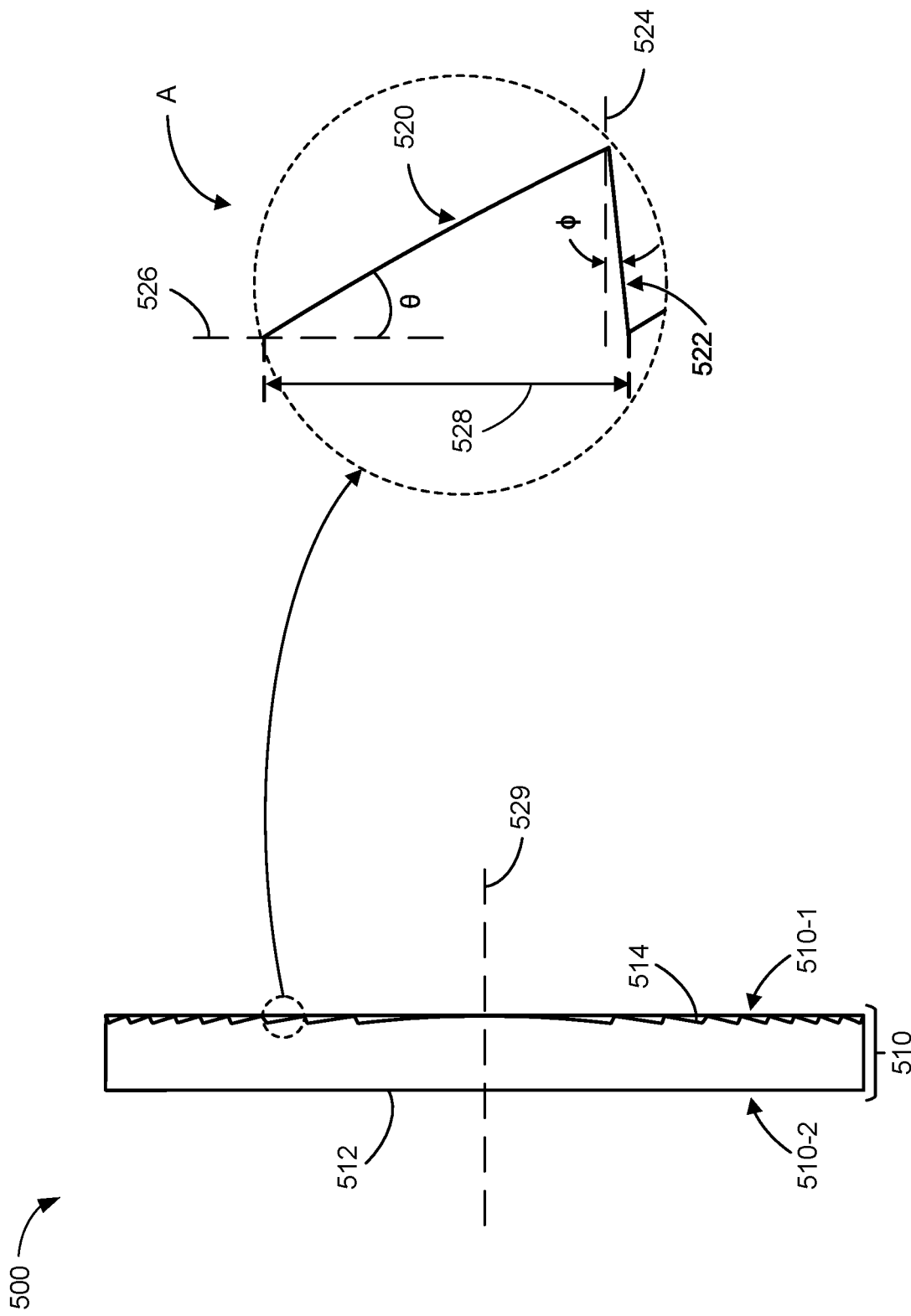

FIGS. 5A-5E are schematic diagrams illustrating optical assembly 500, corresponding to optical assembly 412, in accordance with some embodiments. As shown in FIG. 5A, optical assembly 500 includes a substrate 510 that has opposing surfaces 510-1 and 510-2 that are substantially parallel (e.g., forming an angle between 89 degrees and 91 degrees) with one another. In some embodiments, substrate 510 has a substantially uniform thickness. Optical assembly 500 also includes a reflector 512 that is optically coupled to second surface 510-2. Optical assembly 500 further includes a beam splitter 514 that is disposed between surfaces 510-1 and 510-2 and includes a plurality of Fresnel structures. In response to receiving incident light, beam splitter 514 is configured to transmit at least a portion of the incident light and transmit another portion of the incident light. In some embodiments, beam splitter 514 is configured to transmit and reflect equal portions of the incident light (e.g., 50% reflection and 50% transmission). Beam splitter 514 may be configured to have any reflection to transmission ratio (e.g., 30% reflection and 70% transmission, 10% reflection and 90% transmission, etc.). In some embodiments, as shown, the plurality of Fresnel structures may be arranged on a planar surface. Alternatively, the plurality of Fresnel structures may be arranged on a curved surface (e.g., a convex surface, a concave surface, a spherical surface, and aspherical surface).

As shown in FIGS. 5A and 5B, optical assembly 500 is configured to transmit image light 492 at the first optical power and to transmit ambient light 490-1 and ambient light 490-2 at the second optical power. As shown in FIG. 5A, ambient light 490-1, transmitted through display 410 and a central portion of optical assembly 500 (e.g., corresponding to central portion 412-C of optical assembly 412), and ambient light 490-2, transmitted through switchable window 414 and a peripheral portion of optical assembly 500 (e.g., a corresponding to peripheral portion 412-P of optical assembly 412), have optical paths that do not include any folds. As shown, ambient light 490-1 and 490-2 are transmitted through the beam splitter 514 and the reflector 512 without reflection at the beam splitter 514 and the reflector 512. FIG. 5B illustrates optical paths of image light 492-C output from a central portion and transmitted through the central portion of optical assembly 500 and image light 492-P output from a peripheral portion of display 410 and transmitted through the peripheral portion of optical assembly 500. As shown, image light 492-C and 492-P (collectively and individually referred to herein as image light 492) is received at surface 510-1 and goes through folded optical paths including reflection at the reflector 512 and reflection at the beam splitter 514 before being output from surface 510-2 (e.g., the optical paths of the image light 492 includes one or more folds).

Referring to FIG. 5C, inset A shows details of a Fresnel structure of the plurality of Fresnel structures of beam splitter 514. Each Fresnel structure includes a slope facet 520 and a draft facet 522. The draft facet 522 is characterized by a draft angle (I) (e.g., the draft facet 522 is tilted by the draft angle (I) from a reference axis 524). In some embodiments, the draft facet 522 is a flat surface. In some embodiments, the draft facet 522 is a curved surface and the draft angle is an average draft angle for the draft facet. In some embodiments, the slope facet 520 is characterized by a slope angle $\theta$ (e.g., the slope facet 520 is tilted by the slope angle $\theta$ from a reference axis 526). In some embodiments, the slope facet 520 is a flat surface. In some embodiments, the slope facet 520 is a curved surface, and the slope angle is an average slope angle for the slope facet. Each Fresnel structure also has a pitch 528 that corresponds to a width of the Fresnel structure.

In some embodiments, the plurality of Fresnel structures has variable pitch (e.g., a Fresnel structure of the plurality of Fresnel structures has a pitch that differs from a pitch of another Fresnel structure of the plurality of Fresnel structures). In such cases, the pitch of a respective Fresnel structure is based on the distance of the respective Fresnel structure from an optical axis 529 (e.g., a central axis or an axis of symmetry) of beam splitter 514. For example, when the plurality of Fresnel structures has variable pitch, a Fresnel structure located closer to optical axis 529 has a larger pitch than a Fresnel structure that is located further from optical axis 529. Decreasing the pitch of Fresnel structures toward the edge of beam splitter 514 reduces the visibility of the ring patterns compared to having Fresnel structures with constant pitch, thereby improving the uniformity and quality of the projected image. Thus, in some embodiments, it may be desirable to have Fresnel structures with variable pitch.

Figure 5D:
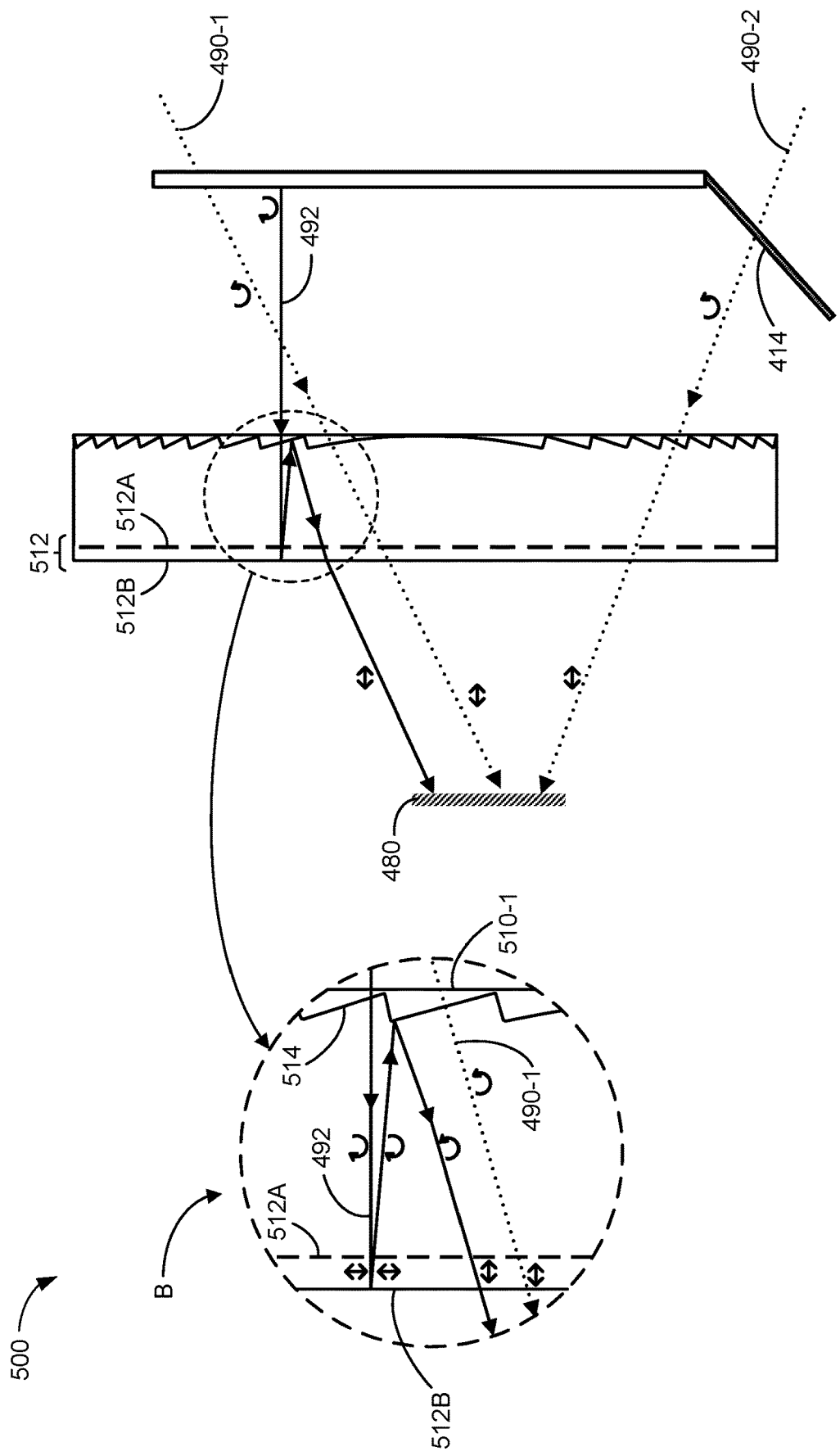

In some embodiments, the plurality of Fresnel structures has dynamic draft (e.g., a Fresnel structure of the plurality of Fresnel structures has a draft angle that differs from a draft angle of another Fresnel structure of the plurality of Fresnel structures). In such cases, the draft angle of a respective Fresnel structure is based on the distance of the respective Fresnel structure from optical axis 529 of beam splitter 514. For example, when the plurality of Fresnel structures has dynamic draft, a Fresnel structure located closer to optical axis 529 has a smaller draft angle than a Fresnel structure that is located further from optical axis 529. Increasing the draft angle of Fresnel structures toward the edge of beam splitter 514 reduces the visibility of the ring patterns compared to the Fresnel structures having uniform draft angles, thereby improving the uniformity and quality of the projected image. Thus, in some embodiments, it may be desirable to have Fresnel structures with variable pitch. Referring to FIG. 5D, reflector 512 includes a reflective polarizer 512B (e.g., a polarization sensitive reflector) and an optical retarder 512A (e.g., a quarter-wave plate). Reflective polarizer 512B is configured to reflect light having a first linear polarization and transmit light having a second linear polarization that is different from (e.g., orthogonal to) the first linear polarization. Optical retarder 512A is configured to receive light having an incident polarization and to transmit the light while converting the polarization of the light to a different polarization. In some embodiments, optical retarder 512A and reflective polarizer 512B are separate from one another, as shown. Alternatively, optical retarder 512A and reflective polarizer 512B may be two layers of optical coatings that are stacked or laminated on surface 510-2.

The optical paths of image light 492 and ambient light 490-1 and 490-2 are shown in FIG. 5D. Display 410 is configured to output image light 492 having the first polarization (e.g., a first circular polarization) and to transmit ambient light 490-1 having the second polarization (e.g., second circular polarization). As shown, ambient light 490-2, transmitted through switchable window 414, also has the second polarization. In some embodiments, the first polarization is left-handed circular polarization (LCP) and the second polarization is right-handed circular polarization (RCP), or vice versa.

As shown, optical assembly 500 is configured to receive image light 492 at surface 510-1 and to focus and output the image light 492 in an optical path that includes reflection at reflective polarizer 512B and beam splitter 514 before the image light 492 is output from surface 510-2 in a first direction. Optical assembly 500 is also configured to receive ambient light 490-1 propagating in a second direction at surface 510-1 and to output ambient light 490-1 from surface 510-2 without substantially changing its direction (e.g., direction of the ambient light 490-1 output from optical assembly 500 forming an angle with the second direction that is less than 1 degree). In some embodiments, as shown with respect to image light 492 and ambient light 490-1, the first direction and the second direction are about the same and can be perceived by the user as coming from a same location or locations that are close to each other. The optical path of ambient light 490-2 through optical assembly 500 is similar to the optical path of ambient light 490-1 and thus is not repeated for brevity.

Inset B of FIG. 5D illustrates the optical paths of the image light 492 and the ambient light 490-1 and 490-2 in optical assembly 500 and their respective polarizations along their respective optical paths.

Referring to the optical paths of image light 492, surface 510-1 is configured to receive the image light 492 having the first polarization (e.g., LCP) and transmit the image light 492 toward beam splitter 514. Beam splitter 514 is configured to transmit at least a first portion of the image light 492 toward reflector 512. Optical retarder 512A of reflector 512 is configured to transmit the first portion of the image light 492 toward reflective polarizer 512B while converting the first portion of the image light 492 to a third polarization (e.g., the first linear polarization). Reflective polarizer 512B is configured to reflect the first portion of image light 492 having the third polarization towards optical retarder 512A. Optical retarder 512A is configured to transmit the first portion of the image light 492 toward beam splitter 514 while converting the first portion of the image light 492 from the third polarization to the first polarization. Beam splitter 514 is configured to receive the first portion of image light 492 having the first polarization and reflect a second portion of image light 492 toward reflector 512 such that the reflected second portion of image light 492 has the second polarization. Optical retarder 512A is configured to transmit the second portion of image light 492 having the second polarization toward reflective polarizer 512B while converting the second portion of image light 492 to a fourth polarization (e.g., the second linear polarization). Reflective polarizer 512B is configured to transmit the second portion of image light 492 such that the second portion of image light 492 having the fourth polarization is output from surface 510-2 at the first optical power. Due to reflection at beam splitter 514, the plurality of Fresnel structures contribute to the first optical power.

Referring to the optical paths of ambient light 490-1 and 490-2, surface 510-1 is configured to receive ambient light 490 having the second polarization (e.g., RCP) and to transmit the ambient light 490-1 and 490-2 toward beam splitter 514. Beam splitter 514 is configured to transmit at least a first portion of ambient light 490-1 and 490-2 toward reflector 512. Optical retarder 512A is configured to transmit the first portion of ambient light 490-1 and 490-2 toward reflective polarizer 512B while converting the first portion of ambient light 490-1 and 490-2 to the fourth polarization. Reflective polarizer 512B is configured to transmit the first portion of ambient light 490-1 and 490-2 such that the first portion of ambient light 490-1 and 490-2 having the fourth polarization is output from surface 510-2 at the second optical power.

In some embodiments, the reflective polarizer 512B may be a narrow band reflective polarizer that is configured to (i) reflect light having a first linear polarization and wavelengths in a predetermined wavelength range, (ii) transmit light having the second linear polarization and wavelengths in the predetermined wavelength range and light having wavelengths outside the predetermined wavelength range regardless of polarization. Additionally, when the reflective polarizer 512B is a narrow band reflective polarizer, the optical assembly 500 is configured to direct image light 492 having a narrow band output that corresponds to (e.g., is the same as, or overlaps at least partially with) the predetermined wavelength range. For example, the image light may include light from narrow band sources such as lasers. Thus, optical assembly 500 that includes a narrow band reflective polarizer 512B is configured to transmit a larger portion (e.g., a larger percentage of a spectral range, or a larger portion of intensity) of the ambient light 490-1 and 490-2 compared to an optical assembly including a reflective polarizer 512B that is not a narrow band reflective polarizer (e.g., is a broad band reflective polarizer). For example, optical assembly 500 that includes a narrow band reflective polarizer may transmit 90%, 95%, 99% or more of the ambient light.

In some embodiments, beam splitter 514 is a wavelength-selective beam splitter, such as a narrow band beam splitter that is configured to split the beam (e.g., 50% reflection and 50% transmission) for light having wavelengths in a predetermined wavelength range (e.g., a wavelength range with a width of less than 100 nm, less than 50 nm, or less than 30 nm, less than 20 nm, less than 10 nm) and to transmit light having wavelengths outside the predetermined wavelength range. For example, when beam splitter 514 is a narrow band beam splitter, the beam splitter 514 is configured to reflect 50% and transmit 50% of image light output from a display when the image light has wavelengths in a narrow, predetermined wavelength range. The narrow band beam splitter 514 is also configured to provide close to 100% transmission (e.g., greater than 90% or greater than 80% transmission) for light having wavelengths that are outside the predetermined wavelength range (e.g., visible light outside the predetermined wavelength range). Additionally, when the beam splitter 514 is a narrow band beam splitter, the optical assembly 500 is configured to direct image light 492 having a narrow band output that overlaps at least partially with (or is the same as or within) the predetermined wavelength range. For example, the image light may include light from narrow band sources such as lasers. Thus, the optical assembly 500 that includes a narrow band beam splitter is configured to transmit a larger portion (e.g., a larger percentage of a spectral range, or a larger portion of intensity) of the ambient light 490-1 and 490-2 compared to an optical assembly including a beam splitter that is not a narrow band beam splitter (e.g., is a broad band beam splitter). For example, optical assembly 500 that includes a narrow band beam splitter may transmit 90%, 95%, 99% or more of the ambient light.

Figure 5E:
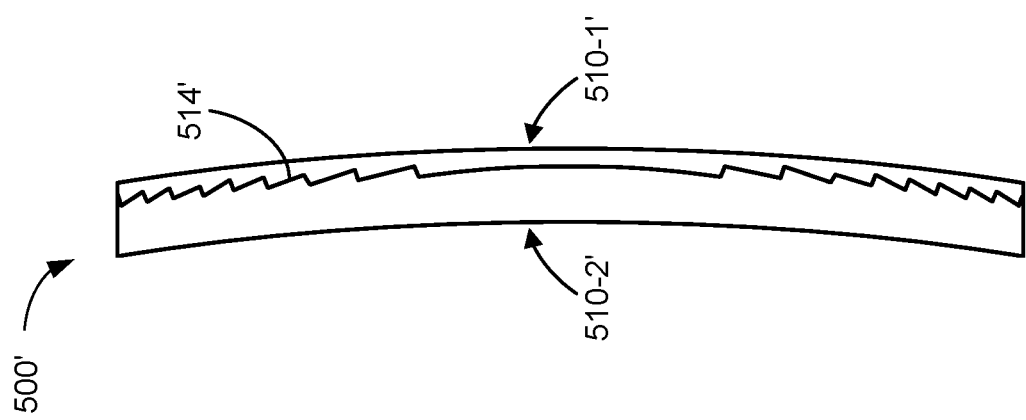

In some embodiments, as shown in FIGS. 5A-5C, surfaces 510-1 and 510-2 are planar surfaces. In such cases, the plurality of Fresnel structures of beam splitter 514 have a substantially planar profile (e.g., flat profile, radius of curvature larger than, for example, 100 meters). In some embodiments, surfaces 510-1 and surface 510-2 may be curved surfaces. For example, as shown in FIG. 5E, optical assembly 500', which is the same as optical assembly 500, show that surfaces 510-1' and 510-2' are curved surfaces. Surfaces 510-1' and 510-2' have a same radius of curvature and thus are substantially parallel (e.g., forming an angle between 89 degrees and 91 degrees) to one another. In such cases, the plurality of Fresnel structures of beam splitter 514' form a curved profile that also has the same curvature as surface 510-1'. When the plurality of Fresnel structures of beam splitter 514' form a curved profile, the radius of curvature of the curved profile may also contribute to the first optical power. In some embodiments, the radius of curvature is larger than 75 millimeters.

Figure 5H:
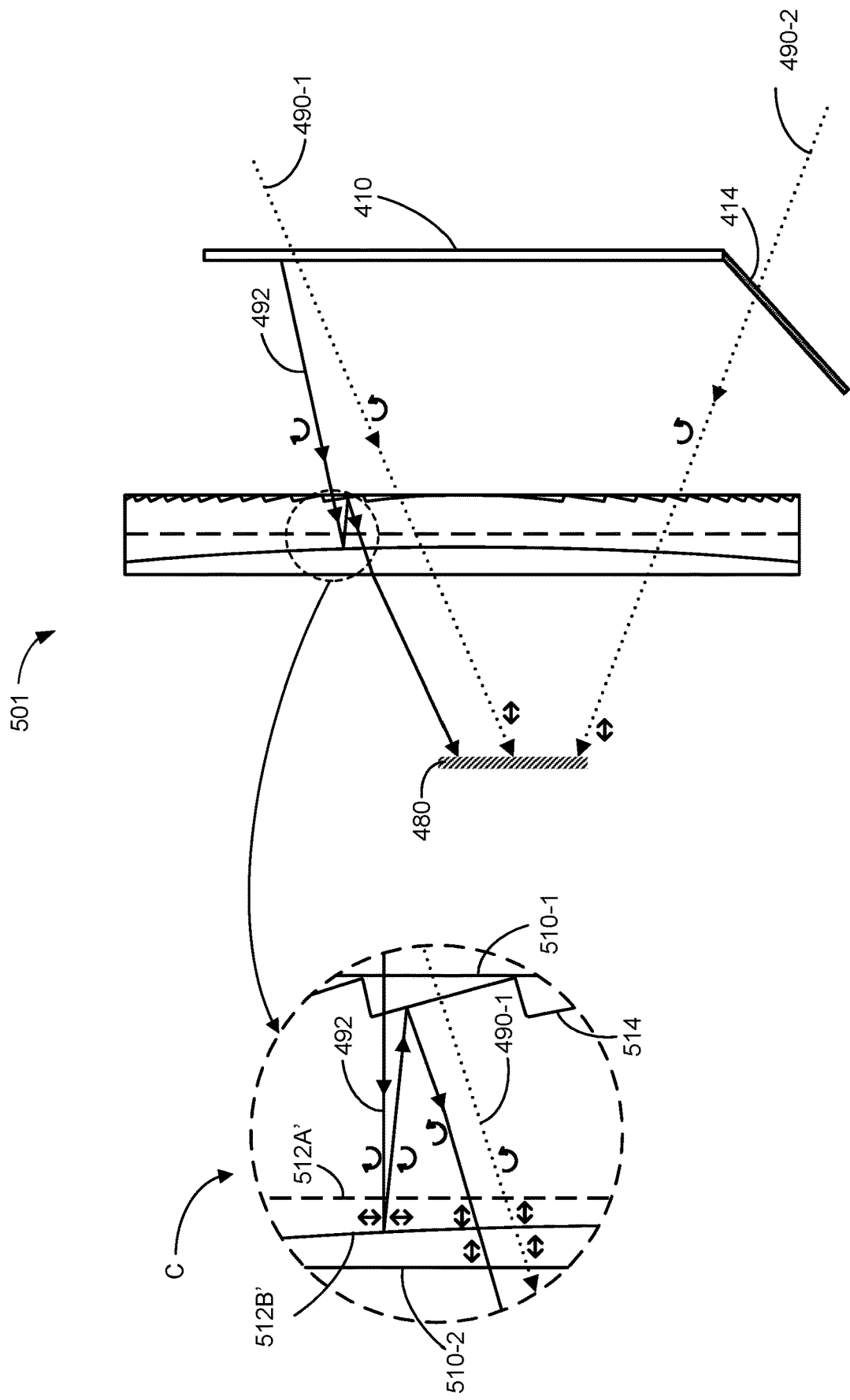

FIGS. 5F-5H are schematic diagrams illustrating optical assembly 501, corresponding to optical assembly 412, in accordance with some embodiments. Similar to optical assembly 500, optical assembly 501 includes substrate 510 that has opposing surfaces 510-1 and 510-2 that are opposite to and substantially parallel (e.g., forming an angle between 89 degrees and 91 degrees) to one another. Optical assembly 501 also includes a reflector 512' and beam splitter 514. The optical paths of image light 492 and ambient light 490-1 and 490-2 are illustrated in FIGS. 5F and 5G.

As shown, reflector 512' includes an optical retarder 512A' and reflective polarizer 512B', similar to optical retarder 512A and reflective polarizer 512B of optical assembly 500, respectively. Unlike reflective polarizer 512B, reflective polarizer 512B' is disposed between beam splitter 514 and surface 510-2 and has a curved reflective surface. In some embodiments, reflective polarizer 512B' is spaced apart from each of surface 510-1 and surface 510-2. In some embodiments, reflective polarizer 512B' is disposed on surface 510-2. In some embodiments, as shown, optical retarder 512B' has a planar surface. Alternatively, optical retarder 512A' may have a curved surface that follows the surface profile of the curved reflective surface of reflective polarizer 512B'. Beam splitter 514 is disposed between surfaces 510-1 and 510-2 and includes a plurality of Fresnel structures, as described above with respect to optical assembly 500. Details regarding the plurality of Fresnel structures are similar to the plurality of Fresnel structures of optical assembly 500 and are not repeated here for brevity. Compared to the reflective surface of reflective polarizer 512B, which has negligible (if any) contribution to the first optical power when image light 492 is transmitted through optical assembly 500, a radius of curvature of the curved reflective surface of reflective polarizer 512B' and the plurality of Fresnel structures of beam splitter 514 both contribute to the first optical power when image light 492 is transmitted through optical assembly 501.

Referring to FIG. 5H, inset C shows the optical paths of image light 492, ambient light 490-1 and 490-2 and their respective polarizations along their respective optical paths, which are the same as the respective optical paths and polarizations described above with respect to optical assembly 500 and thus are not repeated here for brevity.

Figure 5K:
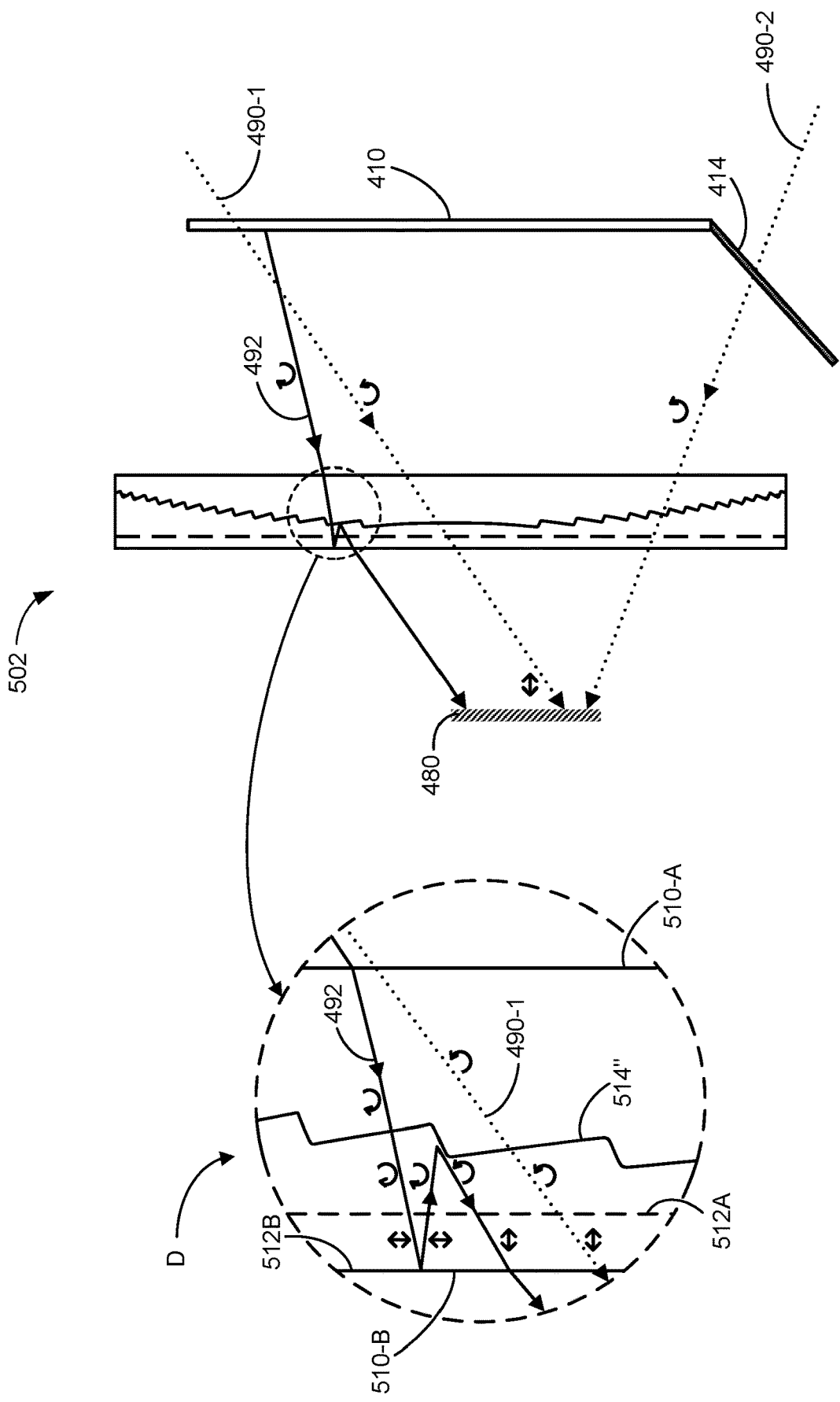

FIGS. 5I-5K are schematic diagrams illustrating optical assembly 502, corresponding to optical assembly 412, in accordance with some embodiments. Similar to optical assembly 500, optical assembly 502 includes substrate 510 that has opposing surfaces 510-1 and 510-2 that are opposite to and substantially parallel (e.g., forming an angle between 89 degrees and 91 degrees) to one another. Optical assembly 501 also includes reflector 512 and a beam splitter 514". The optical paths of image light 492 and ambient light 490-1 and 490-2 are illustrated in FIGS. 5I and 5J.

As shown in FIG. 5I, reflector 512 includes optical retarder 512A and reflective polarizer 512B. Beam splitter 514" is disposed between surfaces 510-1 and 510-2 and includes a plurality of Fresnel structures, as described above with respect to optical assembly 500. As shown, the plurality of Fresnel structures form a curved profile and thus, beam splitter 514" is spaced apart from each of surface 510-1 and surface 510-2. When image light 492 is output from optical assembly 502 at the first optical power, the curved profile of the plurality of Fresnel structures of beam splitter 514" also contributes to the first optical power.

Referring to FIG. 5K, inset D shows the optical paths of image light 492, ambient light 490-1 and 490-2, and their respective polarizations along their respective optical paths, which are the same as the respective optical paths and polarizations described above with respect to optical assembly 500 and thus are not repeated here for brevity.

Figure 5L:
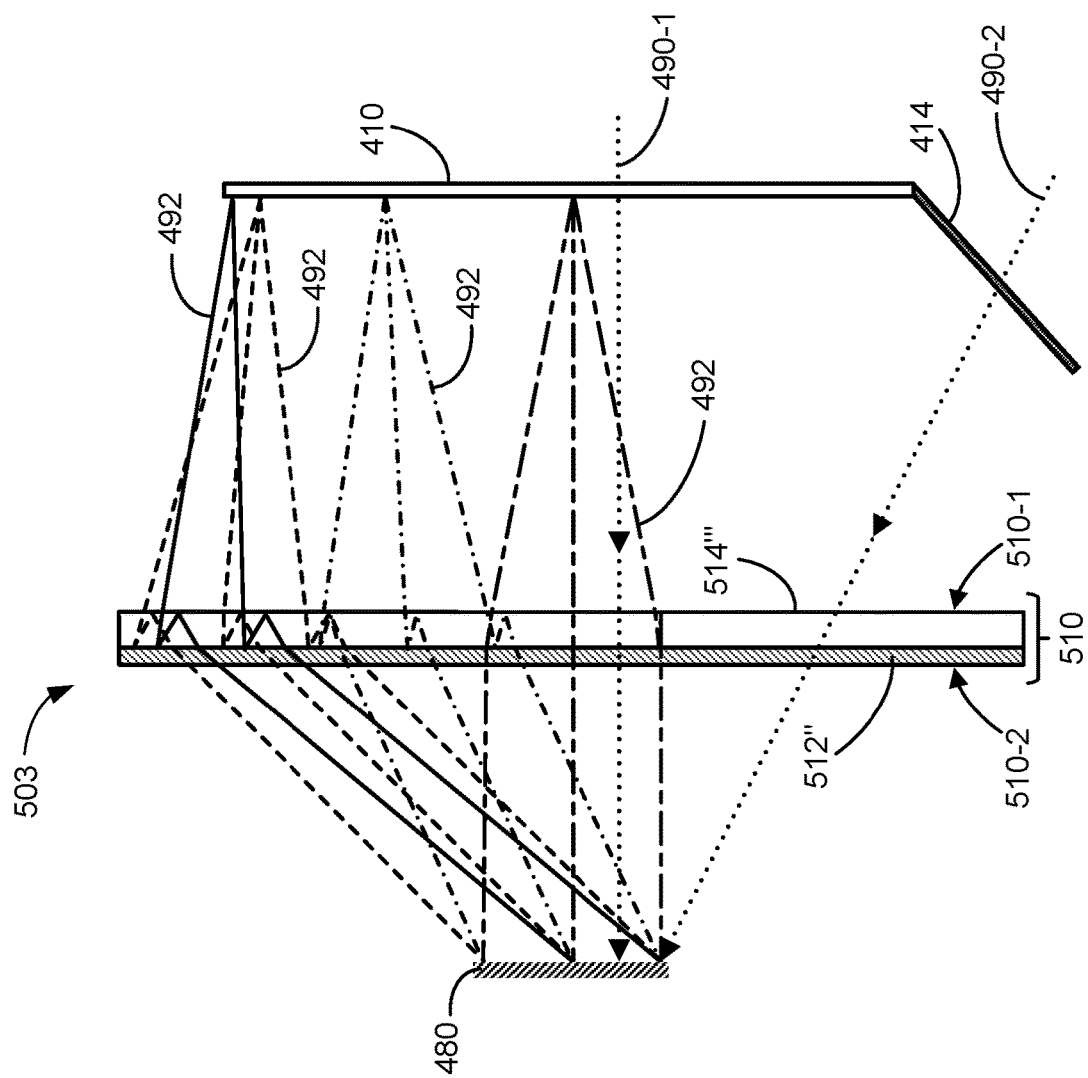
FIGS. 5L-5M are schematic diagrams illustrating an optical assembly including a polarization sensitive hologram in accordance with some embodiments.
Figure 5M:
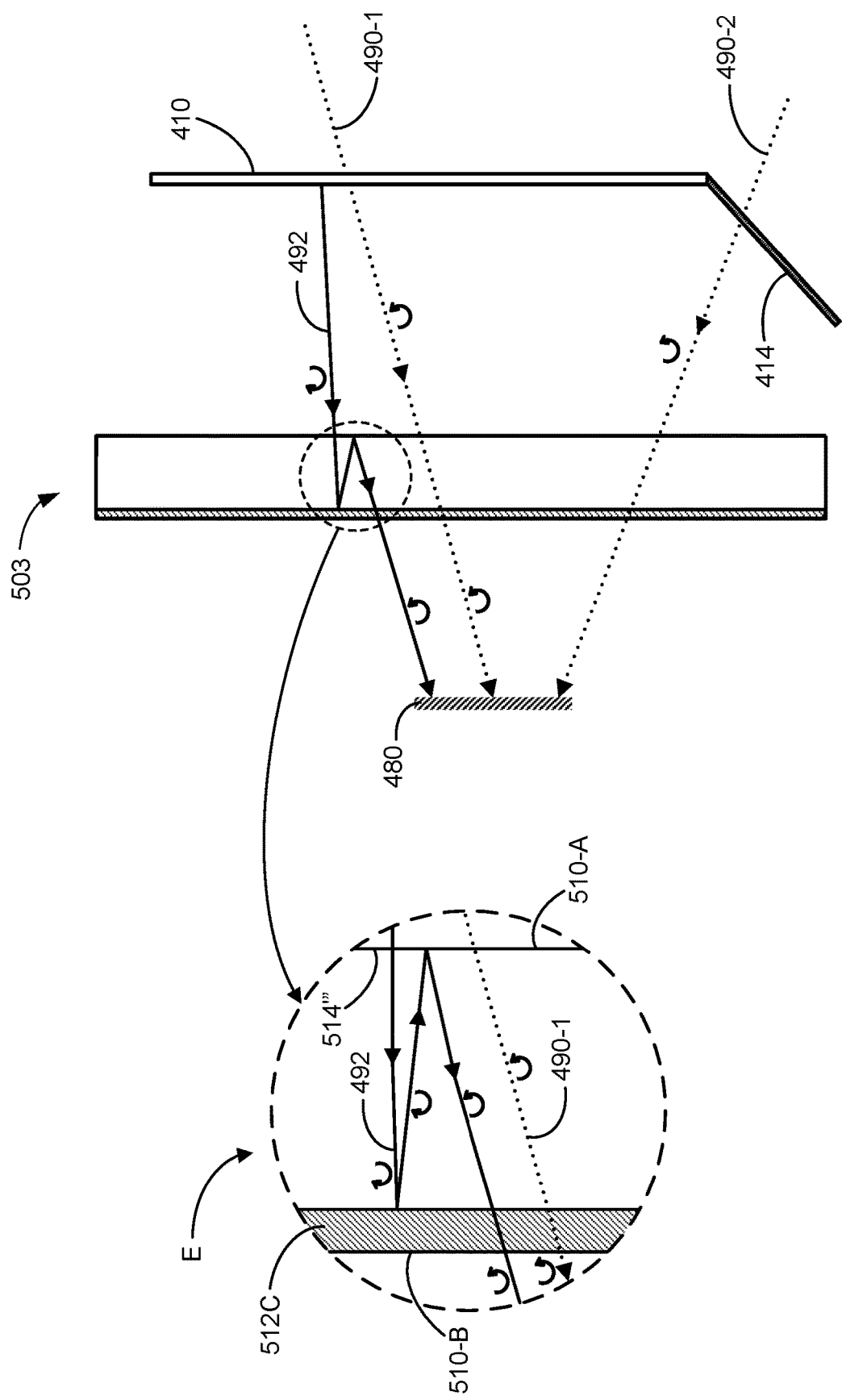

FIGS. 5L-5M are schematic diagrams illustrating optical assembly 503, corresponding to optical assembly 412, in accordance with some embodiments. Similar to optical assembly 500, optical assembly 503 includes substrate 510 that has opposing surfaces 510-1 and 510-2 that are opposite to and substantially parallel (e.g., forming an angle between 89 degrees and 91 degrees) to one another. Optical assembly 503 also includes a reflector 512" and a beam splitter 514'''. The optical paths of image light 492 and ambient light 490-1 and 490-2 are illustrated in FIGS. 5L and 5M.

As shown in FIG. 5L, reflector 512" is disposed on surface 510-2 and includes a polarization sensitive hologram (PSH) 512C. The PSH 512C is configured to reflect light having a selected polarization (e.g., LCP) such that the light having the select polarization is output from surface 510-2 at the first optical power. The PSH 512C is also configured to transmit light having a different (e.g., orthogonal) polarization (e.g., RCP) such that the light having polarization different from the selected polarization is output from optical assembly 503 at the second optical power. Beam splitter 514 is disposed on surface 510-1. As shown, beam splitter 514''' follows the surface profile of surface 510-1 and does not include any Fresnel structures. When image light is transmitted through optical assembly 503, the PSH 512C of reflector 512" contributes to the first optical power.

Referring to FIG. 5M, inset E shows the optical paths of image light 492, ambient light 490-1 and 490-2 and their respective polarizations along their respective optical paths.

Referring to the optical paths of image light 492, beam splitter 514''', disposed on surface 510-1, is configured to receive image light 492 having the first polarization (e.g., LCP) and to transmit a first portion of image light 492 towards reflector 512". Reflector 512" is configured to receive the first portion of image light 492 and reflect the first portion of image light 492 having the first polarization towards beam splitter 514''' at the first optical power. Beam splitter 514''' is configured to receive the first portion of image light 492 having the first polarization and reflect a second portion of image light 492 having the second polarization (e.g., RCP) toward reflector 512". Reflector 512" is configured to transmit the second portion of image light 492 such that the second portion of image light 492 is output from surface 510-2 at the first optical power.

Referring to the optical path of ambient light 490-1 and 490-2, surface 510-1 is configured to receive ambient light 490-1 and 490-2 having the second polarization (e.g., RCP) and to transmit a first portion of ambient light 490-1 and 490-2 towards reflector 512". Reflector 512" is configured to transmit the first portion of ambient light 490-1 and 490-2 such that the first portion of ambient light 490-1 and 490-2 is output from optical assembly 503 at the second optical power.

Figure 5N:
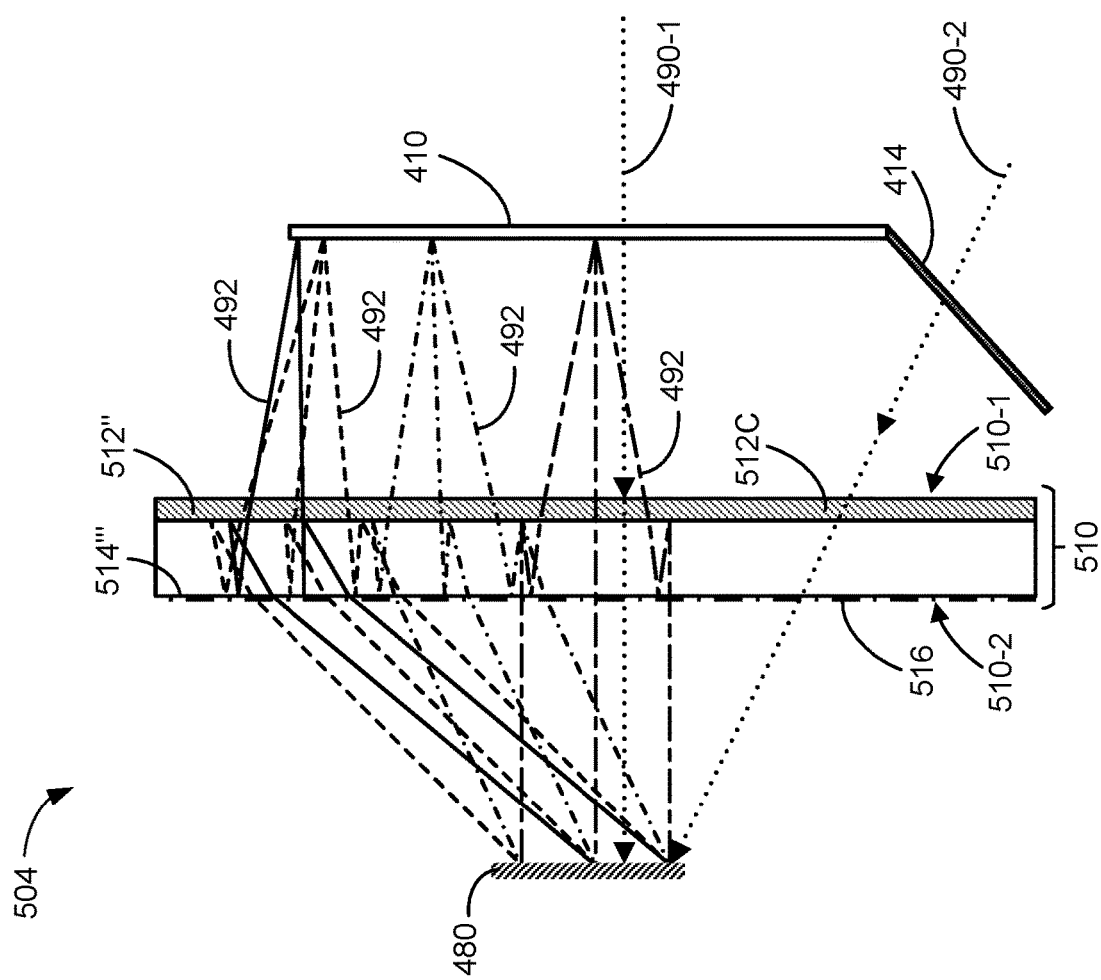
FIG. 5N-5O are schematic diagrams illustrating an optical assembly including a polarization sensitive hologram in accordance with some embodiments.
Figure 5O:
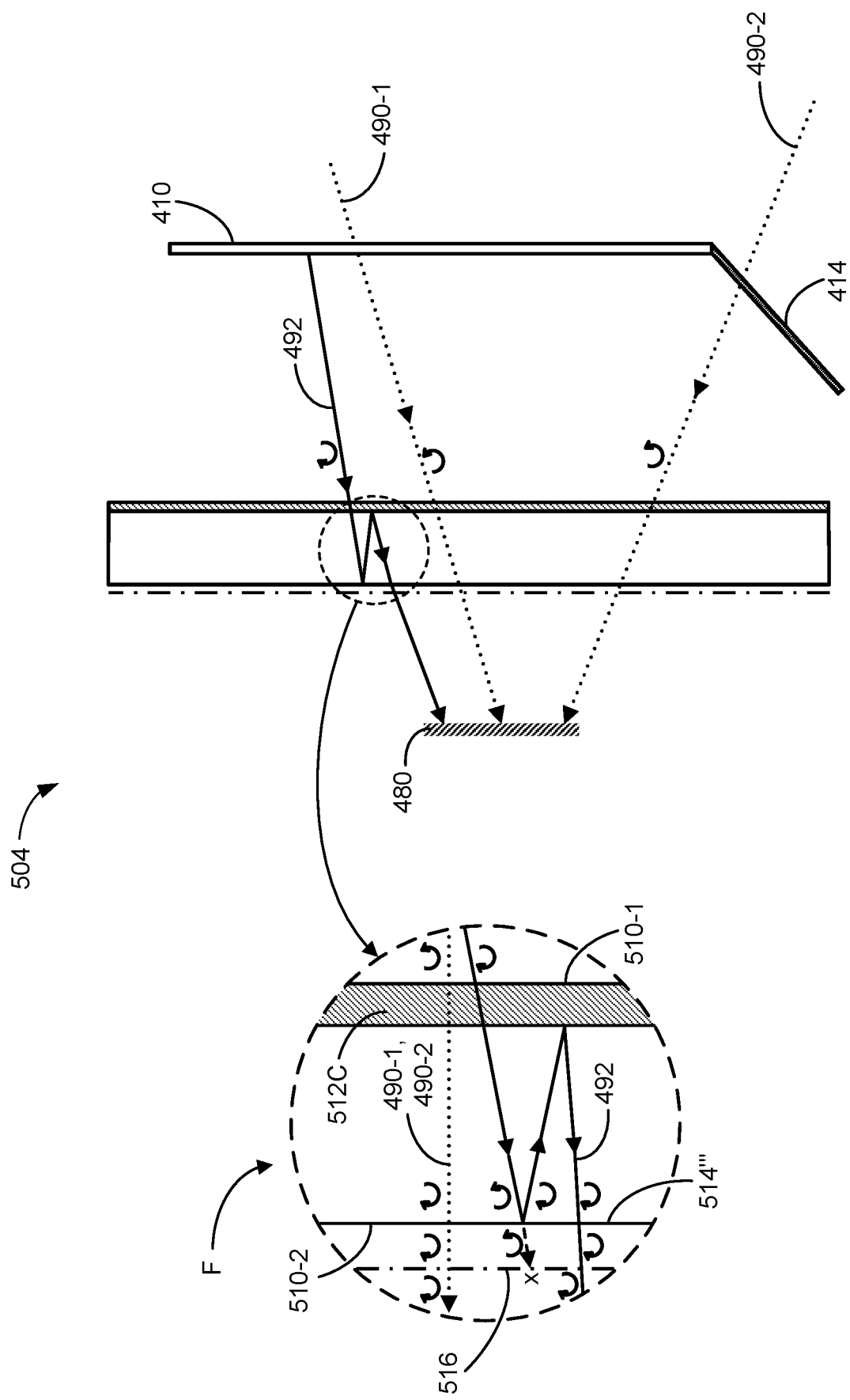

FIGS. 5N-5O are schematic diagrams illustrating optical assembly 504 in accordance with some embodiments. Similar to optical assembly 503, optical assembly 504 includes substrate 510 that has opposing surfaces 510-1 and 510-2 that are substantially parallel (e.g., forming an angle between 89 degrees and 91 degrees) to one another. Optical assembly 504 also includes reflector 512", beam splitter 514''', and a clean-up polarizer 516. As shown, clean-up polarizer 516 is adjacent to surface 510-2. In some cases, clean-up polarizer may be disposed on surface 510-2. The optical paths of image light 492 and ambient light 490-1 and 490-2 are illustrated in FIGS. 5N and 5O.

Similar to optical assembly 503, reflector 512" includes PSH 512C, details of which are described above with respect to FIG. 5L and not repeated here for brevity. As shown, reflector 512" is disposed on surface 510-1 and beam splitter 514 is disposed on surface 510-2 and does not include any Fresnel structures. Thus, beam splitter 514''' follows the surface profile of surface 510-1. When image light is transmitted through optical assembly 504, PSH 512C of reflector 512" contributes to the first optical power.

Referring to FIG. 5O, inset F shows the optical paths of image light 492, ambient light 490-1 and 490-2 and their respective polarizations along their respective optical paths.

Referring to the optical path of image light 492, reflector 512" is configured to receive image light 492 having the first polarization (e.g., LCP) and to transmit image light 492 towards beam splitter 514''' while converting the image light 492 to the second polarization (e.g., RCP). Beam splitter 514''' is configured to receive image light 492 having the second polarization and reflect a first portion of image light 492 having a first polarization towards reflector 512". Reflector 512" is configured to reflect the first portion of image light 492 toward beam splitter 514''' at a first optical power and without change in polarization. Beam splitter 514''' is configured to receive the first portion of image light 492 having the first polarization and to transmit a third portion of image light 492 such that the third portion of image light 492 is output from optical assembly 504 at the first optical power. Clean-up polarizer 516, disposed on or adjacent to surface 510-2, is configured to receive any light transmitted through beam splitter 514''', including but not limited to the third portion of image light 492, and to transmit light having the first polarization while blocking light having a polarization that is different from the first polarization from being transmitted towards eyebox 480.

Referring to the optical path of ambient light 490-1 and 490-2, reflector 512" is configured to receive ambient light 490-1 and 490-2 having the second polarization and to transmit ambient light 490-1 and 490-2 towards beam splitter 514''' while converting ambient light 490-1 and 490-2 to the first polarization. Beam splitter 514''' is configured to transmit a first portion of ambient light 490-1 and 490-2 such that the first portion of ambient light 490-1 and 490-2 having the first polarization is output from optical assembly 504 at the second optical power.

Figure 6B:
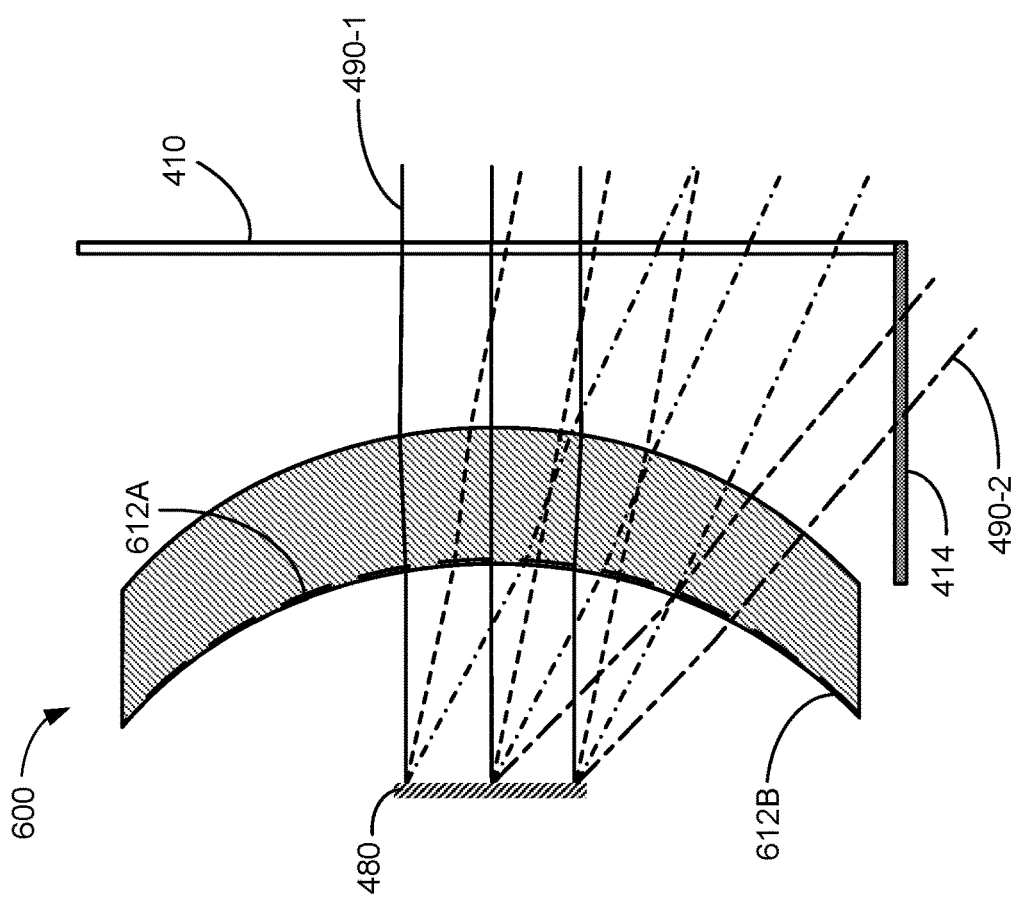
FIG. 6A-6C are schematic diagrams illustrating an optical assembly including curved surfaces in accordance with some embodiments.
Figure 6A:
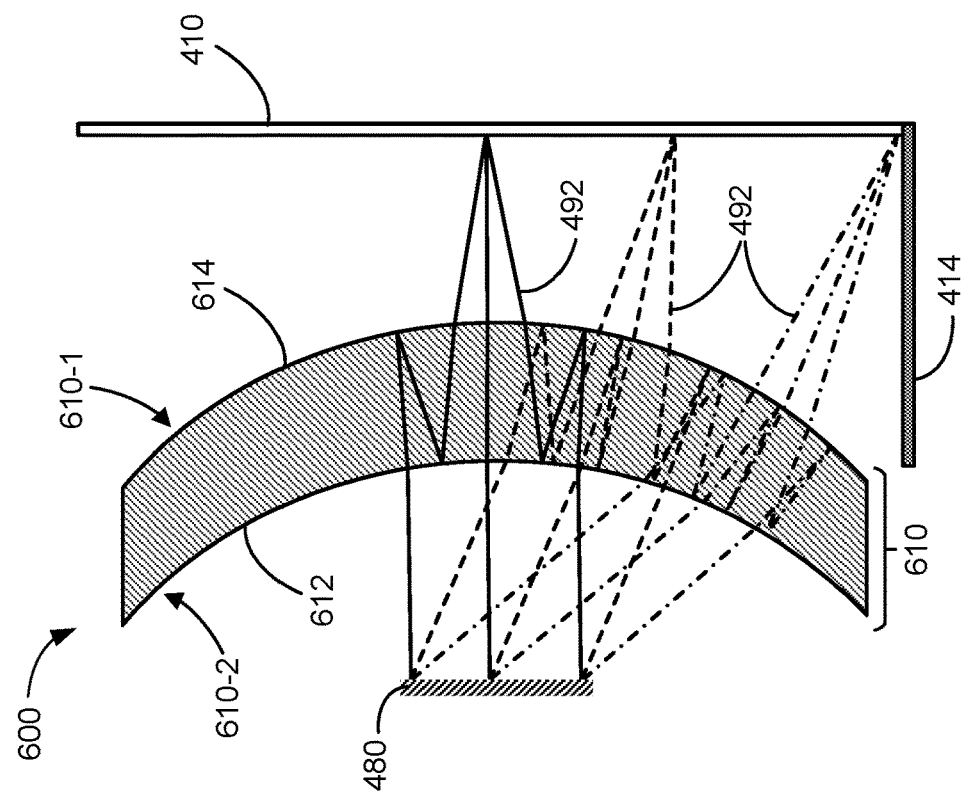
Figure 6C:
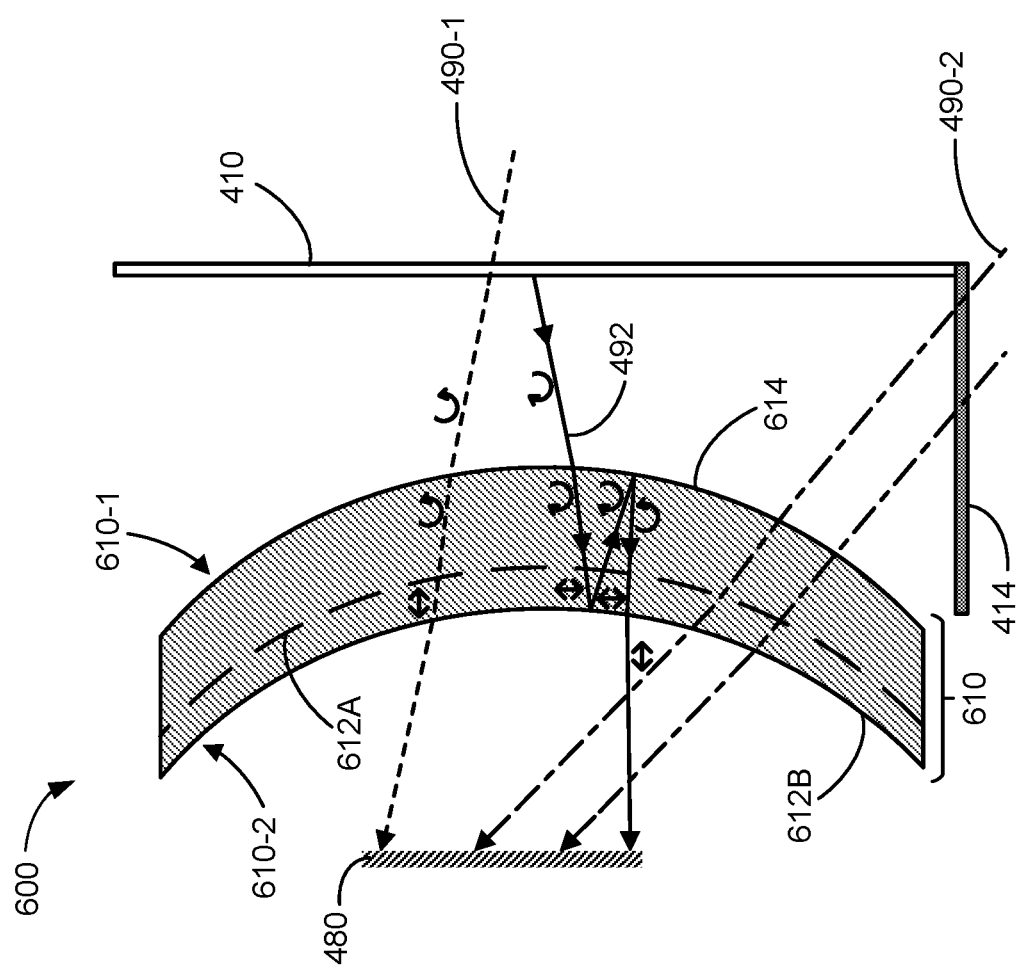

FIG. 6A-6C illustrate optical assembly 600, corresponding to optical assembly 412, in accordance with some embodiments. Optical assembly 600 includes opposing curved surfaces 610-1 and 610-2 that are substantially parallel (e.g., forming an angle between 89 degrees and 91 degrees) with one another. As shown, curved surfaces 610-1 and 610-2 each have a curved profile. Optical assembly 600 also includes a reflector 612 and a beam splitter 614. Reflector 612 is disposed on curved surface 610-2 and conforms with the curved profile of curved surface 610-2. Beam splitter 614 is disposed on curved surface 610-1 and conforms with the curved profile of curved surface 610-1. Beam splitter 614 corresponds to (e.g., is the same as) beam splitter 514''' and thus operation of beam splitter 614 is not repeated here for brevity. In some embodiments, the curved profiles of curved surfaces 610-1 and 610-2 are concentric spherical profiles. In some embodiments, curved surfaces 610-1 and 610-2 have the same curvature. In some embodiments, substrate 610 has a substantially uniform thickness.

As shown in FIGS. 6A and 6B, optical assembly 600 is configured to image light 492 at the first optical power and to transmit ambient light 490-1 and ambient light 490-2 at the second optical power. In some embodiments, the first optical power is dependent on the curvature of the reflective polarizer 612B and beam splitter 614. FIG. 6A illustrates the optical path of image light 492 from both a central region and a peripheral region of display 410. FIG. 6B illustrates optical paths of image light 492-C output from a central portion and transmitted through a central portion of optical assembly 600 (e.g., corresponding to central portion 412-C of optical assembly 412) and image light 492-P output from a peripheral portion of display 410 and transmitted through a peripheral portion of optical assembly 600 (e.g., a corresponding to peripheral portion 412-P of optical assembly 412). As shown, image light 492-C and 492-P (collectively and individually referred to herein as image light 492) is received at curved surface 610-1 and goes through folded optical paths including reflection at the reflector 612 and reflection at the beam splitter 614 before being output from curved surface 610-2 (e.g., the optical paths of the image light 492 includes one or more folds). As shown in FIG. 6B, ambient light 490-1, transmitted through display 410 and the central portion of optical assembly 600, and ambient light 490-2, transmitted through switchable window 414 and the peripheral portion of optical assembly 600, have optical paths that do not include any folds. As shown, ambient light 490-1 and 490-2 are transmitted through the beam splitter 614 and the reflector 612 without reflection at the beam splitter 614 and the reflector 612.

As shown in FIG. 6A, reflector 612 includes a reflective polarizer 612B (e.g., a polarization sensitive reflector) and an optical retarder 612A (e.g., a quarter-wave plate). Reflective polarizer 612B corresponds to (e.g., is the same as) reflective polarizer 512B and thus operation of reflective polarizer 612B is not repeated here for brevity. In some embodiments, optical retarder 612A and reflective polarizer 612B are separate from one another, as shown. Alternatively, optical retarder 612A and reflective polarizer 612B may be two layers of optical coatings that are stacked or laminated on curved surface 610-2.

FIG. 6C illustrates the optical paths of the image light 492 and the ambient light 490-1 and 490-2 in optical assembly 600 and their respective polarizations along their respective optical paths, which are the same as the respective optical paths and polarizations described above with respect to optical assembly 500 and thus are not repeated here for brevity. Optical retarder 612A is shown spaced apart in FIG. 6C for ease of illustration.

As described above, each of optical assemblies 500-504 and 600 include a beam splitter (e.g., beam splitters 514, 514', 514", 514''', and 614) that is configured to transmit at least a first portion of incident light and reflect at least a second portion of the incident light. For example, for an optical assembly that includes a beam splitter that provides 50% reflection and 50% transmission, image light 492 transmitted through the optical assembly would lose 75% of its intensity (e.g., 50% loss when the image light 492 is first transmitted through the beam splitter and another 50% loss when the transmitted portion of the image light is reflected at the beam splitter) before being output from the optical assembly. Ambient light 490-1 or 490-2, transmitted through the same optical assembly, would also lose 50% of its intensity before being output from the optical assembly. In order to increase the efficiency of the optical assembly and reduce optical loss, the beam splitter of an optical assembly may be replaced by a volume Bragg grating (VBG) 714, shown in FIG. 7A.

Figure 7A:
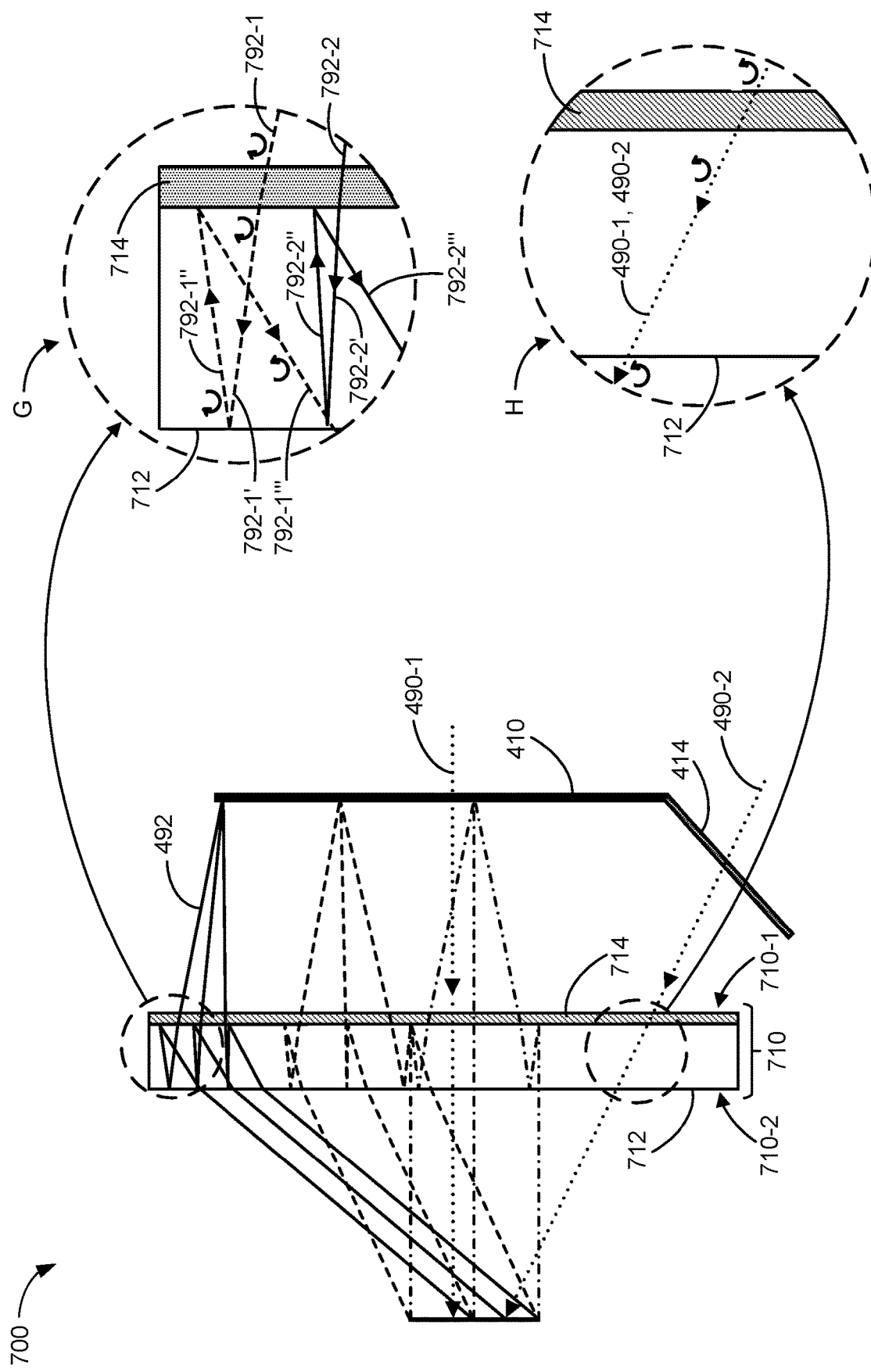
FIG. 7A is a schematic diagram illustrating an optical assembly including a volume Bragg grating in accordance with some embodiments.
Figure 7B:
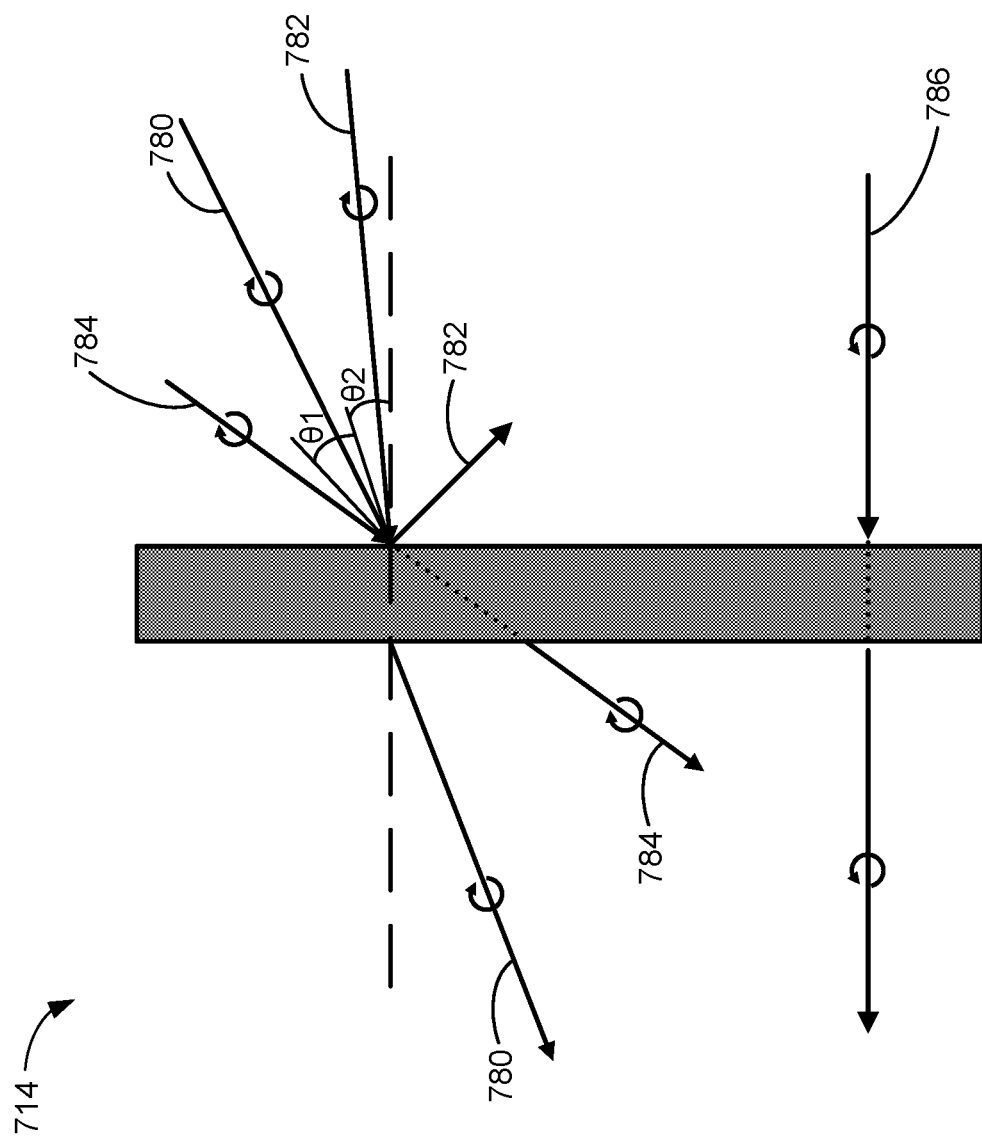
FIGS. 7B and 7C are schematic diagrams illustrating a volume Bragg grating in accordance with some embodiments.
Figure 7C:
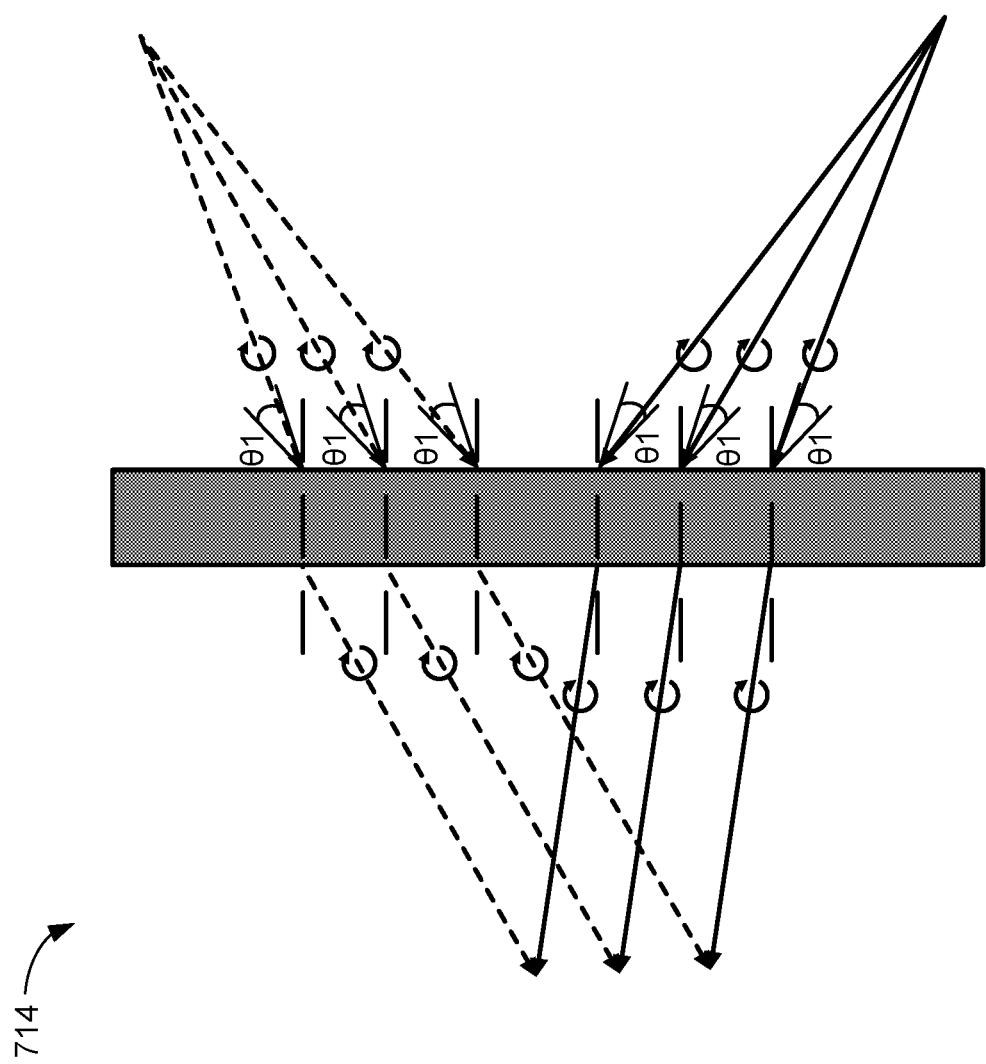

FIG. 7A is a schematic diagram illustrating an optical assembly 700, which is similar to optical assembly 412 and any of optical assemblies 500-504 and 600 except that optical assembly 700 includes a VBG 714 in place of beam splitters included in optical assemblies 500-504 and 600. As shown, optical assembly 700 includes substrate 710, corresponding to any of substrates 510 and 610, and having surfaces 710-1 and 710-2. Optical assembly 700 also includes reflector 712 that corresponds to any of reflectors 512, 512', 512", and 612, and VBG 714 in place of any of beam splitters 514, 514', 514", 514''', and 614. Details regarding substrate 710 and reflector 712 are not repeated here for brevity. FIG. 7A shows VBG 714 as being disposed on surface 710-1. However, VBG 714 may be coupled to substrate 710 in any manner such as disposed on surface 710-1, disposed on surface 710-2 (shown in FIG. 7E), or disposed between surfaces 710-1 and 710-2. VBG 714 is configured to be polarization and angular selective. For example, as shown in FIG. 7B, VBG 714 is configured to transmit and redirect (e.g., diffract) light 780 having the first polarization (e.g., LCP) and incident upon VBG 714 within a first predetermined angular range θ1. VBG 714 is also configured to reflect and redirect light 782 having the first polarization and incident upon VBG 714 within a second predetermined angular range θ2. Light 784 having the first polarization that is incident upon VBG 714 at an incident angle that is outside both the predetermined first angular range θ1 and the predetermined second angular range θ1, and light 786 having the second polarization (e.g., RCP), regardless of the incident angle of the light, are transmitted through VBG 714 without change in direction or polarization. Further, VBG 714 may also be designed to redirect (e.g., diffract) light in different diffraction orders depending where on VBG 714 the light is incident. For example, as shown in FIG. 7C, VBG 714 may have an optical profile that substantially collimates diverging light having the first polarization that is incident upon VBG with incident angles that are within the first predetermined angular range.

As shown, display 410 is configured to output image light 492 toward optical assembly 700 and optical assembly 700 is configured to transmit the image light 492 in an optical path that includes a reflection at reflector 712 and a reflection at VBG 714. Optical assembly 700 is also configured to receive and transmit ambient light 490-1 and 490-2 in an optical path that does not include reflection at either reflector 712 or VBG 714.

Referring to inset G, rays 792-1 to 792-1''' illustrate an optical path of image light 492. As shown, ray 792-1 has the first polarization and is incident upon VBG 714 at an incident angle that is within the first predetermined angle (e.g., an acceptance angle range). Thus, ray 792-1 is transmitted through and redirected by VBG 714 as ray 792-1' propagating in a direction that is different from a direction of propagation of ray 792-1. Ray 792-1' is reflected at reflector 712 as ray 792-1". Ray 791-1", incident upon VBG 714 with an incident angle that is within the second predetermined angular range (e.g., outside the acceptance angle range), is reflected and redirected by VBG 714 as ray 792-1''' having the second polarization (e.g., RCP). Ray 792-1''' is transmitted through reflector 712. Rays 792-2 to 792-2''' follow a similar optical path as described with respect to rays 792-1 to 792-1'''. However, since rays 792-2 and 792-2" are incident upon VBG 714 at a different location compared to rays 792-1 and 792-1", rays 792-2 and 792-2" are redirected in a different direction compared to rays 792-1 and 792-1" such that both rays 792-1''' and 792-2''' are substantially parallel (e.g., forming an angle that is less than 5 degrees) to one another as they exit the optical assembly 700.

Referring to inset H, ambient light 490-1 and 490-2 having the second polarization are transmitted through optical assembly 700 (including reflector 712 and VBG 714) without change in direction.

VBG 714 may include one or more VBG layers. For example, VBG 714 may include a plurality of VBG layers, and each VBG layer has a different acceptance angle range so that VBG 714 with the plurality of VBG has an acceptance angle range that is greater than an acceptance angle range of a single VBG layer (or VBG 714 that includes a single VBG layer). Thus, an optical assembly 700 that includes VBG 714 that has a plurality of VBG layers may accommodate a wider range of pupil sizes and a wider range of gaze angles compared to an optical assembly 700 that includes a VBG 714 with a single VBG layer.

Figure 7D:
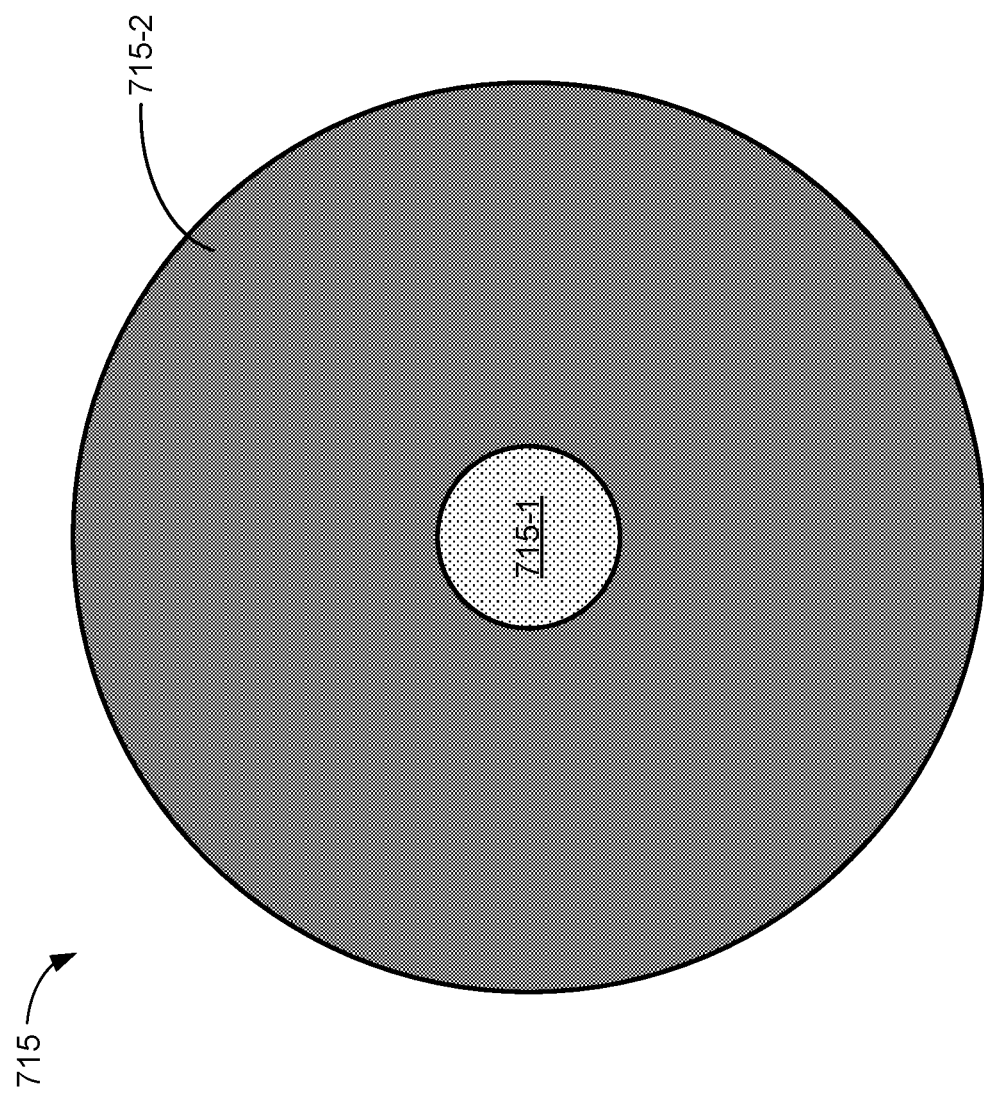
FIG. 7D is a schematic diagram illustrating a hybrid optical element in accordance with some embodiments.

In some embodiments, a hybrid optical element 715 shown in FIG. 7D is used in optical assembly 700 in place of the VBG 714. In some embodiments, hybrid optical element 715 has a shape of a disk, and FIG. 7D illustrates a front view of hybrid optical element 715. The hybrid optical element 715 includes a central portion 715-1 and a peripheral portion 715-2 that surrounds the central portion 715-1. The central portion 715-1 includes a beam splitter that is configured to split the beam (e.g., a partial reflector that reflects a portion of incident light and transmits a portion of the incident light, which in some cases operates independent of the polarization of the incident light, such as a 50/50 mirror) and the peripheral portion 715-2 includes a VBG that is configured to selectively transmit or reflect light based on polarization and/or incident angle. In some embodiments, the central portion 715-1 includes a coating that includes a partial reflector and the peripheral portion 715-2 includes a coating that includes one or more VBG layers. In some embodiments, the transition between the beam splitter in the central portion 715-1 and the VBG in the peripheral portion 715-2 is abrupt. In some embodiments, the transition between the beam splitter in the central portion 715-1 and the VBG in the peripheral portion 715-2 is continuous. In some embodiments, the hybrid optical element 715 has a surface that is smooth and continuous.

Figure 7E:
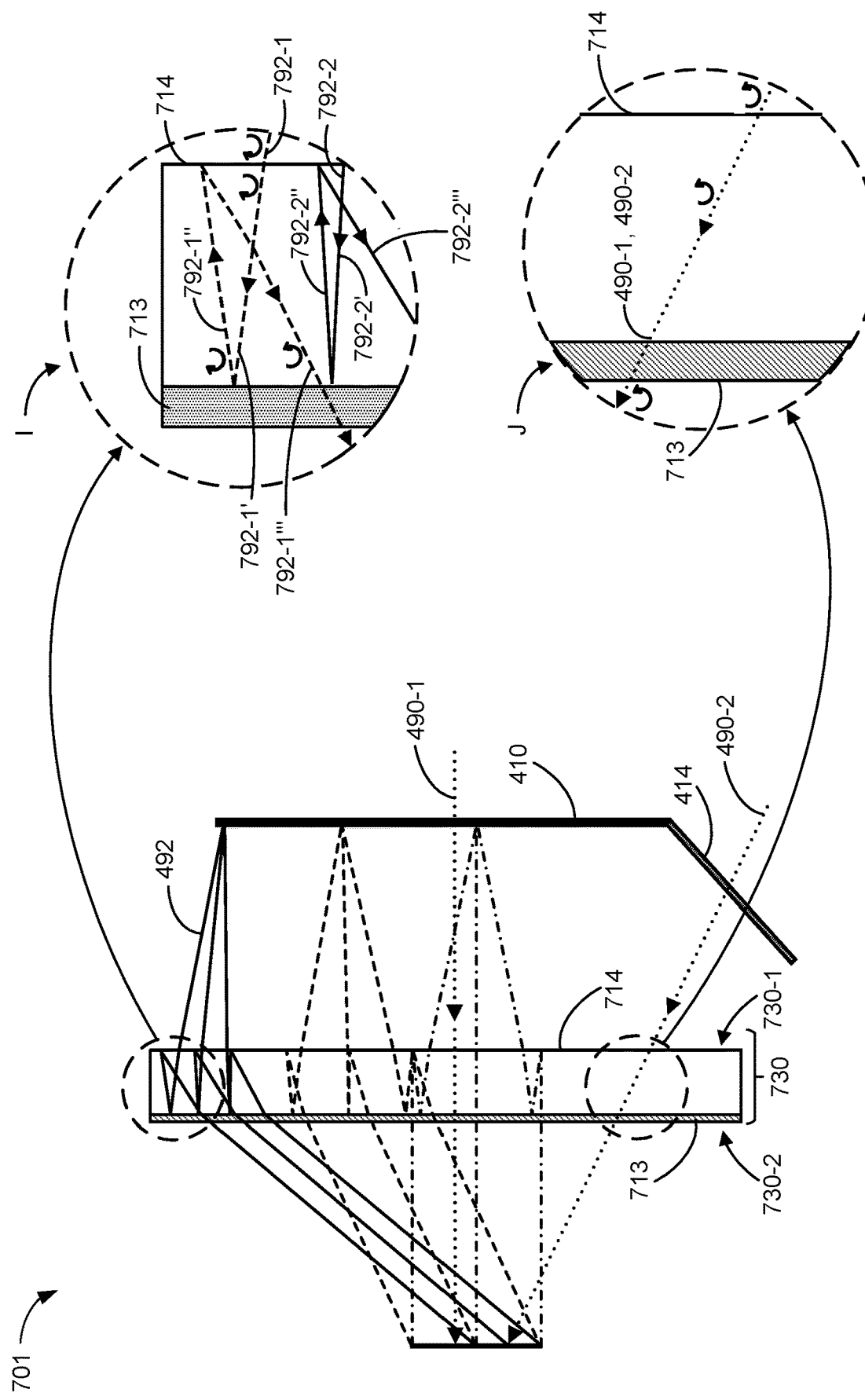
FIG. 7E is a schematic diagram illustrating an optical assembly including a volume Bragg grating in accordance with some embodiments.

FIG. 7E is a schematic diagram illustrating an optical assembly 701, which is similar to optical assembly 700, except that optical assembly includes a VBG 713 in place of a reflector 712. As shown, optical assembly 701 includes substrate 730, corresponding to any of substrates 510, 610 and 710, and substrate 730 has surfaces 730-1 and 730-2. Optical assembly 701 also includes a beam splitter 716 that may correspond to any of beam splitters 514, 514', 514", 514''', and 614. Details regarding substrate 730, reflector 712, and beam splitter 716 are not repeated here for brevity. In some embodiments, VBG 713 is configured to be polarization and angular selective, details of which are described above with respect to FIG. 7A. The optical path of image light (e.g., light 792-1 through 792-1''' and light 792-2 through 792-2''') is shown in inset I and the optical path of ambient light 490-1 and 490-2 is shown in inset J.

While the optical assemblies above, including optical assemblies 412, 500-504, 600, and 700, illustrate a reflector and a beam splitter disposed on surfaces of a same substrate, in some embodiments, the reflector and the beam splitter may be disposed on surfaces of different (e.g., distinct) substrates. For example, optical assembly 412, shown below in FIG. 8A, includes two distinct substrates 412-1 and 412-2. The beam splitter may be disposed on a surface of substrate 412-2 and the reflector may be disposed on a surface of substrate 412-2.

The optical assemblies described above, including optical assemblies 412, 500-504, 600, and 700, can be used as part of a display device, such as display device 400. Such a display device can be used in augmented reality (AR) applications where displayed images are blended with the real world environment. In order to blend images displayed by image light and images from the real world transmitted by ambient light, a display device can have either time-simultaneous operation where the image light and the ambient light are concurrently transmitted in the display device, or time-sequential operation where the display device switches between displaying the image light and transmitting the ambient light. FIGS. 8A-8B and 9A-9D illustrate time-simultaneous and time-sequential operation of a display device, respectively.

Figure 8A:
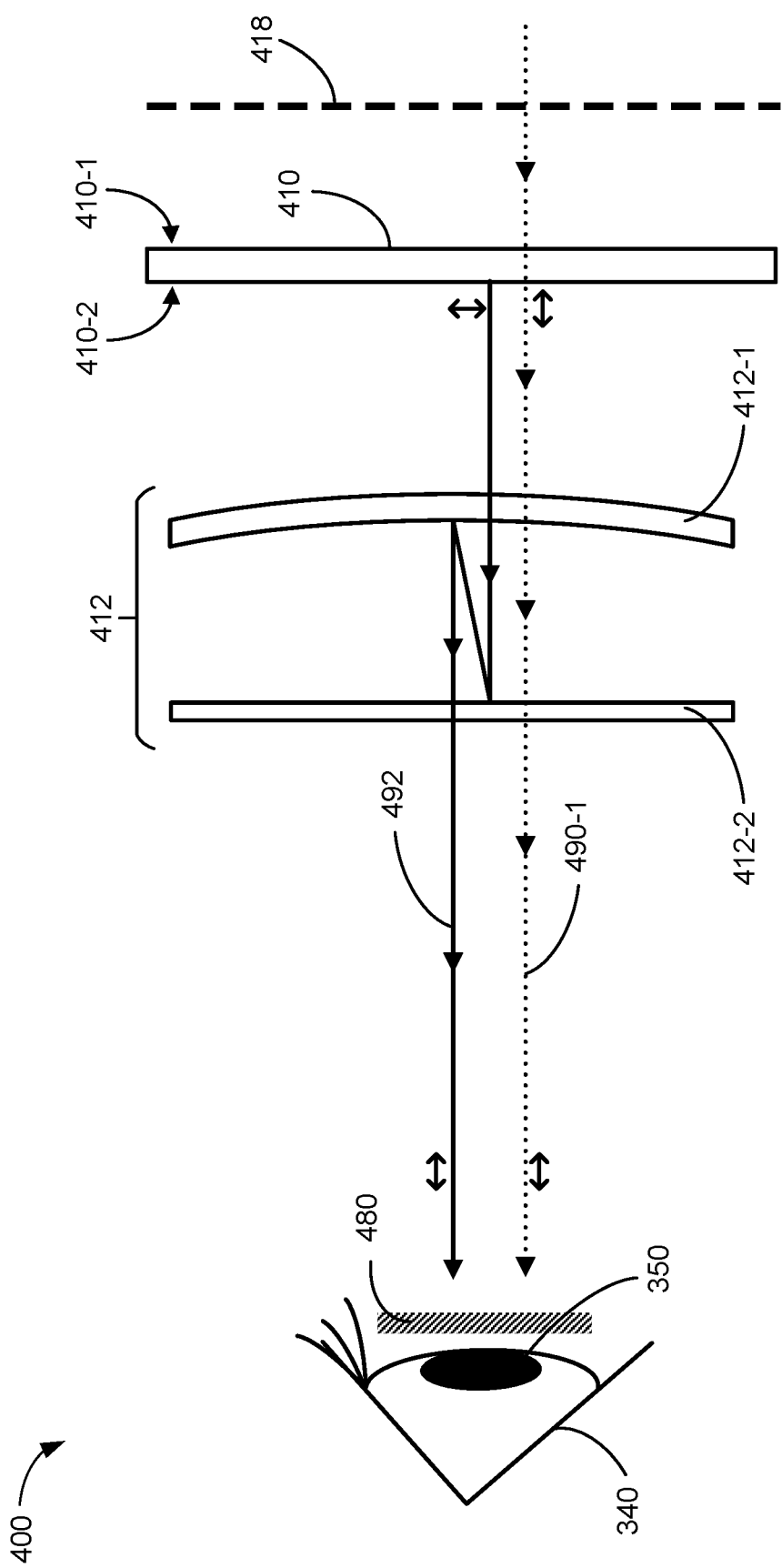
FIGS. 8A-8B are schematic diagrams illustrating time-simultaneous operation of a display device in accordance with some embodiments.
Figure 8B:
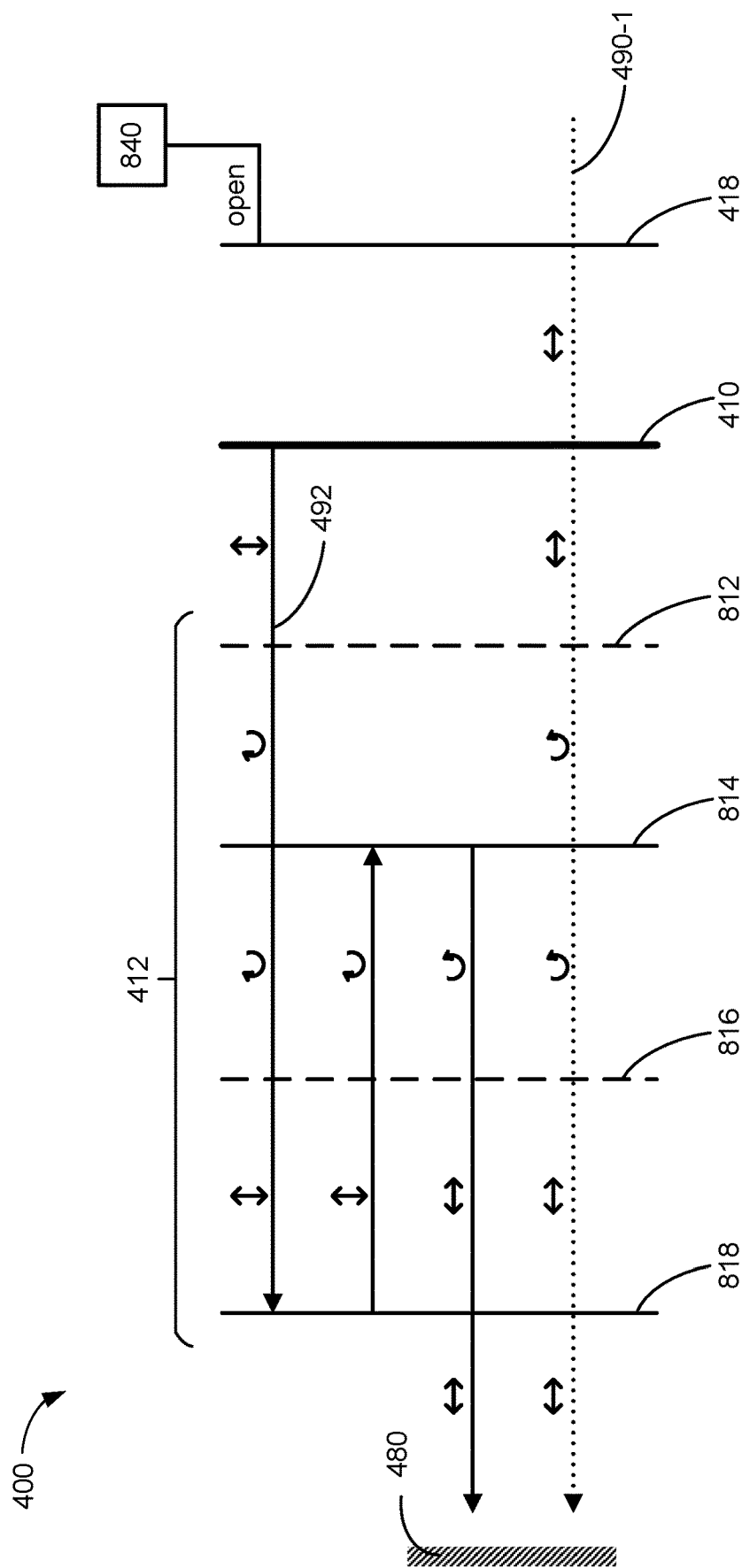

FIGS. 8A-8B are schematic diagrams illustrating time-simultaneous operation of a display device 400 in accordance with some embodiments. As described above, with respect to FIGS. 4A-4B, display device 400 includes display 410, optical assembly 412, and optionally, shutter assembly 418. Shutter assembly 418, when present, is configured to selectively transmit ambient light 490-1. Display 410 is a transparent display that has opposing surfaces 410-1 and 410-2. Display 410 is an emissive display (shown in FIG. 4C) that is configured to output image light 492 from surface 410-2 and transmit the ambient light 490-1 from surface 410-1 to surface 410-2. As shown, optical assembly is configured to transmit the image light 492 in a first optical path and transmit the ambient light 490-1 in a second optical path that is different from the first optical path. Optical assembly 412 may be any of optical assemblies 500-504 and 600, and details regarding the optical paths of image light 492 and ambient light 490-1 are provided above with respect to the respective optical assemblies. In time-simultaneous operation of display device 400, as shown in FIGS. 8A-8B, the image light 492 and the ambient light 490-1 are concurrently (e.g., simultaneously) transmitted through optical assembly 412 towards eyebox 480.

FIG. 8B illustrates the optical paths of the image light 492 and the ambient light 490-1 in display device 400 and their respective polarizations along their respective optical paths.

As shown, in FIG. 8B, optical assembly 412 includes optical retarders 812 and 816 (e.g., quarter-wave plates), a beam splitter 814 (corresponding to any of beam splitters 514, 514", 514''', and 614), and a reflector 818 (corresponding to any of reflectors 512, 512", and 612). Display 410 is configured to output image light 492 having the third polarization (e.g., first linear polarization) toward optical assembly 412. In some embodiments, display 410 includes a linear polarizer, allowing the image light 492 to be output from the display 410 with a linear polarization. Optical retarder 812 is configured to receive the image light 492, output from the display 410, and transmit the image light 492 while converting the polarization of the image light 492 from the third polarization to the second polarization (e.g., LCP). Beam splitter 814 is configured to transmit a first portion of the image light 492 toward optical retarder 816. Optical retarder 816 is configured to receive the first portion of the image light 492 and transmit the first portion of image light 492 while converting the polarization of the first portion of the image light 492 to the third polarization. The reflector 818 is configured to receive the first portion of the image light 492, transmitted through optical retarder 816, and reflect the first portion of the image light 492 back towards optical retarder 816. Optical retarder 816 is configured to receive the first portion of the image light 492, reflected from reflector 818, and transmit the first portion of image light 492 while converting the polarization of the first portion of the image light 492 from the third polarization to the second polarization. Beam splitter 814 is configured to receive the first portion of the image light 492 having the second polarization and reflect a second portion of the image light 492, having the first polarization (e.g., RCP), toward optical retarder 816. Optical retarder 816 is configured to transmit the second portion of the image light 492 toward reflector 818 while converting the polarization of the second portion of the image light 492 to the fourth polarization (e.g., second linear polarization). The reflector 818 is configured to transmit the second portion of the image light 492 such that the second portion of the image light 492 is output from optical assembly 412.

Referring to the optical path of ambient light 490-1, when the shutter assembly 418, shown here as being electrically coupled to controller 840, is configured to allow transmission of ambient light 490-1 (e.g., controller 840 controls shutter assembly 418 to be in an "open" state), the ambient light 490-1 is transmitted through shutter assembly 418. In some embodiments, shutter assembly 418 may include a linear polarizer such that the ambient light 490-1 output from shutter assembly 418 has a linear polarization. As shown, the ambient light 490-1 transmitted through shutter assembly 418 has the fourth polarization. The ambient light 490-1 is transmitted through display 410 and incident upon optical retarder 812. Optical retarder 812 is configured to transmit the ambient light 490-1 while converting the polarization of the ambient light 490-1 from the fourth polarization to the first polarization. Beam splitter 814 is configured transmit a first portion of ambient light 490-1 towards optical retarder 816. Optical retarder 816 is configured to transmit the first portion of ambient light 490-1 while converting the polarization of the first portion of the ambient light 490-1 to the fourth polarization. Reflector 818 is configured to transmit the first portion of the ambient light 490-1 having the fourth polarization such that the first portion of the ambient light 490-1 is output from optical assembly 412.

As shown in FIGS. 8A and 8B, the image light 492 is output from display 410 concurrently to the ambient light 490-1 being transmitted through display 410. Additionally, the image light 492 and the ambient light 490-1 are simultaneously transmitted through optical assembly 412 such that the second portion of the image light 492 and the first portion of the ambient light 490-1 are concurrently output from optical assembly 412.

FIGS. 9A-9D are schematic diagrams illustrating time-sequential operation of a display device 400 in accordance with some embodiments. Details regarding display device 400 are provided above with respect to FIGS. 4A-4B and 8A, and are not repeated here for brevity. In time-sequential operation of display device 400, display device alternates between a first mode, shown in FIG. 9A, where the image light 492 is transmitted through the display device 400 and a second mode, shown in FIG. 9B, where the ambient light 490-1 is transmitted through display device 400. In order to effectively blend the displayed image light 492 with the transmitted ambient light 490-1, display device alternates (e.g., switches) between the first mode and a second mode at a rate that is faster than a flicker fusion threshold (usually between 60 Hertz and 90 Hertz for most viewing conditions).

Figure 9A:
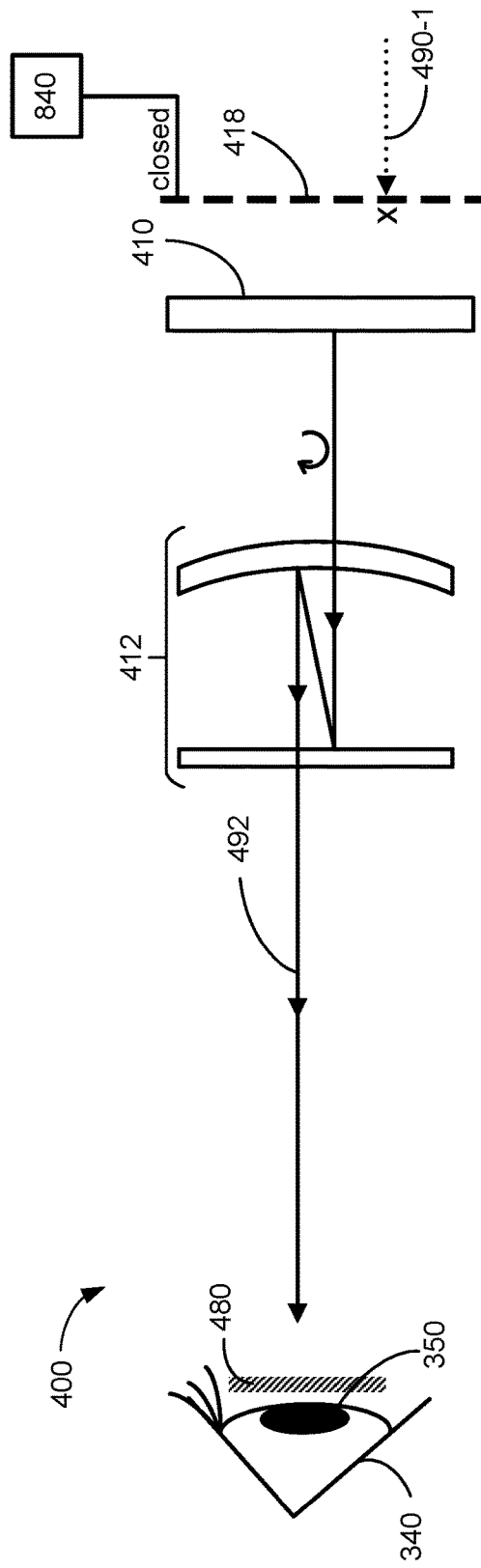
FIGS. 9A-9D are schematic diagrams illustrating time-sequential operation of a display device in accordance with some embodiments.

FIG. 9A illustrates operation of display device 400 in the first mode. As shown, shutter assembly 418, shown here as electrically coupled to control 840, is in a closed state that does not allow transmission of the ambient light 490-1 (e.g., the ambient light 490-1 is blocked from entering display device 400). Display 410 is configured to output image light 492 and optical assembly 412 is configured to transmit the image light 492 toward eyebox 480.

Figure 9B:
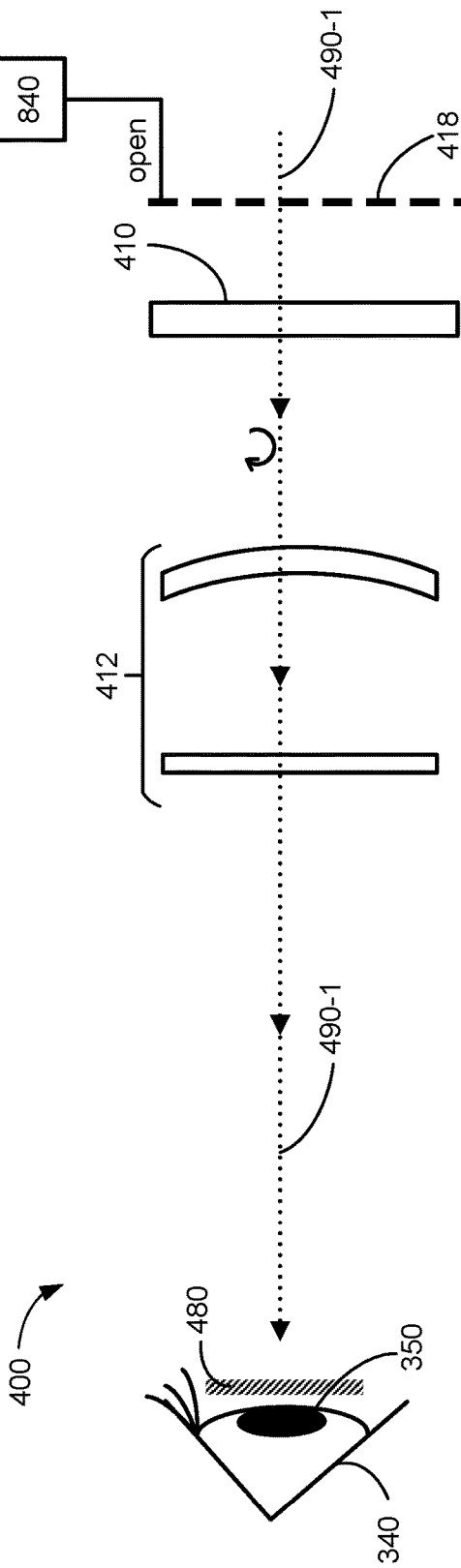

FIG. 9B illustrates operation of display device 400 in the second mode. As shown, shutter assembly 418 is in an open state that allows transmission of the ambient light 490-1. In this mode, display 410 is configured to transmit the ambient light 490-1 without outputting image light 492. Optical assembly 412 is configured to transmit the ambient light 490-1 toward eyebox 480.

Figure 9C:
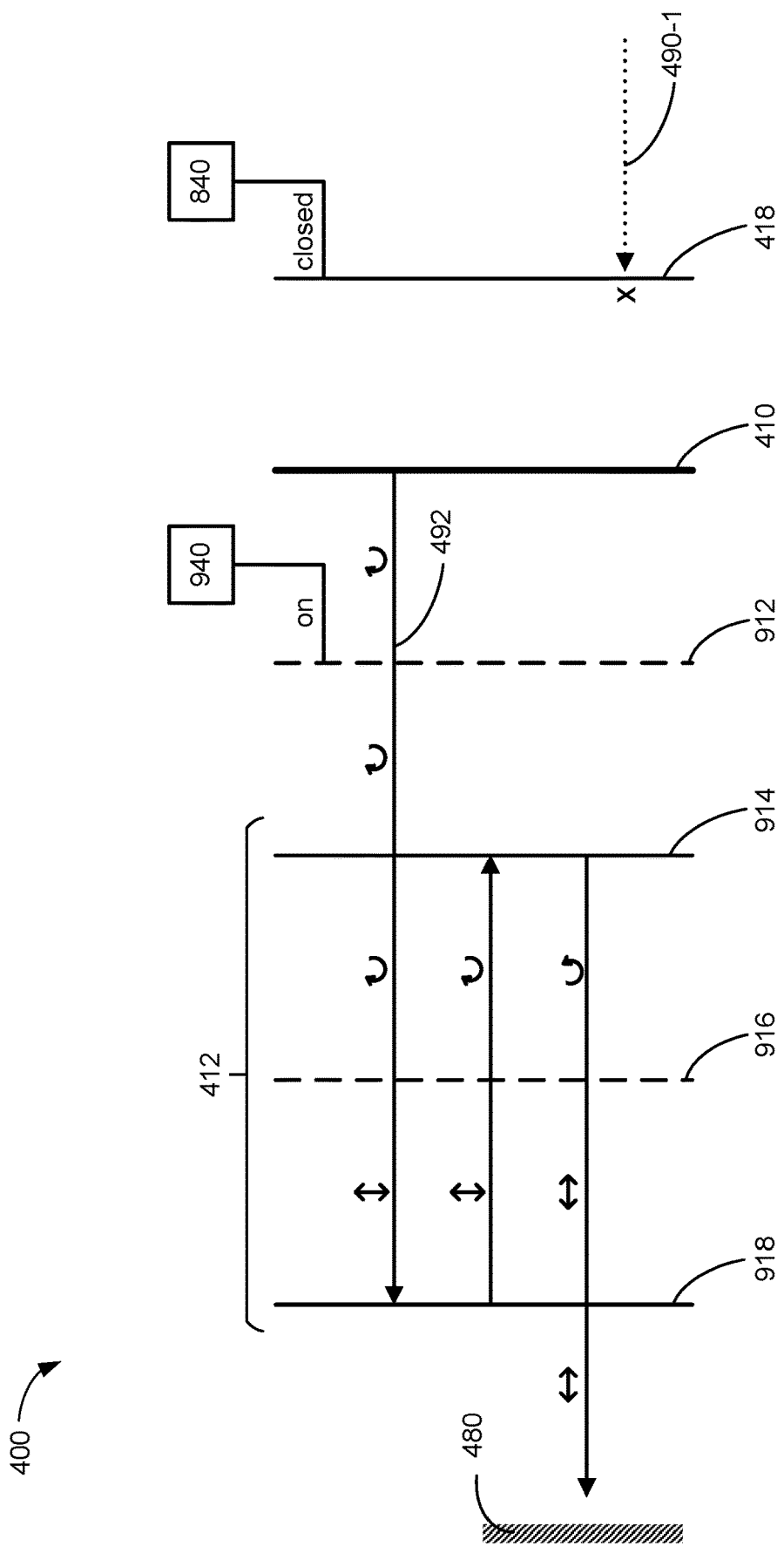

Details regarding the polarization of image light 492 propagating along an optical path in display device 400 when display device 400 is in the first mode are shown in FIG. 9C. As shown in FIG. 9C, optical assembly 412 includes a switchable optical retarder 912 (e.g., an active half-wave plate), a beam splitter 914 (corresponding to any of beam splitters 514, 514", 514"' and 614), an optical retarder 916 (e.g., quarter-wave plate), and a reflector 918 (corresponding to any of reflectors 512, 512", and 612). In the first mode, shutter assembly 418 is in the "closed" state and is configured to block transmission of ambient light 490-1. Display 410 is configured to output image light 492 having the second polarization (e.g., LCP) toward optical assembly 412. In some embodiments, display 410 includes a circular polarizer, allowing the image light 492 to be output from the display 410 with a circular polarization. Switchable optical retarder 912, shown here as electrically coupled to controller 940, is in the "off" state and is configured to transmit the image light 492 without changing the polarization of the image light 492. Beam splitter 914 is configured to receive the image light 492 and to transmit a first portion of the image light 492 toward optical retarder 916. Optical retarder 916 is configured to receive the first portion of the image light 492 and transmit the first portion of image light 492 while converting the polarization of the first portion of the image light 492 from the second polarization to the third polarization. The reflector 918 is configured to receive the first portion of the image light 492, transmitted through optical retarder 916, and reflect the first portion of the image light 492 back towards optical retarder 916. Optical retarder 916 is configured to receive the first portion of the image light 492, reflected from reflector 918, and transmit the first portion of image light 492 while converting the polarization of the first portion of the image light 492 from the third polarization to the second polarization. Beam splitter 914 is configured to receive the first portion of the image light 492 having the second polarization and reflect a second portion of the image light 492, having the first polarization (e.g., RCP), toward optical retarder 916. Optical retarder 916 is configured to transmit the second portion of the image light 492 toward reflector 918 while converting the polarization of the second portion of the image light 492 to the fourth polarization (e.g., second linear polarization). The reflector 918 is configured to transmit the second portion of the image light 492 such that the second portion of the image light 492 is output from optical assembly 412.

Figure 9D:
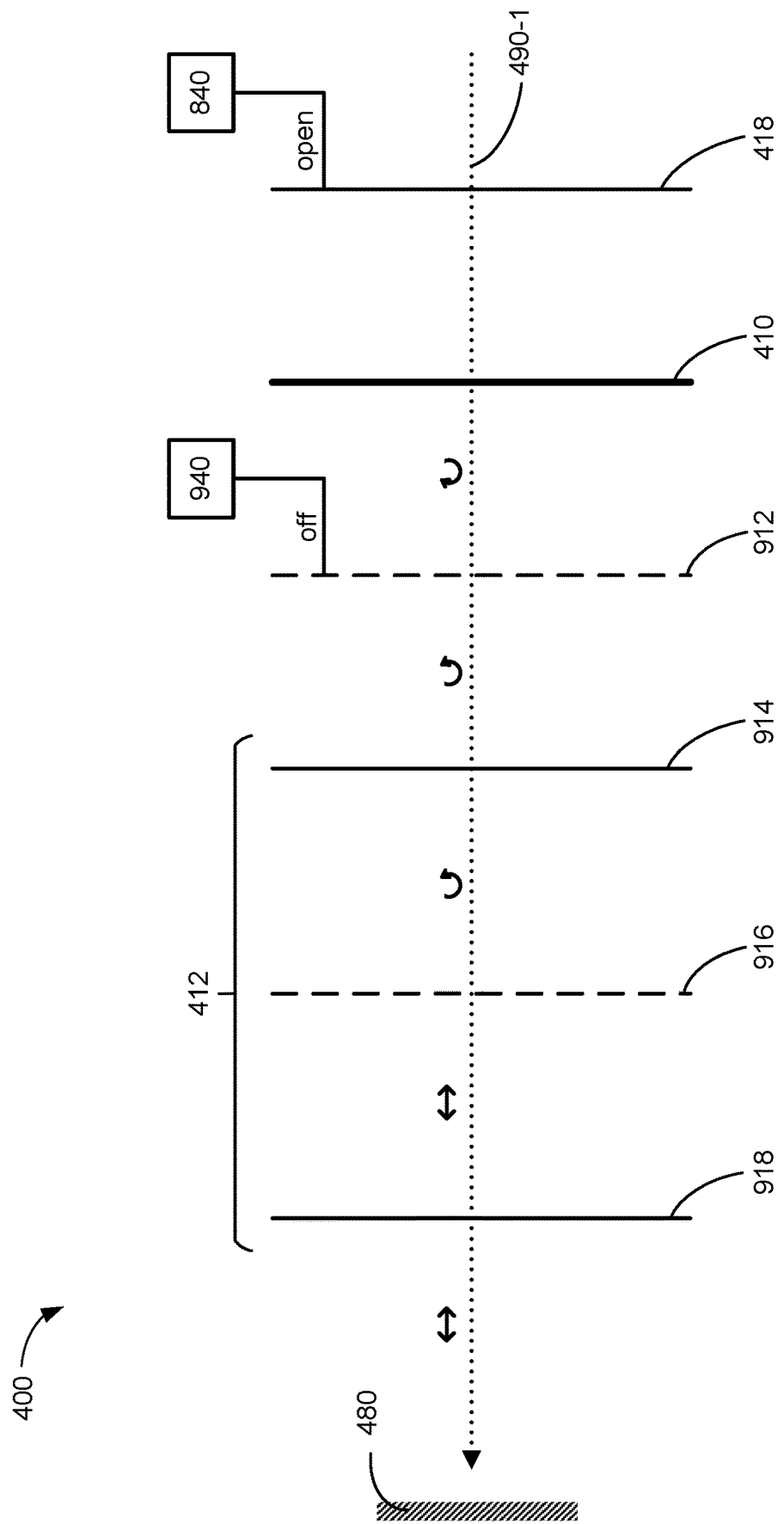

Details regarding the polarization of ambient light 490-1 propagating along an optical path in display device 400 when display device 400 is in the second mode are shown in FIG. 9D. In the second mode, shutter assembly 418 is in the "open" state and is configured to allow transmission of ambient light 490-1. Display 410 is configured to transmit the ambient light 490-1 towards optical assembly 412. In some embodiments, the shutter assembly 418 or the display 410 may include a circular polarizer such that the ambient light 490-1 transmitted through the shutter assembly 418 and display 410 has a circular polarization. As shown, the ambient light 490-1 transmitted through shutter assembly 418 and display 410 has the second polarization. The ambient light 490-1 is incident upon switchable optical retarder 912. Switchable optical retarder 912 is in the "off" state and is configured to transmit the ambient light 490-1 while converting the polarization of the ambient light 490-1 from the second polarization to the first polarization. Beam splitter 914 is configured to transmit a first portion of ambient light 490-1 towards optical retarder 916. Optical retarder 916 is configured to transmit the first portion of ambient light 490-1 while converting the polarization of the first portion of the ambient light 490-1 to the fourth polarization. Reflector 918 is configured to transmit the first portion of the ambient light 490-1 having the fourth polarization such that the first portion of the ambient light 490-1 is output from optical assembly 412.

As shown in FIGS. 9C and 9D, in time-sequential operation of display device 400, display device 400 alternates between the first mode (displaying the image light 492) and the second mode (transmitting the ambient light 490-1). Thus, at a given point in time, display 410 is configured to either output the image light 492 or transmit the ambient light 490-1 and optical assembly 412 is configured to either output the image light 492 or output the ambient light 490-1.

In some embodiments, display device 400 may operate in a low-persistence mode (e.g., each frame is displayed for a short period of time and a blank or dark screen remains until a next frame is displayed), to avoid motion blur artifacts. In such cases, the display 410 may only output image light 492 for 10%-20% of the total operational time. Thus, during the rest of the operational time (e.g., the remaining 80%-90% of the operational time), the display device 400 can allow ambient light 490-1 to be transmitted to a user's eyes. In some cases, the display device 400 may adjust the amount of ambient light 490-1 that is transmitted to a user's eyes (e.g., by adjusting the duration of time for transmitting the ambient light to the user's eyes). For example, the ambient light 490-1 may be adjusted based on measurements of ambient lighting levels to maintain a certain brightness level for the user. In another example, the ambient light 490-1 may be adjusted based on the needs of the scenes for the virtual image, to provide a global dimming feature to enhance virtual image contrast (e.g., a portion, less than all, of the ambient light 490-1 may be blocked or dimmer in augmented reality (AR) applications in order to reduce obstruction of displayed images).

Figure 10:
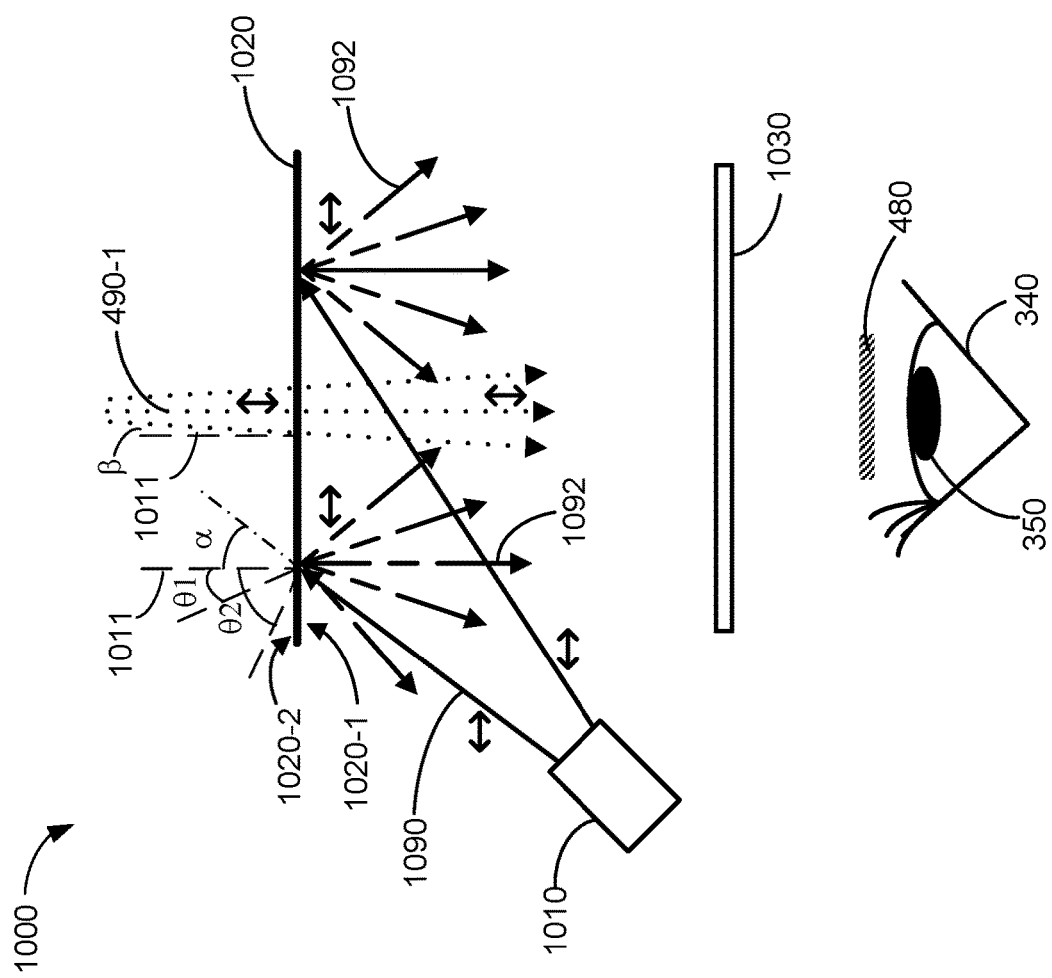
FIG. 10 is a schematic diagrams illustrating a display device including an optical diffuser display in accordance with some embodiments.

FIG. 10 is a schematic diagram illustrating a display device 1000, corresponding to display device 400, in accordance with some embodiments. As shown, display device 1000 includes a projector 1010, an optical diffuser display 1020, and an optical assembly 1030. Projector 1010 is configured to project image light 1090 toward optical diffuser display 1020. Optical diffuser display 1020 is a non-emissive display, corresponding to display 410 shown in FIG. 4D, and is configured to receive the image light 1090 and to output diffused image light 1092, which corresponds to image light 492. Both the diffused image light 1092 and the ambient light 490-1 are output from optical diffuser display 1020 toward optical assembly 1030, which corresponds to any of optical assemblies 412, 500-504, and 600.

In some embodiments, such as when the image light 1090 has a linear polarization, the optical diffuser display 1020 is operable to diffuse the image light 1090 such that polarization of the image light 1090 is maintained. As a result, the diffused image light 1092 output from the optical diffuser display 1020 can have the same linear polarization as the image light 1090 projected onto the optical diffuser display 1020. For example, as shown, the image light 1090 has a first linear polarization and the diffused image light 1092 also has the first linear polarization. The optical diffuser display 1020 is also operable to transmit ambient light 490-1. Similarly, when the ambient light 490-1 has a linear polarization, the optical diffuser display 1020 is configured to transmit the ambient light 490-1 without changing its polarization. For example, the ambient light 490-1 may have a second linear polarization that is orthogonal to the first linear polarization. In such cases, the ambient light 490-1 maintains the same polarization (e.g., the second linear polarization) after being transmitted through the optical diffuser display 1020.

In some embodiments, the optical diffuser display 1020 is configured to diffuse light that is incident upon the optical diffuser display 1020 at an incident angle within a certain incident angle range and to transmit light that is incident upon the optical diffuser display 1020 at an incident angle outside the certain incident angle range.

In some embodiments, the optical diffuser display 1020 is polarization selective. For example, optical diffuser display 1020 may be configured to diffuse light that has the first linear polarization and to transmit light that has the second linear polarization.

In some embodiments, the optical diffuser display 1020 is a holographic optical element (HOE) (e.g., a holographic diffuser).

In some embodiments, as shown, optical diffuser display 1020 has opposing surfaces 1020-1 and 1020-2. As shown, optical diffuser display 1020 is configured to receive the image light 1090 at surface 1020-1 and to diffuse the image light 1090 such that the diffused image light 1092 is output from surface 1020-1. The image light 1090 is incident upon the surface 1020-1 at incident angle $\alpha$ (with respect to a normal 1011) that is, for example, between a first angle $\theta_1$ and a second angle $\theta_2$, i.e., $\theta_1 < \alpha < \theta_2$. The optical diffuser display 1020 is also configured to receive the ambient light 490-1 at surface 1020-2 and to transmit the ambient light 490-1 such that the ambient light 490-1 is output from surface 1020-1 without a change in direction. The ambient light 490—is incident upon the surface 1020-2 at incident angles $\beta$ that is less than the first angle $\theta_1$, i.e., $\beta < \theta_1$. The diffused image light 1092 and the ambient light 490-1 are directed to eyebox 480 by optical assembly 1030 through optical paths described above with respect to FIGS. 4A-4B, 5A-5O, and 6A-6C. In some embodiments, $\theta_1$ is 30 degrees or less, and $\theta_2$ is 60 degrees or greater.

Figure 11A:
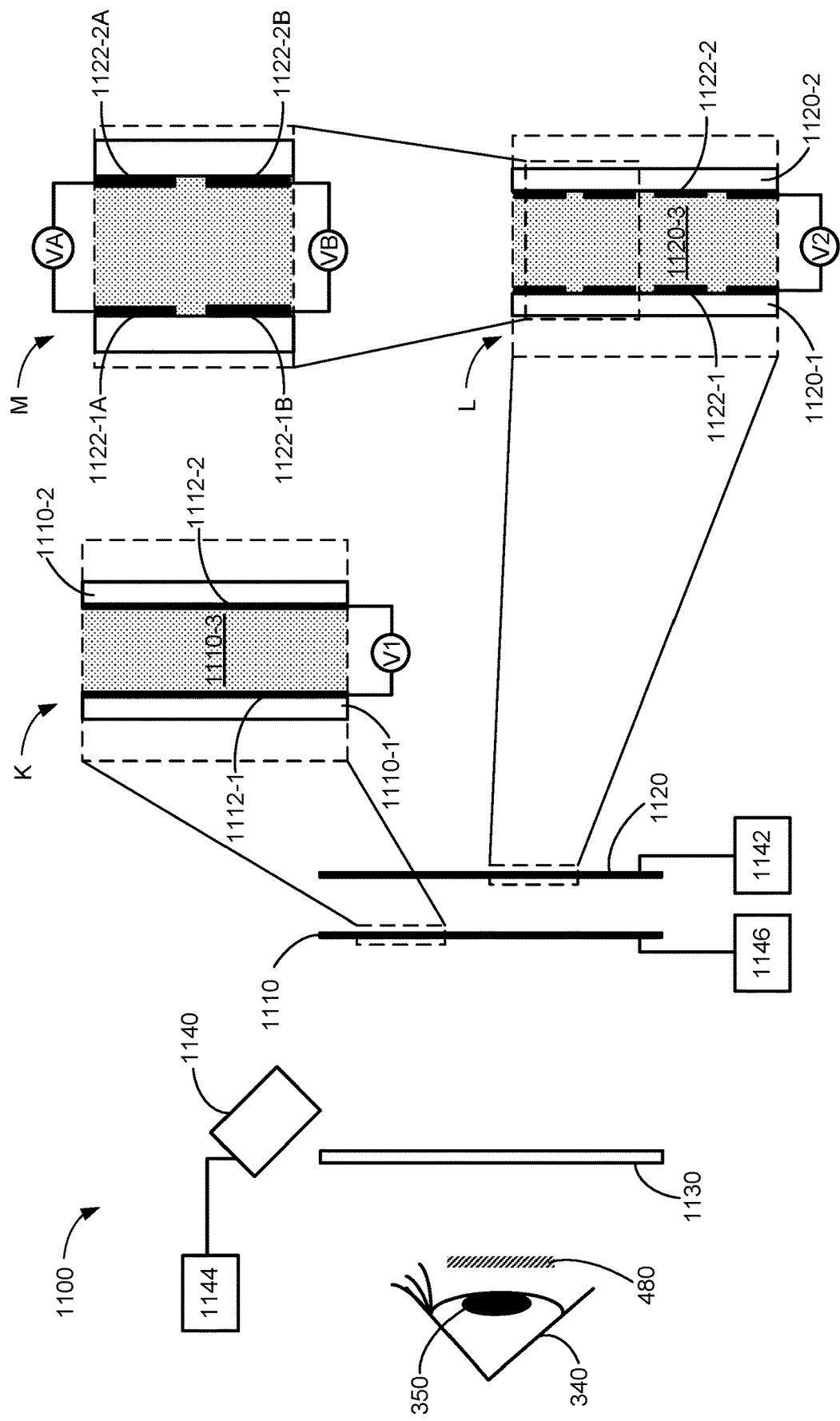
FIG. 11A is a schematic diagram illustrating a display device that includes a switchable display and a shutter assembly in accordance with some embodiments.

FIG. 11A is a schematic diagram illustrating a display device 1100 that includes a switchable display 1110 and a shutter assembly 1120 in accordance with some embodiments. In some embodiments, switchable display 1110 corresponds to display 410 and the transparent non-emissive display shown in FIG. 4D, and shutter assembly 1120 corresponds to shutter assembly 418. As shown, switchable display 1110 is coupled to a controller 1146 and shutter assembly 1120 is coupled to a controller 1142. Display device 1100 also includes an optical assembly 1130, corresponding to optical assembly 412 and any of optical assemblies 500-504 and 600. As shown, switchable display 1110 is disposed between shutter assembly 1120 and optical assembly 1130. In some embodiments, display device 1100 may also include one or more image sources 1140 (e.g., a projector) that are coupled to a controller 1144.

Inset K illustrates details of switchable display 1110 in accordance with some embodiments. As shown, switchable display 1110 includes a front surface 1110-1, a back surface 1110-2 that is opposite the front surface 1110-1, and optically anisotropic molecules 1110-3 that are disposed between the front surface 1110-1 and the back surface 1110-2. In some embodiments, as shown, the switchable display 1110 also includes a front electrode 1112-1 that is coupled to (e.g., coated on) the front surface 1110-1 and a back electrode 1112-2 that is coupled to (e.g., coated on) the back surface 1110-2. In such cases, the front electrode and the back electrode are operatively (e.g., electrically) coupled to a voltage source V1. In some embodiments, voltage source V1 is electrically connected to controller 1146. By changing the voltage of voltage source V1, the optically anisotropic molecules 1110-3 (and thereby, the switchable display 1110) can be configured to either (1) diffuse incident light or (2) transmit incident light without diffusing the incident light.

Inset L illustrates details of shutter assembly 1120 in accordance with some embodiments. As shown, shutter assembly 1120 includes opposing substrates 1120-1 and 1120-2 as well as optically anisotropic molecules 1120-3 that are disposed between substrates 1120-1 and 1120-2. In some embodiments, as shown, the display also includes an electrode 1122-1 that is coupled to (e.g., coated on) substrate 1120-1 and an electrode 1122-2 that is coupled to (e.g., coated on) substrate 1120-2. In such cases, electrode 1122-1 and electrode 1122-2 are operatively (e.g., electrically) coupled to an adjustable voltage source V2. In some embodiments, voltage source V2 is electrically connected to or a part of controller 1142. By adjusting the voltage of voltage source V2, the optically anisotropic molecules 1120-3 (and thereby, the shutter assembly 1120) can be configured to modulate an intensity I (e.g., $0\% \leq I < 100\%$) of ambient light 490-1 transmitted through shutter assembly 1120.

Figure 11B:
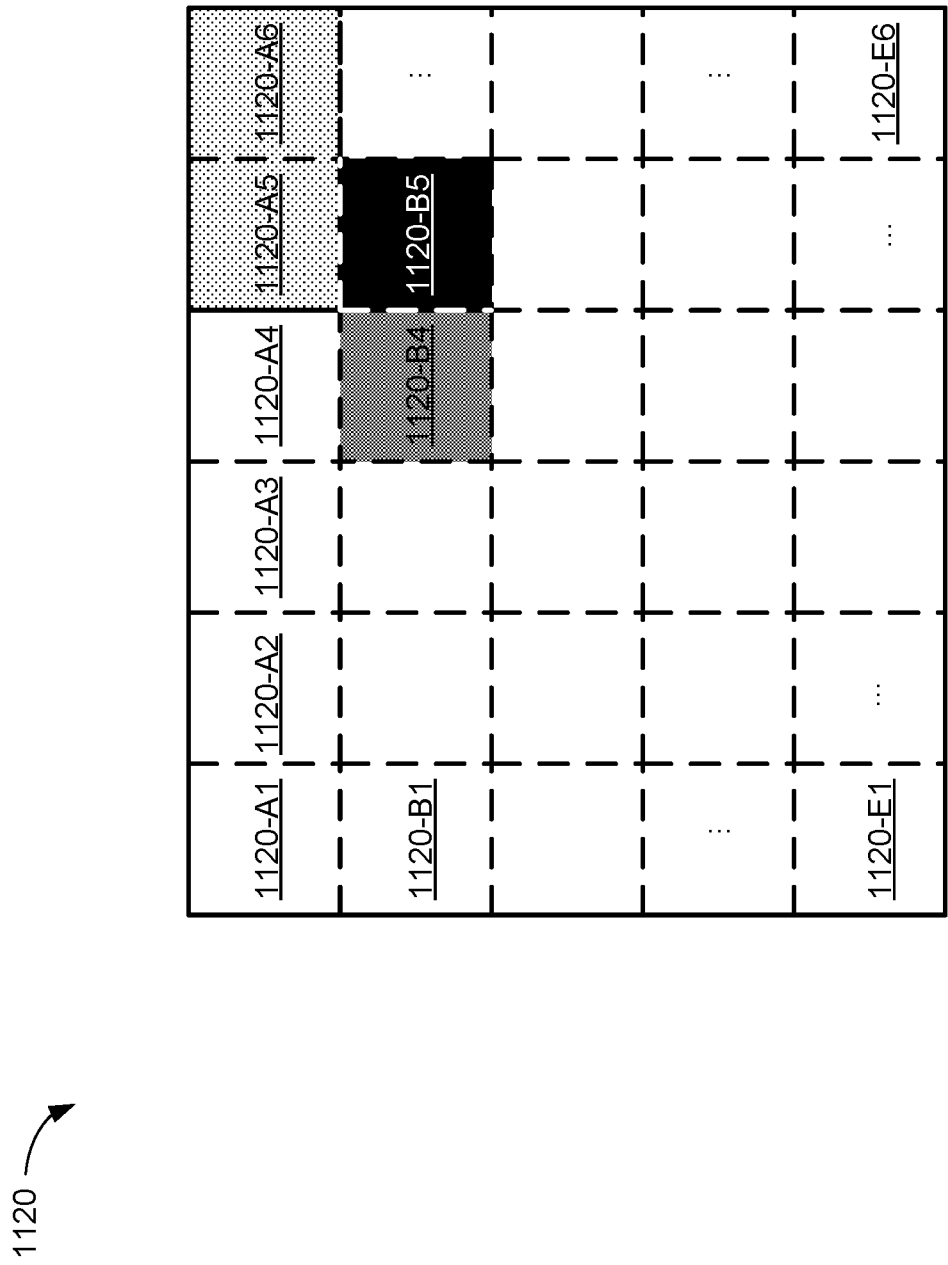
FIG. 11B is a schematic diagram illustrating a shutter assembly that includes a two-dimensional array of shutters accordance with some embodiments.

In some embodiments, as shown in FIG. 11B, shutter assembly 1120 is a two-dimensional array of shutters (e.g., shutters 1120-A1, 1120-A2 . . . 1120-E6). In such cases, each respective shutter is configured to modulate a respective portion of ambient light 490-1 that is transmitted through the respective shutter. Further, each respective shutter includes a respective electrode on substrate 1120-1 and a respective electrode on substrate 1120-2. For example, as shown in inset M of FIG. 11A, a shutter 1120-A1 (shown in FIG. 11B) includes an electrode 1122-1A disposed on substrate 1120-1 and an electrode 1122-2A disposed on substrate 1120-2. Another shutter 1120-B1 (shown in FIG. 11B) includes an electrode 1122-1B disposed on substrate 1120-1 and an electrode 1122-2B disposed on substrate 1120-2. Electrodes 1122-1A and 1122-2A of shutter 1120-A are operatively coupled to an adjustable voltage source VA and electrodes 1122-1B and 1122-2B of shutter 1120-B are operatively coupled to a different adjustable voltage source VB. Thus, shutter 1120-A1 is independently configurable (e.g., by adjusting the voltage of adjustable voltage source VA) to modulate the intensity of a portion of the ambient light that is transmitted through shutter 1120-A1 and shutter 1120-B1 is independently configurable (e.g., by adjusting the voltage of adjustable voltage source VB) to modulate the intensity of a portion of the ambient light that is transmitted through shutter 1120-B1. For example, as shown in FIG. 11B, shutters 1120-A1, 1120-A2, 1120-A3, and 1120-A4 are configured to transmit a corresponding portion of ambient light 490-1 at a first intensity (e.g., 99.9%), shutters 1112-A5 and 1120-A6 are configured to transmit a corresponding portion of ambient light 490-1 at a second intensity (for example, 50%), shutter 112-B4 is configured to transmit a corresponding portion of ambient light 490-1 at a third intensity (for example, 20%), and shutter 1112-B5 is configured to block transmission of a corresponding portion of ambient light 490-1 (e.g., 0% transmission).

As shown in FIGS. 11C and 11D, display device 1100 is configured to alternate between a first mode (shown in FIG. 11C) and a second mode (shown in FIG. 11D).

Referring to FIG. 11C, when display device 1100 is in the first mode, the one or more image sources 1140 are configured to project image light 1190 toward switchable display 1110. The front surface 1110-1 of switchable display 1110 is configured to receive image light 1190 projected from the one or more image sources 1140 and to diffuse the image light 1190 so that diffused image light 492 is output from the front surface 1110-1 of switchable display 1110. The diffused image light 492, output from the switchable display 1110, is directed to eyebox 480 by optical assembly 1130 at the first optical power. In the first mode, the shutter assembly 1120 is configured to block transmission of ambient light 490-1 such that the ambient light 490-1 is not transmitted through shutter assembly 1120 and no portion of ambient light 490-1 (e.g., I~0%) is incident upon the back surface 1110-2 of switchable display 1110.

Referring to FIG. 11D, when display device 1100 is in the second mode, the one or more image sources 1140 are configured to not project image light 1190 toward switchable display 1110 (e.g., the one or more image sources 1140 are turned off or the image light 1190 is blocked from exiting the one or more image sources 1140). The shutter assembly 1120 is configured to modulate (e.g., change or vary) the intensity of the ambient light 490-1 transmitted through shutter assembly 1120 such that at least a portion of ambient light 490-1 is transmitted through shutter assembly 1120 as ambient light 490-1' at an intensity that is less than the intensity of the ambient light 490-1 (e.g., I<100%). Thus, when display device 1100 is in the second mode, ambient light 490-1' can have an intensity I that is between 0% to 100% of the intensity of ambient light 490-1. The back surface 1110-2 of switchable display 1110 is configured to receive the ambient light 490-1' and to transmit the ambient light 490-1' toward optical assembly 1130. Optical assembly 1130 is configured to transmit ambient light 490-1' at the second optical power and without significant change to the direction of ambient light 490-1'. In some embodiments, the intensity of ambient light 490-1 is modulated (e.g., varied, changed) such that the ambient light 490-1', transmitted through the shutter assembly 1120, has an intensity that is compatible with an intensity of diffused image light 492 output from the switchable display 1110 (e.g., the ambient light 490-1' and the diffused image light 492 output from display 1110 have comparable intensity when they reach the user's eye 340).

By alternating between the first mode and the second mode, display device 1100 is able to time-sequentially direct image light (corresponding to image light 1190 and diffused image light 492) and transmit ambient light (corresponding to ambient light 490-1 and 490-1') to a user's eyes 340 such that virtual images, displayed by the image light, and images from the real world, transmitted as ambient light, are blended to display an augmented reality environment.

Figure 11F:
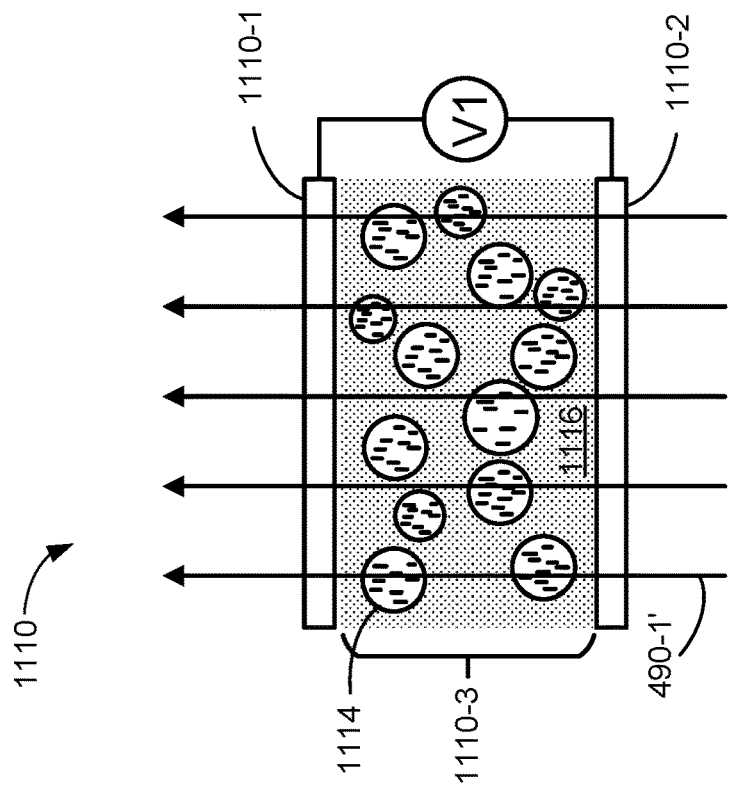
FIG. 11E-11F are schematic diagrams illustrating a switchable display with polymer dispersed liquid crystals in accordance with some embodiments.
Figure 11E:
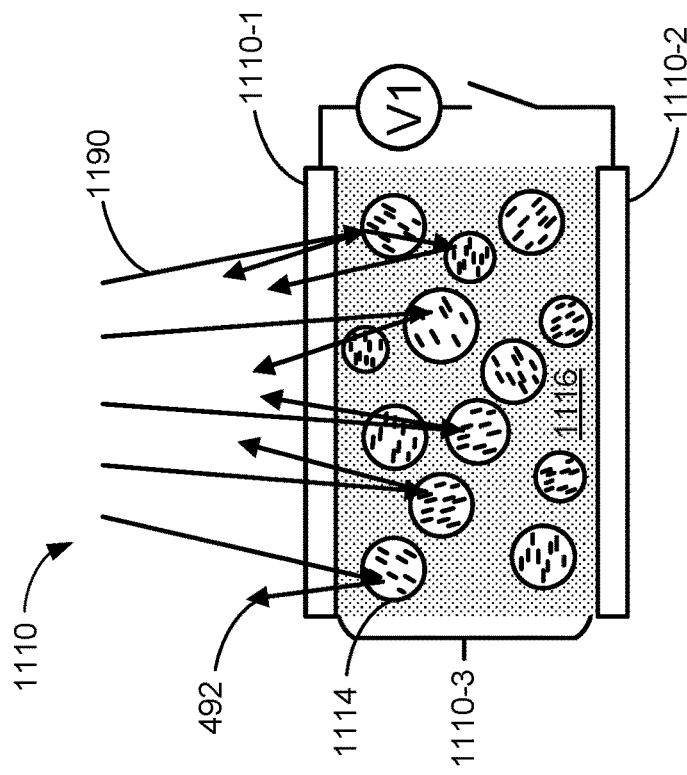

FIGS. 11E-11F are schematic diagrams illustrating switchable display 1110 with polymer dispersed liquid crystals in accordance with some embodiments. In some embodiments, the one or more optically anisotropic molecules 1110-3 may be a polymer dispersed liquid crystal (PDLC) medium that includes liquid crystal domains 1114 that are organized (e.g., suspended) in a polymer matrix 1116 (shown in FIGS. 11E and 11F). For example, the PDLC medium may include liquid crystals, such as nematic liquid crystals, that are mixed with pre-polymers, such as a photosensitive composition of monomers and/or oligomers, and photoinitiators. The liquid crystal and pre-polymer mixture is exposed to light to activate photopolymerization of the pre-polymer, resulting in either a "Swiss cheese" morphology or a polymer ball morphology. In the "Swiss cheese" morphology (shown in FIGS. 11E and 11F), the polymer structure includes spherical voids that are filled by the liquid crystals. In the polymer ball morphology (not shown), the polymer structure includes interconnected pores that are filled by the liquid crystals.

As shown, the PDLC medium is configurable to either diffuse incident light (shown in FIG. 11E) or transmit incident light without diffusing the incident light (shown in FIG. 11F). Referring to FIG. 11E, when the voltage source V1 is off (e.g., switched off to create an open circuit or set to have a voltage of zero), the liquid crystals in different liquid crystal domains 1114 are randomly oriented with respect to one another. Thus, the PDLC medium is configured to output diffused image light 492 upon receiving the image light 1190. Referring to FIG. 11F, when the voltage source V1 is set to produce a non-zero voltage (e.g., such that there is a voltage differential between the front surface 1110-1 and the back surface 1110-2), the liquid crystals in each of the liquid crystal domains 1114 are aligned. Thus, the PDLC medium is configured to transmit ambient light 490-1' without diffusing the ambient light 490-1' (e.g., without a substantial change in the direction of the ambient light 490-1').

In some embodiments, the voids filled by the liquid crystals have non-spherical shapes (e.g., ellipsoids or spheroids, such as prolate spheroids or oblate spheroids). In some embodiments, the liquid crystals in the voids or the interconnected pores are arranged in a direction that is parallel to front surface 1110-1 or back surface 1110-2 of switchable display 1110 (e.g., by applying a voltage across the direction that is parallel to front surface 1110-1 or back surface 1110-2) so that light having a first polarization is transmitted and light having a second polarization that is orthogonal to the first polarization is scattered.

Figure 11H:
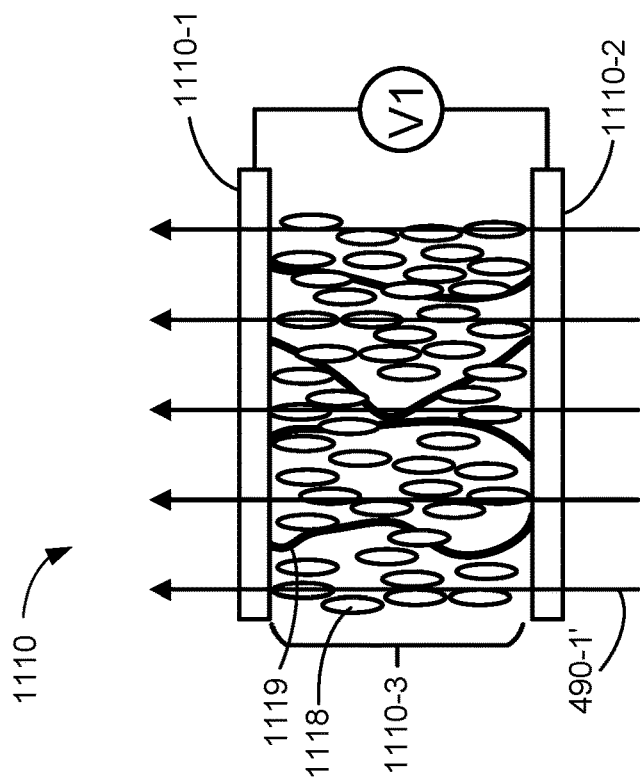
FIG. 11G-11H are schematic diagrams illustrating a switchable display with polymer stabilized liquid crystals in accordance with some embodiments.
Figure 11G:
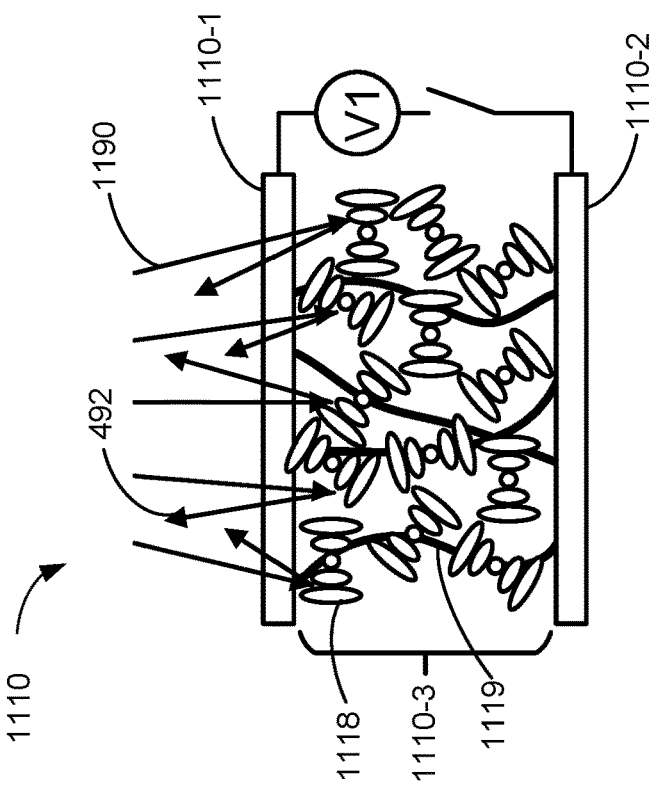

FIG. 11G-11H are schematic diagrams illustrating switchable display 1110 with polymer stabilized liquid crystals in accordance with some embodiments. In some embodiments, the one or more optically anisotropic molecules 1110-3 may be a polymer stabilized cholesteric texture (PSCT) medium that includes cholesteric liquid crystals 1118 that are stabilized by a polymer network 1119 (shown in FIGS. 11G and 11H). In some embodiments, the one or more optically anisotropic molecules 1110-3 may include nematic liquid crystals that are stabilized by a polymer network 1119.

The PSCT medium is configurable to either diffuse incident light (shown in FIG. 11G) or transmit incident light without diffusing the incident light (shown in FIG. 11H). Referring to FIG. 11G, when the voltage source V1 is off (e.g., switched off to create an open circuit or set to have a voltage of zero), the cholesteric liquid crystals 1118, which have a helical structure (and are therefore, chiral), are in a focal conic state, forming randomly oriented domains. The randomly oriented domains allow the PSCT medium to output diffused image light 492 upon receiving image light 492. Referring to FIG. 11H, when the voltage source V1 is set to produce a non-zero voltage (e.g., such that there is a voltage differential between the front surface 1110-1 and the back surface 1110-2), the cholesteric liquid crystals 1118 are aligned in a homeotropic state, allowing the PSCT medium to transmit ambient light 490-1' without diffusing the ambient light 490-1' (e.g., without a substantial change in the direction of the ambient light 490-1'). Although not shown, a PSCT medium may also operate in reverse mode. In reverse mode, the cholesteric liquid crystals 1118 are aligned in the homeotropic state when the voltage differential is zero and are in the focal conic state, having randomly oriented domains, when the voltage differential is non-zero. Alternatively, a PSCT medium may also operate in a dual frequency bistable mode. In the dual frequency bistable mode, the cholesteric liquid crystals 1118 transition from the homeotropic state to the focal conic state when a high frequency voltage is applied and the cholesteric liquid crystals 1118 transition from the focal conic state to the homeotropic state when a low frequency voltage is applied.

In some embodiments, the optically anisotropic molecules 1110-3 of switchable display 1110 may include liquid crystals, such as nematic liquid crystal, and inorganic nanoparticles (e.g., silica) that are dispersed in the liquid crystal in a nematic phase. In such cases, the optically anisotropic molecules 1110-3 are bistable and can be configured to be transparent by setting voltage source V1 to produce a non-zero voltage (e.g., such that there is a voltage differential between the front surface 1110-1 and the back surface 1110-2). In such cases, the optically anisotropic molecules 1110-3 are configurable to transmit ambient light 490-1' by setting the voltage source V1 is to produce a non-zero voltage. When the voltage source V1 has been turned off (e.g., the voltage is zero), the optically anisotropic molecules 1110-3 are configured to remain transparent. The optically anisotropic molecules 1110-3 are also configurable to scatter the image light 1190 by laser writing the optically anisotropic molecules 1110-3 (e.g., illuminating the optically anisotropic molecules 1110-3 with laser light). The optically anisotropic molecules 1110-3 remain in a scattering state after the laser writing is completed and will remain in a scattering state until a non-zero voltage is applied across the optically anisotropic molecules 1110-3 (e.g., by setting voltage source V1 to produce a non-zero voltage).

Figure 11J:
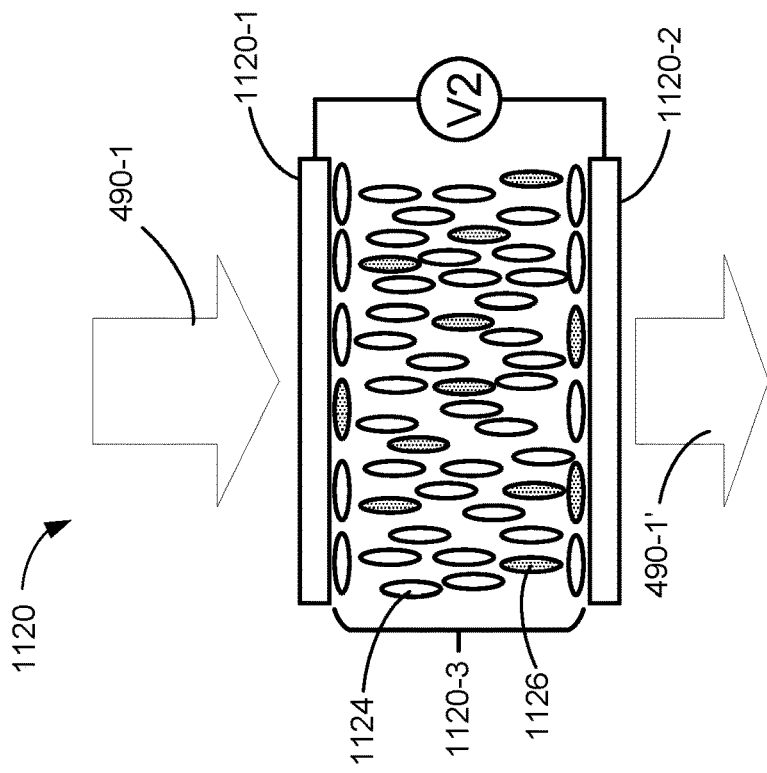
FIG. 11I-11J are schematic diagrams illustrating a shutter assembly with liquid crystals and dye in accordance with some embodiments.
Figure 11I:
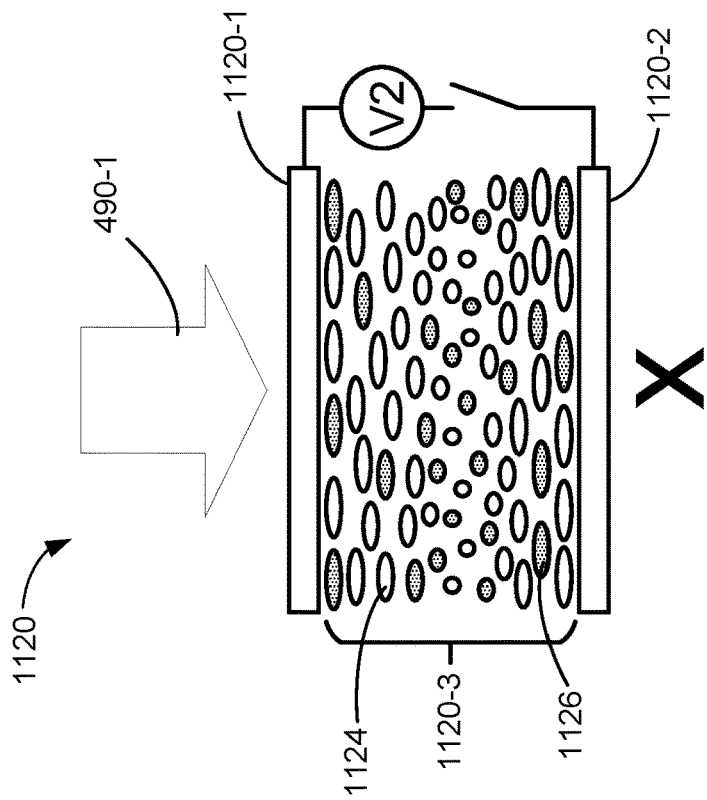

FIG. 11I-11J are schematic diagrams illustrating shutter assembly 1120 with liquid crystals and dye in accordance with some embodiments. In some embodiments, optically anisotropic molecules 1120-3 of shutter assembly 1120 include liquid crystals 1124, such as nematic liquid crystals, and dye (e.g., dichroic dye) 1126. For example, dye 1126 may be a dichroic dye that has an anisotropic molecular absorption. In such cases, the dichroic dye is an elongated molecule. In some embodiments, dye 1126 includes a combination of many different types of dye molecules. In such cases, the combination of dye molecules are configured to provide absorption over a broad range of wavelengths, such as across the visible range (e.g., 380 nm-740 nm) of light. As described, the optically anisotropic molecules 1120-3 are configurable to modulate an intensity of incident light.

Referring to FIG. 11I, when the adjustable voltage source V2 is off (e.g., switched off to create an open circuit or set to have a voltage of zero), liquid crystals 1124 and dye 1126 molecules are aligned in a first direction that does not allow transmission of light. Thus, the liquid crystals 1124 and dye 1126 molecules are configured to block transmission of ambient light 490-1. Referring to FIG. 11J, when the adjustable voltage source V2 is set to predetermined voltage $V_{set}$, the liquid crystals 1124 and dye 1126 are aligned in a second direction that is orthogonal to the first direction. In this case, the liquid crystals 1124 and dye 1126 molecules are configured to transmit a maximum intensity (close to 100%) of ambient light 490-1 as ambient light 490-1'. By adjusting (e.g., changing, varying) the voltage of adjustable voltage source V2 between zero and $V_{set}$, the liquid crystals 1124 and dye 1126 molecules are rotated between the first direction and the second direction and the amount (e.g., intensity) of light transmitted through optically anisotropic molecules 1120-3 is proportional to the degree of rotation of the liquid crystals 1124 and dye 1126 molecules (and thereby, the voltage of adjustable voltage source V2).

Alternatively, the liquid crystals 1124 and dye 1126 molecules may be aligned such that when the adjustable voltage source V2 is off (e.g., switched off to create an open circuit or set to have a voltage of zero), the liquid crystals 1124 and dye 1126 molecules are configured to transmit a maximum intensity (close to 100%) of ambient light 490-1 as ambient light 490-1', and when the adjustable voltage source V2 is set to predetermined voltage $V_{set}$ that is non-zero, the liquid crystals 1124 and dye 1126 molecules are configured to block transmission of ambient light 490-1.

Figure 11L:
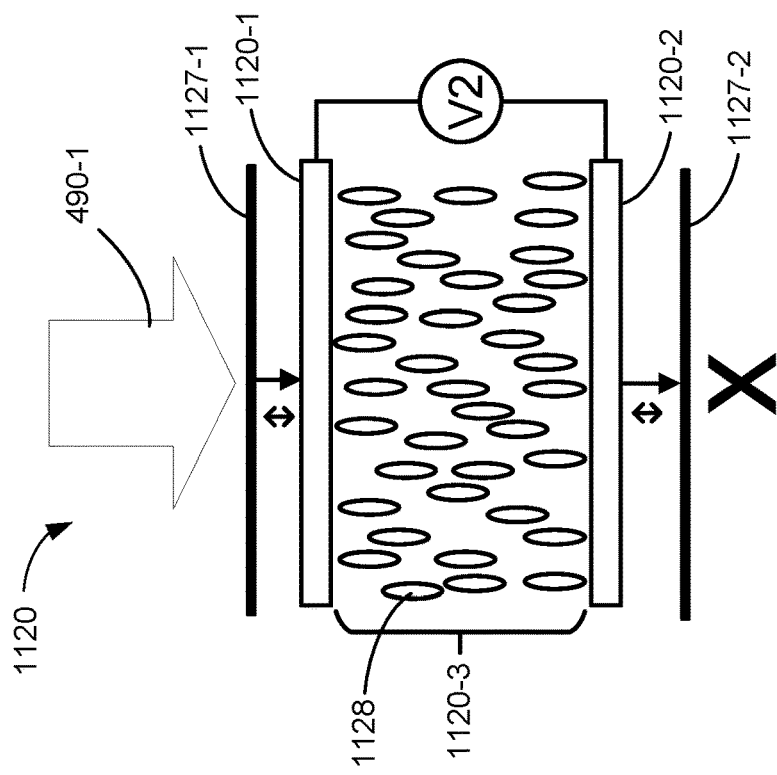
FIG. 11K-11L are schematic diagrams illustrating a shutter assembly with twisted nematic liquid crystals in accordance with some embodiments.
Figure 11K:
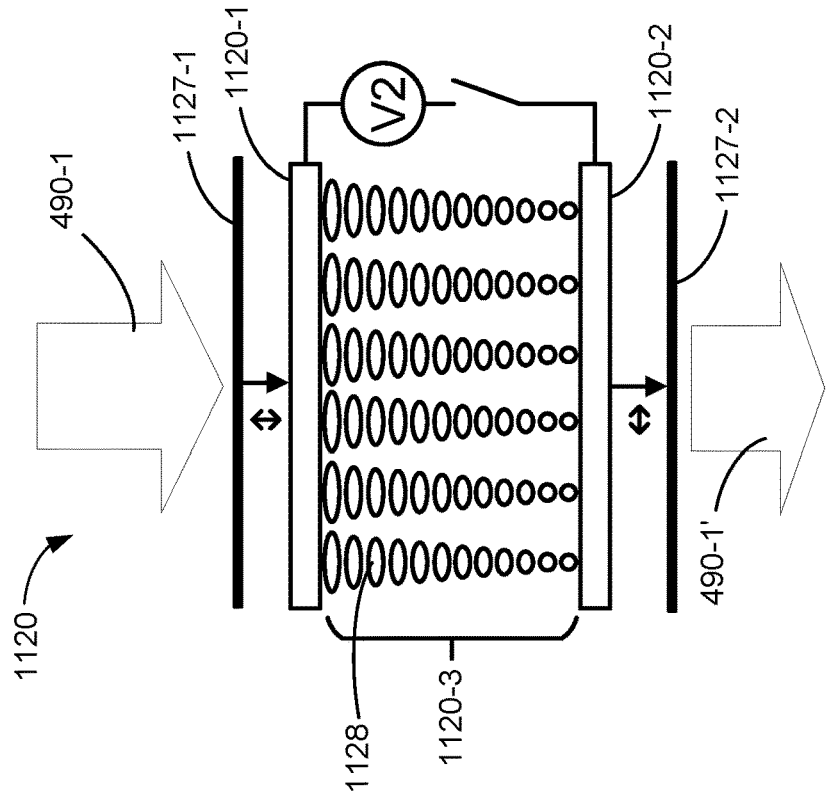

FIG. 11K-11L are schematic diagrams illustrating shutter assembly 1120 with twisted nematic liquid crystals in accordance with some embodiments. In some embodiments, the shutter assembly 1120 also includes a polarizer 1127-1 that is disposed on a first side of the shutter assembly 1120 and a polarizer 1127-2 that is disposed on a second side of the shutter assembly 1120. In some embodiments, each polarizer may be coated or disposed on a respective shutter substrate (e.g., polarizer 1127-1 may be disposed on substrate 1120-1 and polarizer 1127-2 may be disposed on substrate 1120-2). The two polarizers 1127-1 and 1127-2 are configured to selectively transmit orthogonal polarizations. For example, polarizer 1127-1 is configured to transmit light having the first linear polarization and polarizer 1127-2 is configured to transmit light having the second linear polarization, or vice versa. The one or more optically anisotropic molecules 1120-3 include liquid crystals 1128 in the nematic state. The two substrates 1120-1 and 1120-2 may include a patterned photoalignment layer that dictates that the liquid crystals 1128 form a 90 degree twist when they are located between the two substrates 1120-1 and 1120-2 and the voltage source V2 is off (e.g., switched off to create an open circuit or set to have a voltage of zero), shown in FIG. 11K. In this case, a portion of ambient light 490-1 having the first linear polarization is transmitted through polarizer 1127-1 and is transmitted through optically anisotropic molecules 1120-3 as ambient light 490-1' while being converted from the first linear polarization to the second linear polarization (due to the twist structure of the liquid crystals 1128). Ambient light 490-1', having the second linear polarization, is transmitted through polarizer 1127-2. When the voltage source V2 is set to produce a non-zero voltage (e.g., such that there is a voltage differential between the substrates 1120-1 and 1120-2), the liquid crystals 1128 are configured to be homeotropically aligned. In this case, a portion of ambient light 490-1 having the first linear polarization is transmitted through polarizer 1127-1 and is transmitted through optically anisotropic molecules 1120-3 as ambient light 490-1' without a change polarization (due to homeotropic alignment of the liquid crystals 1128). Ambient light 490-1', having the first linear polarization, is not transmitted through polarizer 1127-2. Thus, when the voltage V2 is set to produce a non-zero voltage, the shutter assembly 1120 is configured to block transmission of the ambient light 490-1.

Figure 11N:
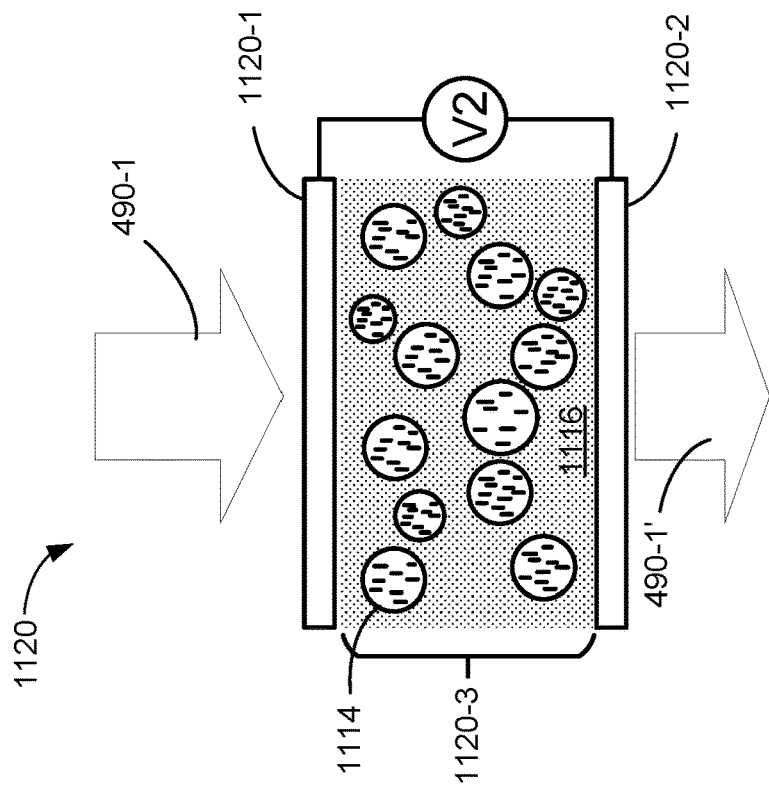
FIG. 11M-11N are schematic diagrams illustrating a shutter assembly with polymer dispersed liquid crystals in accordance with some embodiments.
Figure 11M:
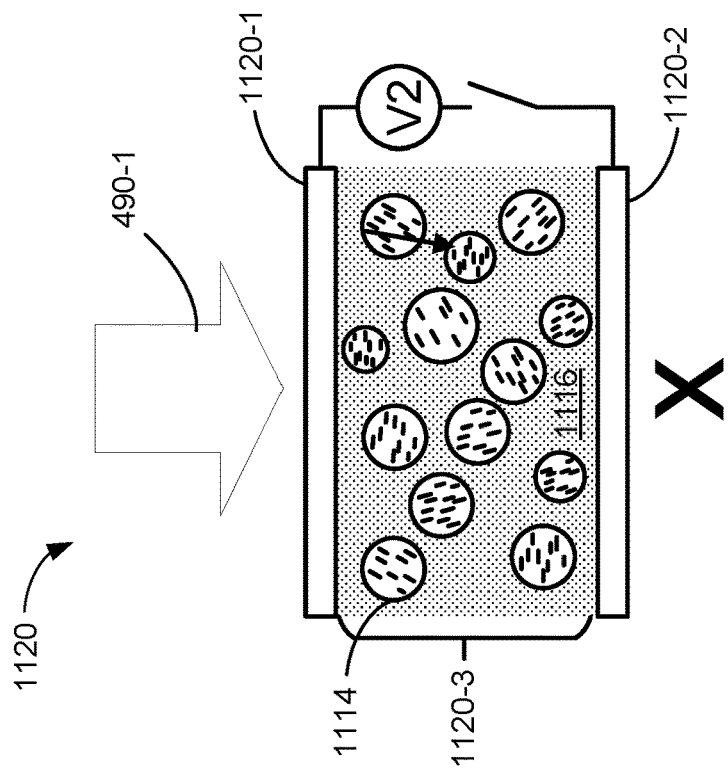

FIG. 11M-11N are schematic diagrams illustrating a shutter assembly 1120 with polymer dispersed liquid crystals in accordance with some embodiments. In some embodiments, the one or more optically anisotropic molecules 1120-3 may be a polymer dispersed liquid crystal (PDLC) medium that includes liquid crystal domains 1114 that are suspended in a polymer matrix 1116, as described above with respect to FIGS. 11E and 11F. The PDLC medium is configurable to either block transmission of ambient light 490-1 by diffusing the ambient light 490-1 (shown in FIG. 11M) or transmit the ambient light 490-1 as ambient light 490-1' without diffusion (shown in FIG. 11N). Referring to FIG. 11M, when the voltage source V2 is off (e.g., switched off to create an open circuit or set to have a voltage of zero), the liquid crystals in different liquid crystal domains 1114 are randomly oriented with respect to one another and the PDLC medium is configured to block transmission of ambient light 490-1. Referring to FIG. 11N, when the voltage source V2 is set to produce a non-zero voltage (e.g., such that there is a voltage differential between substrates 1120-1 and 1120-2), the liquid crystals in each of the liquid crystal domains 1114 are aligned. Thus, the PDLC medium is configured to transmit ambient light 490-1 without diffusing the ambient light 490-1 (e.g., without a substantial change in the direction of the ambient light 490-1).

In some embodiments, the PDLC medium may also include one or more dichroic dye molecules. The PDLC medium containing the one or more dichroic dye molecules can be configured to transmit or block light having wavelengths within a predefined wavelength range.

Figure 11P:
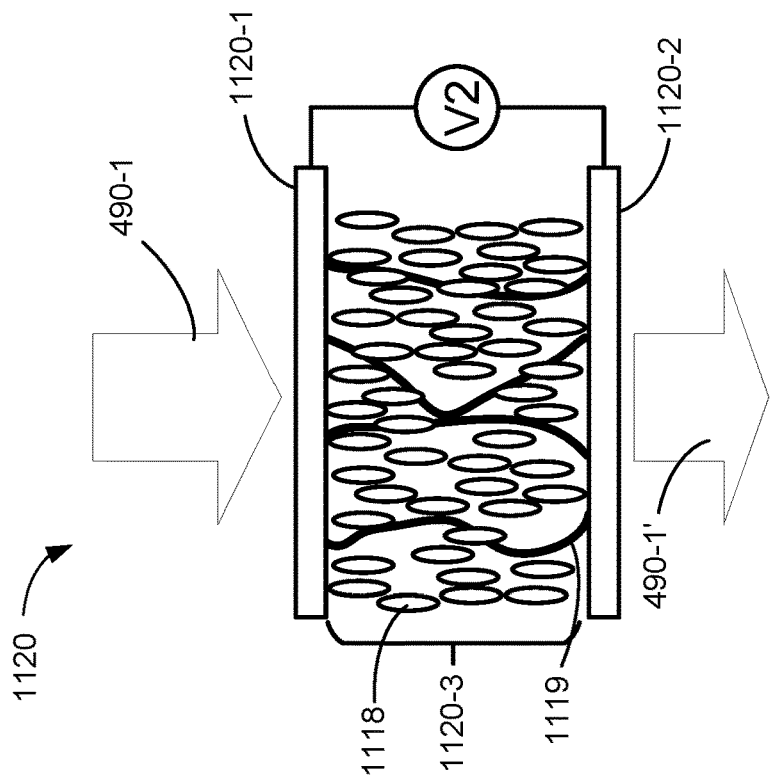
FIG. 11O-11P are schematic diagrams illustrating a shutter assembly with polymer stabilized liquid crystals in accordance with some embodiments.
Figure 11O:
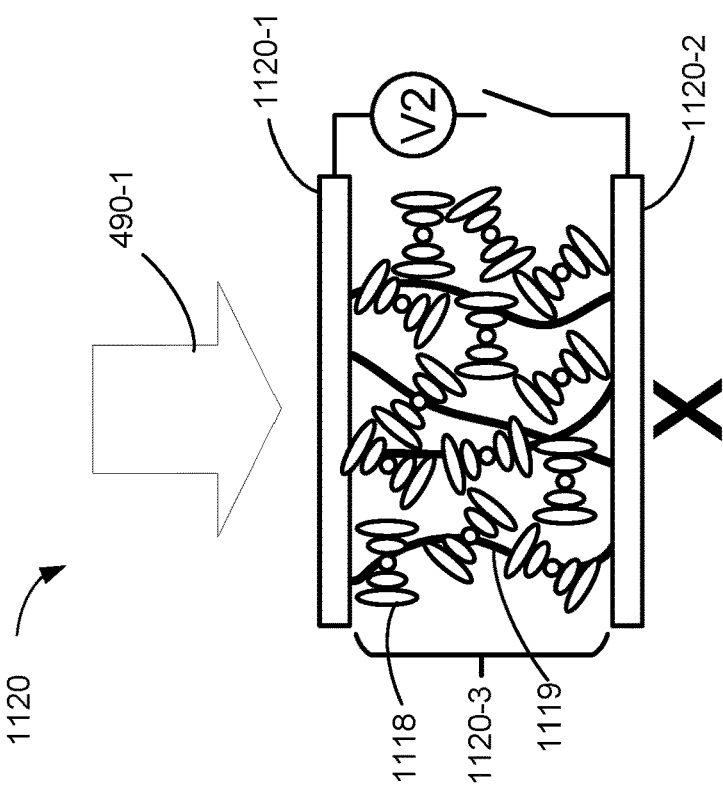

FIG. 11O-11P are schematic diagrams illustrating shutter assembly 1120 with polymer stabilized liquid crystals in accordance with some embodiments. In some embodiments, the one or more optically anisotropic molecules 1120-3 may be a polymer stabilized cholesteric texture (PSCT) medium that includes cholesteric liquid crystals 1118 that are stabilized by polymer network 1119. The PSCT medium is configurable to either block ambient light 490-1 (shown in FIG. 11O) or transmit the ambient light 490-1 as ambient light 490-1' without diffusion (shown in FIG. 11P). Referring to FIG. 11O, when the voltage source V2 is off (e.g., switched off to create an open circuit or set to have a voltage of zero), the cholesteric liquid crystals 1118 are configured to block transmission of ambient light 490-1. Referring to FIG. 11P, when the voltage source V2 is set to produce a non-zero voltage (e.g., such that there is a voltage differential between substrates 1120-1 and 1120-2), the cholesteric liquid crystals 1118 are aligned in a homeotropic state, allowing the PSCT medium to transmit the ambient light 490-1 without diffusion (e.g., without a substantial change in the direction of the ambient light 490-1). Details regarding operation of a PSCT medium in reverse mode and dual frequency bistable mode are provided above with respect to FIGS. 11G-11H and are not repeated here for brevity.

In some embodiments, the optically anisotropic molecules 1120-3 of shutter assembly 1120 may include liquid crystals, such as nematic liquid crystal, and inorganic nanoparticles (e.g., silica) that are dispersed in the liquid crystal in a nematic phase. In such cases, the optically anisotropic molecules 1120-3 are bistable and can be configured to be transparent by setting voltage source V2 to produce a non-zero voltage (e.g., such that there is a voltage differential between substrates 1120-1 and 1120-2). In such cases, the optically anisotropic molecules 1120-3 are configurable to transmit ambient light 490-1' by setting the voltage source V2 is to produce a non-zero voltage. When the voltage source V2 has been turned off (e.g., the voltage is zero), the optically anisotropic molecules 1120-3 are configured to remain transparent. The optically anisotropic molecules 1120-3 are also configurable to scatter the ambient light 490-1' by laser writing the optically anisotropic molecules 1120-3 (e.g., illuminating the optically anisotropic molecules 1120-3 with laser light). The optically anisotropic molecules 1120-3 remain in a scattering state after the laser writing is completed and will remain in a scattering state until a non-zero voltage is applied across the optically anisotropic molecules 1120-3 (e.g., by setting voltage source V1 to produce a non-zero voltage).

Figure 12A:
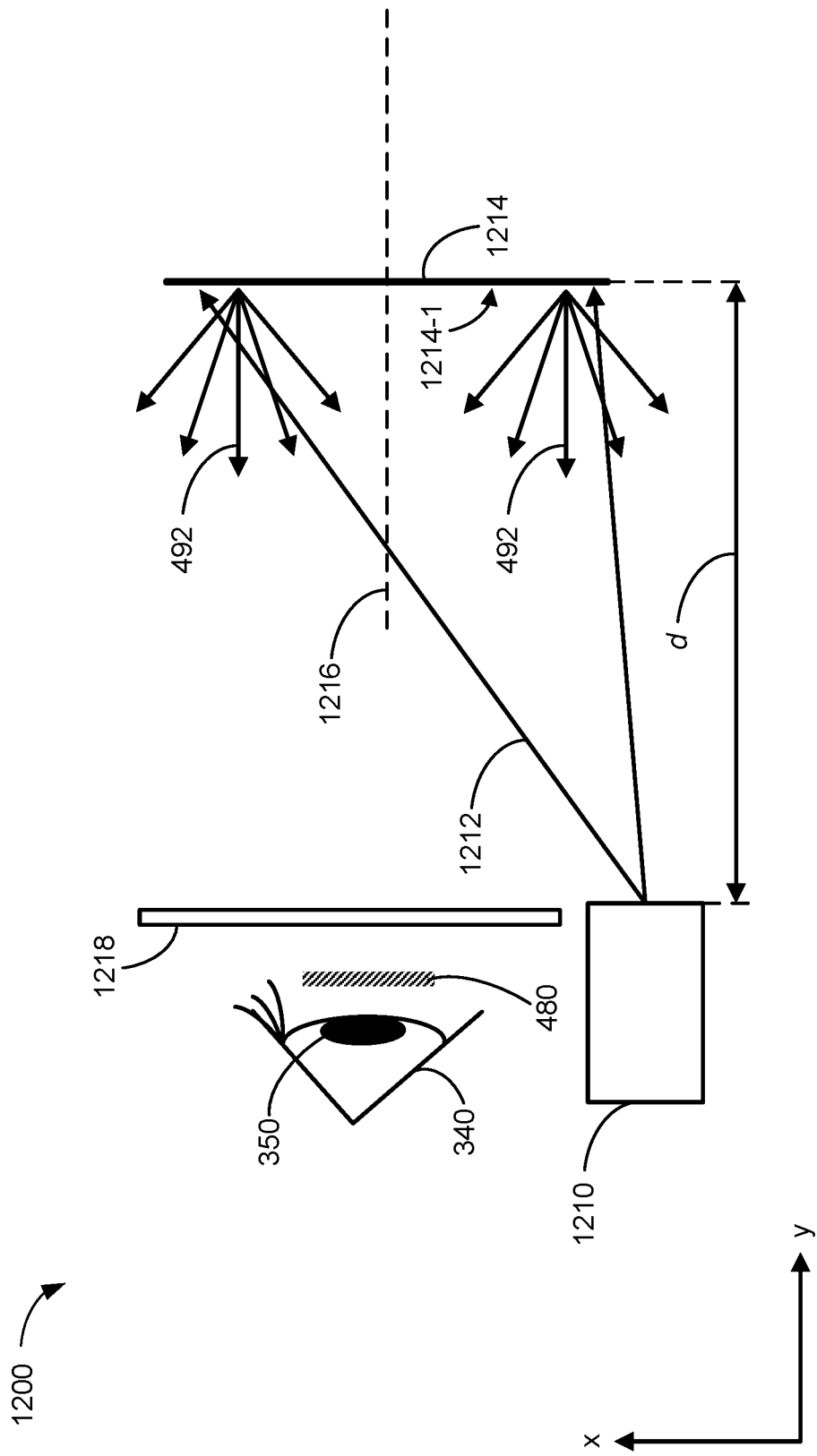

FIGS. 12A-12B are schematic diagrams illustrating a display device 1200 in accordance with some embodiments. Display device 1200 includes a projector (e.g., short throw projector) 1210, corresponding to one or more light sources 430 shown in FIG. 4D; a diffusive display 1214, corresponding to display 410; and an optical assembly 1218, corresponding to optical assembly 412. In some embodiments, diffusive display 1214 is a non-emissive display and corresponds to the non-emissive display 410-B shown in FIG. 4D. As shown, the projector 1210 is configured to project image light 1212 toward a surface 1214-1 of diffusive display 1214. Diffusive display 1214 is configured to receive the image light 1212 projected from the projector 1210 and to output diffused image light 492 from surface 1212-1. Optical assembly 1218 is configured to receive the diffused image light 492 output from diffusive display 1214 and to direct the diffused image light 492 toward eyebox 480. Details regarding the optical path of the diffused image light 492 through optical assembly 1218 is described above with respect to FIGS. 5A-5O, 6A 6C, and 7A-7C and is not repeated here for brevity.

In some embodiments, diffusive display 1214 may include one or more diffusive optical elements. In some embodiments, surface 1214-1 of diffusive display 1214 may have diffusive properties and be configured to diffuse light.

In some embodiments, projector 1210 is compact in size. For example, projector 1210 may have dimensions that do not exceed 5 centimeters (length) by 5 centimeters (width) by 5 centimeters (height). In some embodiments projector 1210 may have dimensions that do not exceed 2 centimeters (length) by 2 centimeters (width) by 2 centimeters (height). In some embodiments projector 1210 may have dimensions that do not exceed 1 centimeter (length) by 1 centimeter (width) by 1 centimeter (height). In some embodiments, projector 1210 has a working distance, d, that is between 2 centimeters and 20 centimeters. In some embodiments, projector 1210 has a working distance, d, that is no greater than any of 1 centimeter, 2 centimeters, 3 centimeters, 5 centimeters, 10 centimeters, 15 centimeters, 20 centimeters, 25 centimeters, or 30 centimeters. In some embodiments, diffusive display 1214 is disposed at an image plane of the projector 1210 (e.g., within or at the working distanced of projector 1210).

As shown in FIGS. 12A and 12B, diffusive display 1214 has an optical axis 1216 (e.g., a central axis) along a normal direction (e.g., the y-axis) to surface 1214-1 that intersects a middle (e.g., center) of diffusive display 1214. In some embodiments, as shown, projector 1210 is disposed at position that is offset from the middle of diffusive display 1214 (e.g., the optical axis 1216 does not intersect with projector 1210, an off-axis position relative to the optical axis 1216 of diffusive display 1214 in one or more directions). As shown in FIG. 12B, projector 1210 may be located to the left or the right of diffusive display 1214, and/or above or below diffusive display 1214.

Although only one projector 1210 is shown in FIGS. 12A and 12B, display device 1200 may include one or more projectors. For example, display device 1200 may include three projectors that configured to output light having wavelengths corresponding to red light, green light, and blue light, respectively.

Figure 12C:
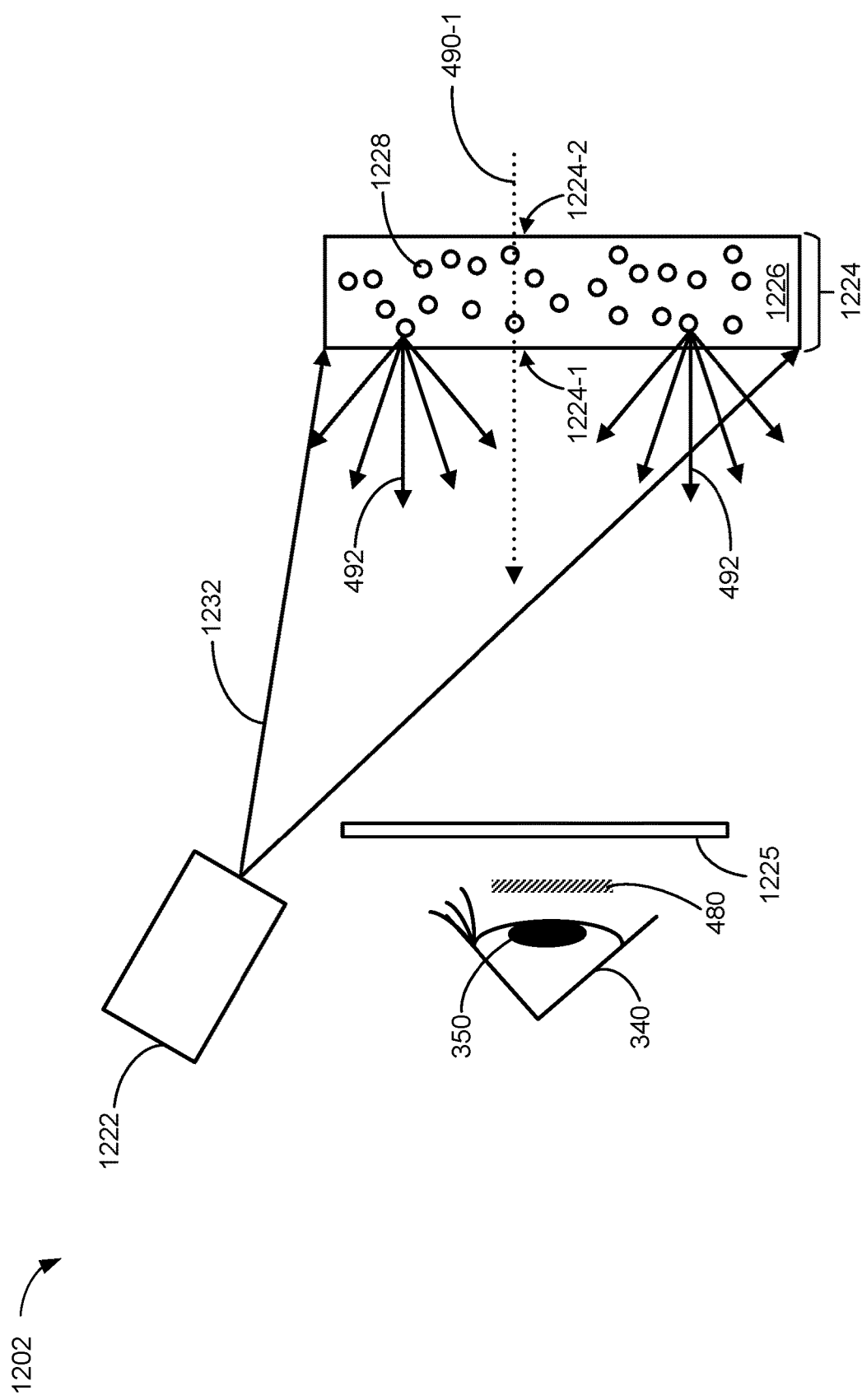
FIGS. 12C and 12D are schematic diagrams illustrating a display device that includes an nanoparticle display in accordance with some embodiments.
Figure 12D:
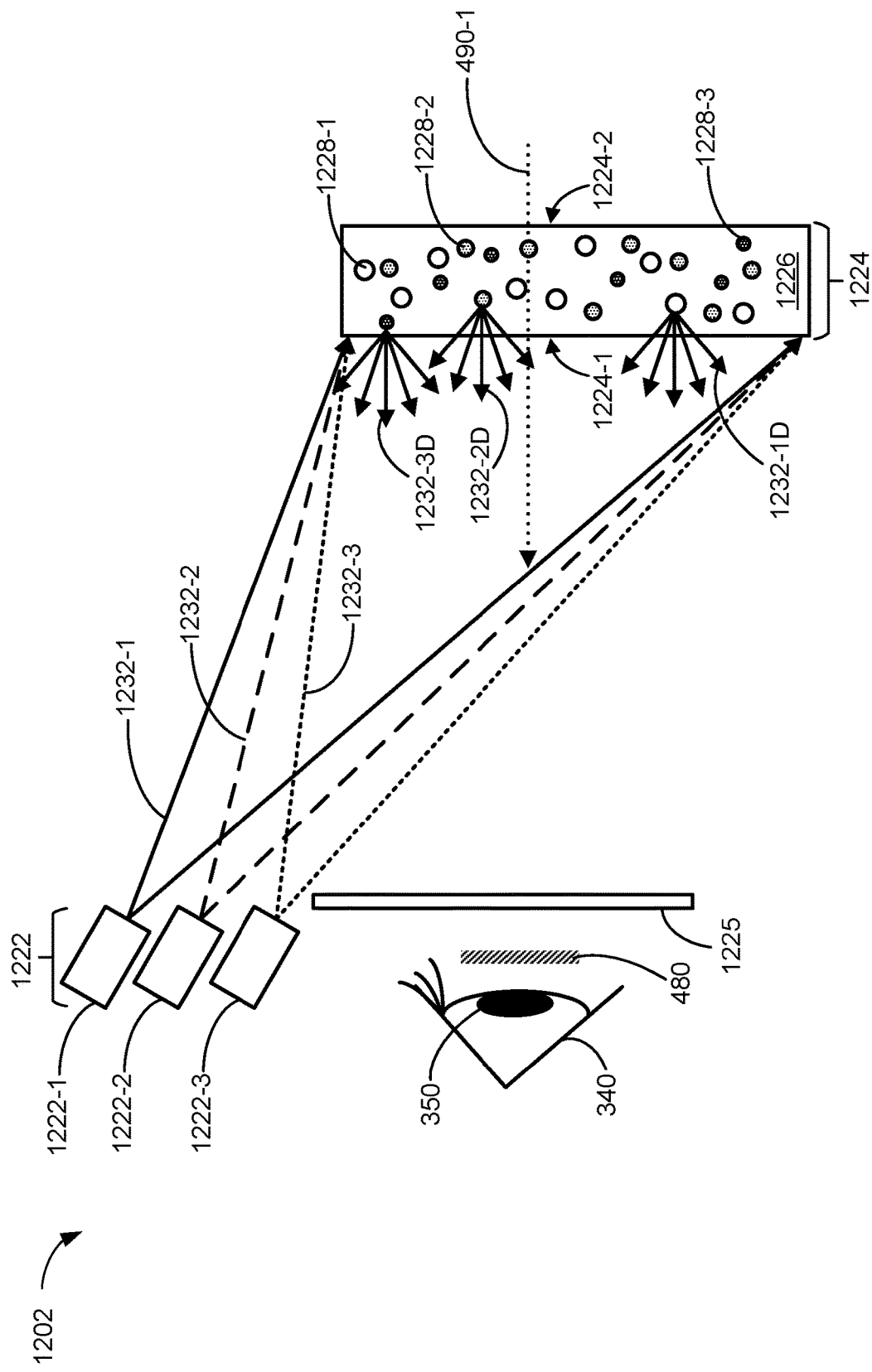

FIGS. 12C and 12D are schematic diagrams illustrating display device 1202 in accordance with some embodiments. As shown in FIG. 12C, display device 1202 includes one or more projectors 1222, corresponding to the one or more light sources 430 shown in FIG. 4D; a nanoparticle display 1224, corresponding to the non-emissive display 410-B shown in FIG. 4D; and an optical assembly 1225. Nanoparticle display 1224 has opposing surfaces 1224-1 and 1224-2 and includes a transparent material 1226 (e.g., acrylic or any other highly transparent plastic). Nanoparticle display 1224 also includes a plurality of nanoparticles 1228 (e.g., silver nanoparticles) that are embedded in transparent material 1226 and located between surfaces 1224-1 and 1224-5. The plurality of nanoparticles are configured to scatter (or diffuse) light in a specific wavelength range.

The one or more projectors 1222 are configured to project image light 1232 toward surface 1224-1 of nanoparticle display 1224. Nanoparticle display 1224 is configured to receive the image light 1232, diffuse the image light 1232, and output diffused image light 492. When the image light 1232 has a wavelength that is within the specific wavelength range, the plurality of nanoparticles 1228 are configured to diffuse the image light 1232 such that diffused image light 492 is output from the surface 1224-1 of the nanoparticle display 1224. The optical assembly 1225 is configured to receive the diffused image light 492 output from the nanoparticle display 1224 and to direct the diffused image light 492 toward eyebox 480. Details regarding the optical path of the diffused image light 492 through optical assembly 1225 is described above with respect to FIGS. 5A-5O, 6A-6C, and 7A-7C and is not repeated here for brevity.

The nanoparticle display 1224 is also configured to receive ambient light 490-1 at surface 1224-2 and to transmit the ambient light 490-1 from surface 1224-2 to surface 1224-1 with relatively low loss (e.g., less than 10% loss).

In some embodiments, the plurality of nanoparticles 1228 is configured to scatter light in a relative narrow spectral range (e.g., +/−20 nm of a certain wavelength). In such cases, the nanoparticle display 1224 is able to efficiently transmit (e.g., >90% transmission) the ambient light 490-1, allowing for high see-through visibility. In some embodiments, the plurality of nanoparticles 1228 is configured to scatter visible light without scattering infrared (IR) light.

In some embodiments, for example when the display is not used for AR applications, the plurality of nanoparticles 1228 may be configured to scatter broadband visible light (e.g., 400 nm-700 nm).

In some embodiments, as shown in FIG. 12D, display device 1202 may include more than one projector 1222. For example, as shown, the one or more projectors 1222 may include three projectors: projector 1222-1 configured to project image light 1232-1 having wavelength corresponding to red light (e.g., red image light), projector 1222-2 configured to project image light 1232-2 having wavelengths corresponding to green light (e.g., green image light), and projector 1222-3 1 configured to project image light 1232-3 having wavelengths corresponding to blue light (e.g., blue image light). Additionally, the projectors 1222 may be disposed anywhere around the periphery of the user's eyes. For example, projector 1222-1 may be disposed above the user's right eye and projector 1222-2 may be disposed below the user's right eye. In some embodiments, each projector may be configured to illuminate a different area of the nanoparticle display 1224. For example, projector 1222-1 may be configured to illuminate a top area of the nanoparticle display 1224, projector 1222-2 may be configured to illuminate a middle area of the nanoparticle display 1224, and projector 1222-3 may be configured to illuminate a bottom area of the nanoparticle display 1224. In some embodiments, each area of the different areas may overlap with at least one other area. Alternatively, the different areas may be distinct areas that do not overlap with one another.

Also shown in FIG. 12D, the plurality of nanoparticles 1228 may include nanoparticles of differing sizes. For example, the plurality of nanoparticles in FIG. 12D include nanoparticles 1228-1 that have a first size (e.g., white circles), nanoparticles 1228-2 that have a second size (e.g., gray circles), and nanoparticles 1228-3 that have a third size (e.g., black circles). The first, second, and third size are distinct from one another. In some embodiments, the size of a nanoparticle is predetermined and corresponds to a specific wavelength of light that the nanoparticle is configured to scatter. For example, nanoparticles 1228-1 may be configured (e.g., have a predetermined size) to scatter red light (e.g., ~630 nm+/−20 nm), nanoparticles 1228-2 may be configured (e.g., have a predetermined size) to scatter green light (e.g., ~530 nm+/−20 nm), and nanoparticles 1228-3 may be configured (e.g., have a predetermined size) to scatter blue light (e.g., ~420 nm+/−20 nm). Thus, red image light 1232-1 output from projector 1222-1 is scattered by nanoparticles 1228-1 such that diffused red image light 1232-1D is output from surface 1224-1 of nanoparticle display 1224. Similarly, green image light 1232-2 output from projector 1222-2 is scattered by nanoparticles 1228-2 such that diffused green image light 1232-2D is output from surface 1224-1 of nanoparticle display 1224, and blue image light 1232-3 output from projector 1222-3 is scattered by nanoparticles 1228-3 such that diffused blue image light 1232-3D is output from surface 1224-1 of nanoparticle display 1224. By including three differently sized nanoparticles in the plurality of nanoparticles, where nanoparticles of different sizes are configured to scatter light in different narrow spectral ranges (e.g., 420 nm+/−20 nm, 530 nm+/20 nm, and 630 nm+/−20 nm), color blending can be achieved using the image light(s) 1232 (e.g., red image light 1232-1, green image light 1232-2, and blue image light 1232-3) to create true colors in the displayed image while (e.g., low loss) ambient light 490-1 is efficiently transmitted through the nanoparticle display 1224.

Figure 13A:
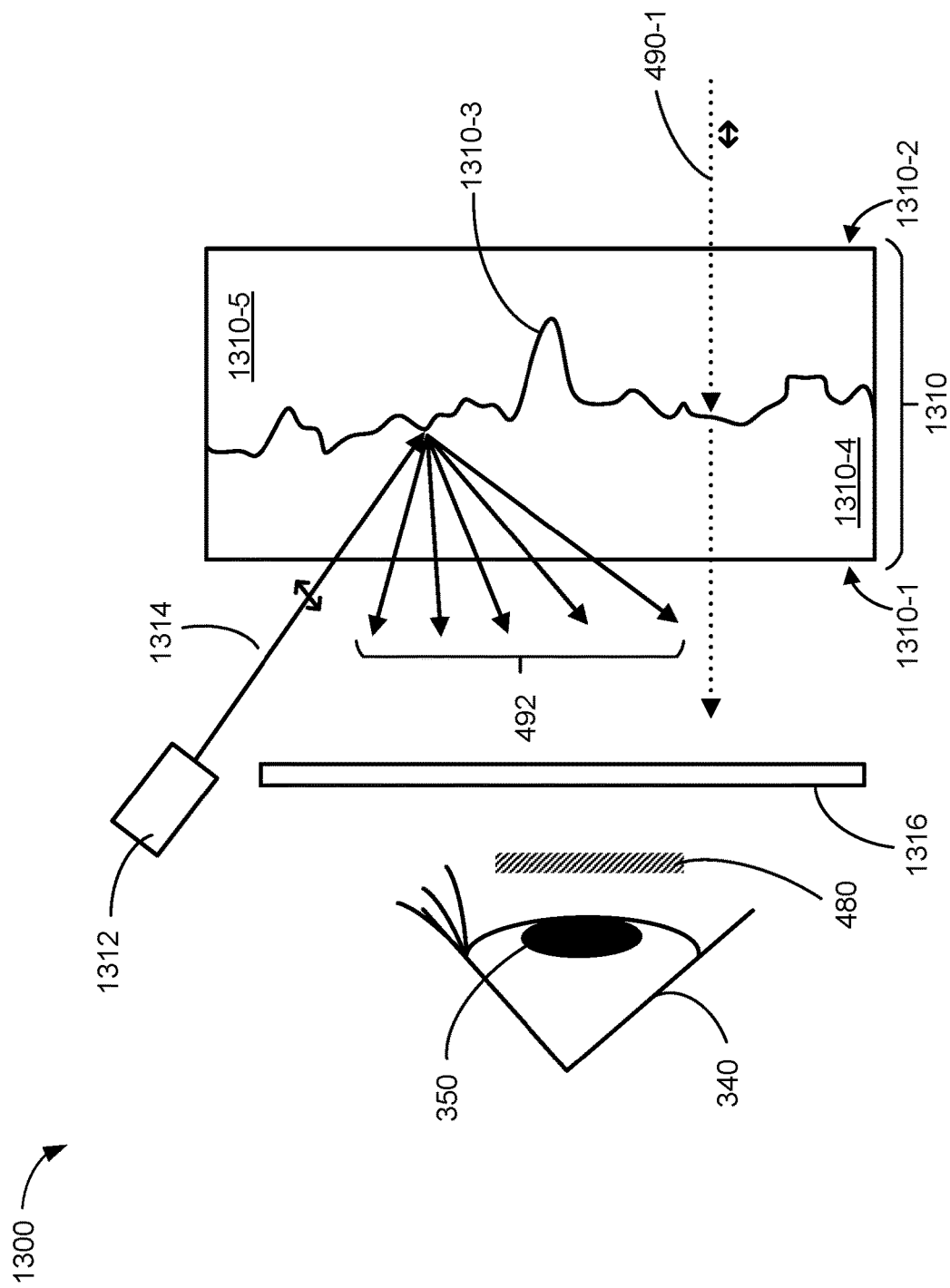
FIGS. 13A-13B are schematic diagrams illustrating a display device that includes an immersed diffusive reflector display in accordance with some embodiments.
Figure 13B:
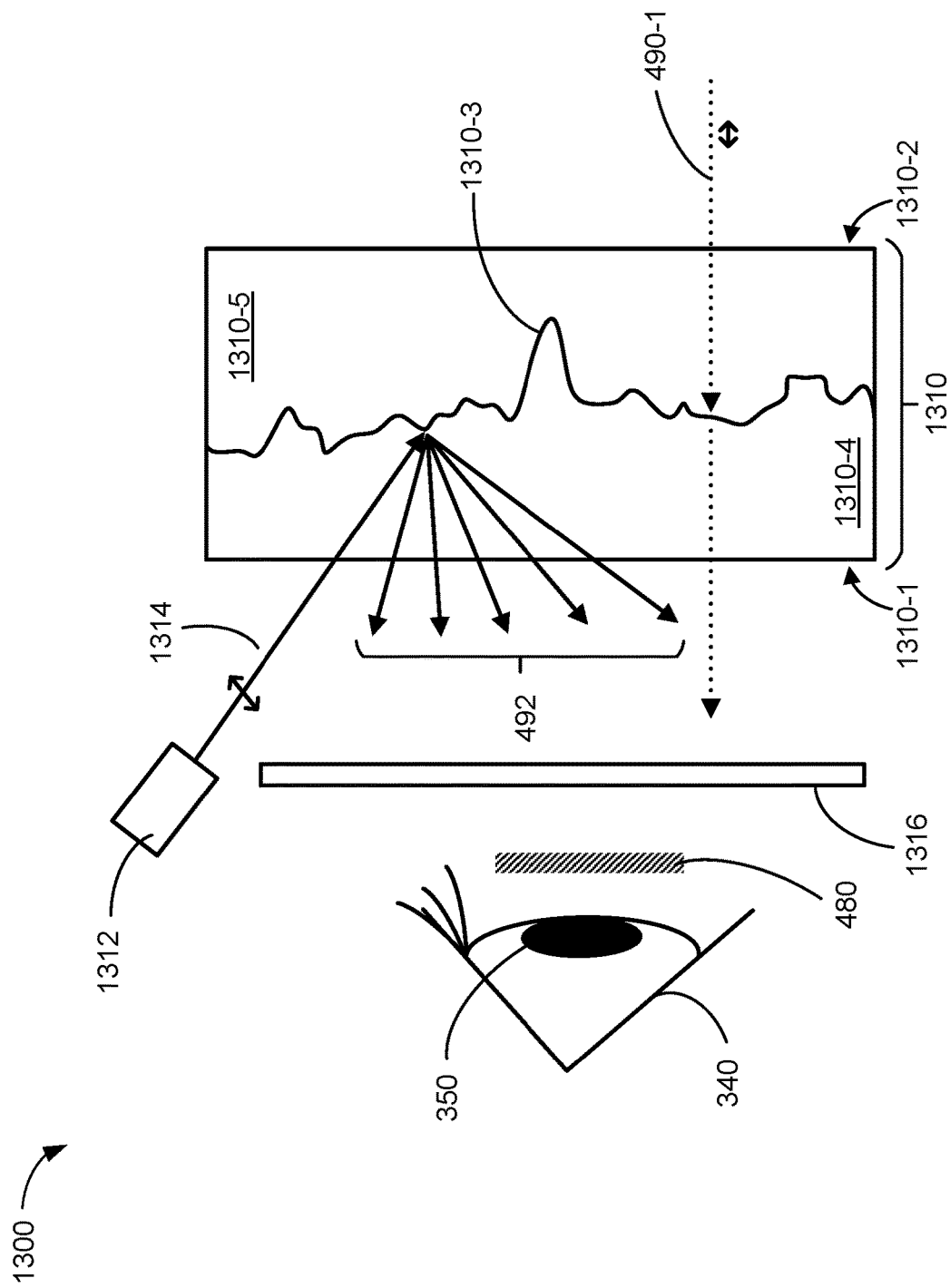

FIGS. 13A-13B are schematic diagrams illustrating a display device 1300 that includes an immersed diffusive reflector display 1310 in accordance with some embodiments. As shown, display device 1300 includes one or more light sources (e.g., one or more projectors, image sources) 1312, corresponding to the one or more light sources 430 shown in FIG. 4D; an immersed diffusive reflector display 1310, corresponding to the non-emissive display 410-B shown in FIG. 4D; and an optical assembly 1316. Immersed diffusive reflector display 1310 includes opposing surfaces 1310-1 and 1310-2, and a diffusive surface 1310-3 located between surface 1310-1 and surface 1310-2. Immersed diffusive reflector display 1310 also includes a first display portion 1310-4 that is located between surface 1310-1 and diffusive surface 1310-3 and a second display portion 1310-5 that is located between diffusive surface 1310-3 and surface 1310-2. The first display portion 1310-4 is made up of a first material that has a first refractive index and the second display portion 1310-5 of a second material that has a second refractive index that is substantially the same as the first refractive index. In some embodiments, the second material is the same as the first material and therefore, the second refractive index is the same as the first refractive index. Thus, the diffusive surface 1310-3 is immersed or sandwiched between the first display portion 1310-4 and the second display portion 1310-5. The diffusive surface 1310-3 can be a textured (e.g., non-smooth) surface of the first display portion 1310-4 or the second display portion 1310-5 with a reflective coating, such as a reflective polarizer or a beam splitter (e.g., 50/50 mirror) formed thereon. The diffusive surface is thus configured to reflect and scatter (or diffuse) at least a portion of the light incident thereon.

The one or more light sources 1312 are configured to emit image light 1314, corresponding to image light 432 shown in FIG. 4D, toward surface 1310-1 of immersed diffusive reflector display 1310. The immersed diffusive reflector display 1310 is configured to receive the image light 1314 and transmit at least a portion of the image light 1314 through the first display portion 1310-4 such that the transmitted portion of the image light 1314 is incident upon the diffusive surface 1310-3. In response to receiving the transmitted portion of the image light 1314, the diffusive surface 1310-3 is configured to reflect and diffuse (e.g., scatter) the portion of the image light 1314 as diffused image light 492. At least a portion of the diffused image light 492 is transmitted through the first display portion 1310-4 and output from the surface 1310-1 of the display 1310. The optical assembly 1316 is configured to receive the diffused image light 492 output from the immersed diffusive reflector display 1310 and to direct the diffused image light 492 toward eyebox 480. Details regarding the optical path of the diffused image light 492 through optical assembly 1316 is described above with respect to FIGS. 5A-5O, 6A-6C, and 7A-7C and is not repeated here for brevity.

The immersed diffusive reflector display 1310 is also configured to receive ambient light 490-1 at surface 1310-2 and to transmit the ambient light 490-1 from surface 1310-2 to surface 1310-1. Since the first display portion 1310-4 and the second display portion 1310-5 have substantially similar refractive indices (ideally, the same refractive index), a portion of the ambient light 490-1 is transmitted through first and second display portions 1310-4 and 1310-5 of the immersed diffusive reflector display 1310 with high efficiency (e.g., low loss).

In some embodiments, the diffusive surface 1310-3 also functions as a beam splitter or a 50/50 mirror. In such cases, at least half of the image light 1314 is transmitted through the diffusive surface 1310-3 to the second display portion 1310-5 and thus not reflected and diffused at the diffusive surface 1310-3 (e.g., at least 50% of the image light 1314 is lost). Similarly, at least half of the ambient light 490-1 is reflected at the diffusive surface 1310-3 and thus, is not transmitted to the first display portion 1310-4 (e.g., at least 50% of the ambient light 490-1 is reflected back to the ambient).

In some embodiments, the diffusive surface 1310-3 includes a reflective polarizer configured to reflect light having a first polarization (e.g., first linear polarization) and transmit light having a second polarization (e.g., second linear polarization) that is orthogonal to the first polarization. In such cases, as shown in FIG. 13B, the image light 1314 is configured to have the first linear polarization so that the image light 1314 is diffused and reflected at the diffusive surface 1310-3 as diffused image light 492. In some embodiments, the diffused image light 492 output from surface 1310-1 also has the first polarization. A portion of the ambient light 490-1 having the second linear polarization is transmitted through the diffusive surface 1310-3. In such cases, the immersed diffusive reflector display 1310 is able to output the diffused image light 492 and transmit a portion of the ambient light 490-1 with high efficiency and low loss.

Figure 14A:
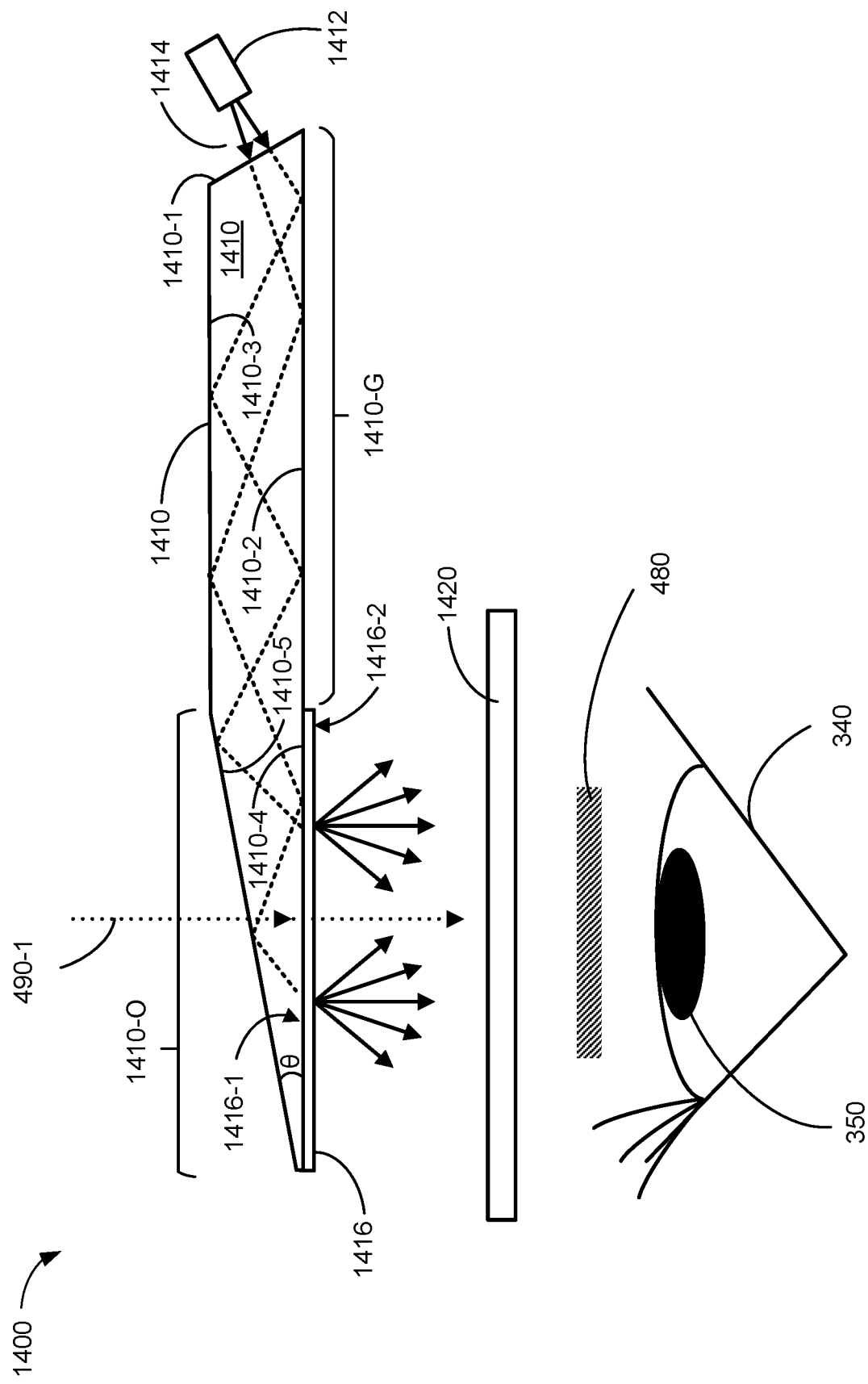
FIG. 14A is a schematic diagram illustrating a display device that includes wedge waveguide in accordance with some embodiments.

FIG. 14A is a schematic diagram illustrating a display device 1400 that includes a wedge waveguide 1410 in accordance with some embodiments. As shown, display device 1400 includes one or more projectors 1412, a wedge waveguide 1410, an optical diffuser 1416 that is coupled to the wedge waveguide 1410, and an optical assembly 1420. The wedge waveguide 1410 includes a guiding portion 1410-G located near a first end of the wedge waveguide 1410 and an output portion 1410-O (e.g., wedge portion) located near a second end of the wedge waveguide 1410. The wedge waveguide 1410 also includes an input surface 1410-1 that is disposed on the first end of the wedge waveguide 1410. In guiding portion 1410-G, the wedge waveguide 1410 includes two opposing surfaces 1410-2 and 1410-3 that are substantially parallel (e.g., forming an angle less than 5 degrees) with one another. In some embodiments, as shown, the input surface 1410-1 is not perpendicular to any of the opposing surfaces 1410-2 and 1410-3 in the guiding portion 1410-G of wedge waveguide 1410. In the output portion 1410-O, the wedge waveguide has an output surface 1410-4 and an opposing surface 1410-5 that forms an angle θ (e.g., an acute angle) with respect to the output surface 1410-4. The output surface 1410-4 is coupled (e.g., optically) to a surface 1416-1 of the optical diffuser 1416. The optical diffuser 1416 has two opposing surfaces 1416-1 and 1416-2.

The one or more projectors 1412 are configured to output image light 1414 toward the input surface 1410-1 of the wedge waveguide 1410. The image light 1414 is transmitted through the input surface 1410-1 and propagates towards the second end of the waveguide. In the guiding portion 1410-G of the wedge waveguide 1410, the image light 1414 is guided via total internal reflection with very low loss (e.g., less than 1% loss). In the output portion 1410-O of the wedge waveguide 1410, the image light 1414 is output from the wedge waveguide 1410 at the output surface 1410-2.

Due to the angle θ between the output surface 1410-2 and surface 1410-3, the image light 1414 is incident upon various portions of output surface 1410-2 at angles that do not meet the conditions for total internal reflection (e.g., the image light 1414 is incident upon various portions of output surface 1410-2 at angles that are smaller than the critical angle). Thus, the image light 1414 is output from the wedge waveguide 1410 at the output surface 1410-2 and coupled into optical diffuser 1416. The optical diffuser 1416 is configured to receive the image light 1414 output from the output surface 1410-2 of the wedge waveguide and to output diffused image light 492 from surface 1416-2 of the optical diffuser 1416. The optical assembly 1420 is configured to receive the diffused image light 492 output from the optical diffuser 1416 and to direct the diffused image light 492 toward eyebox 480. Details regarding the optical path of the diffused image light 492 through optical assembly 1420 is described above with respect to FIGS. 5A-5O, 6A-6C, and 7A-7C and is not repeated here for brevity.

Figure 14B:
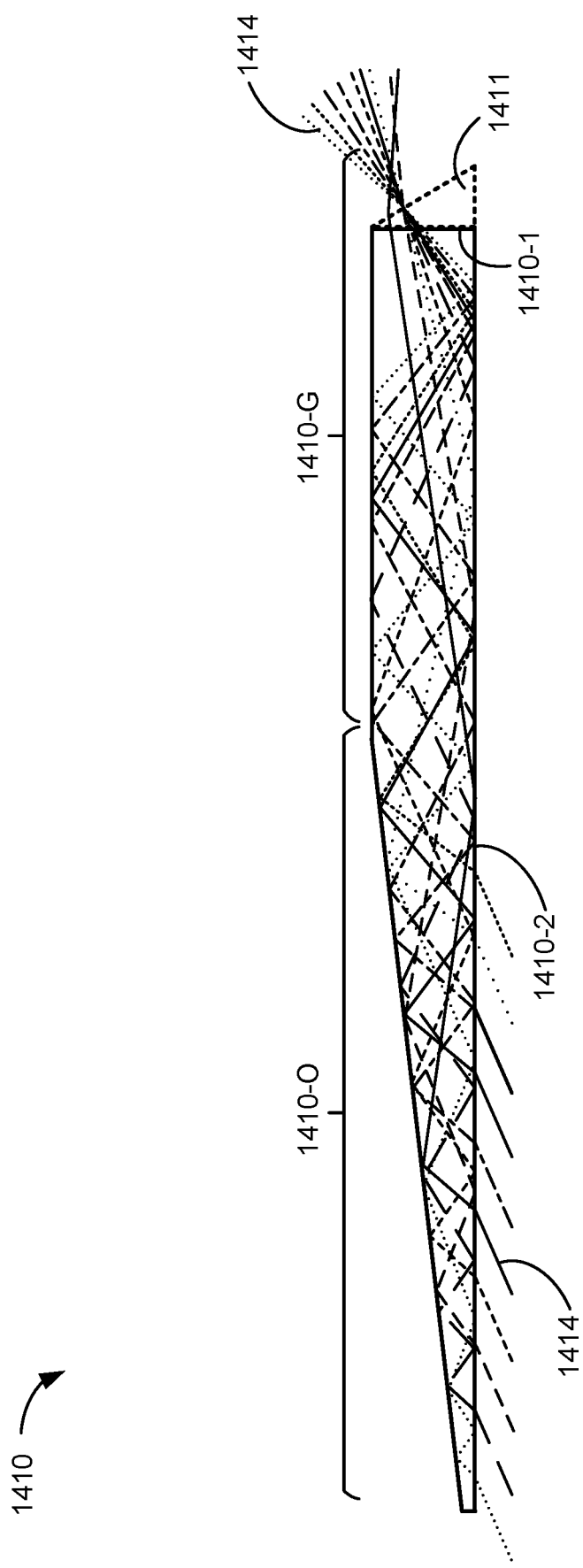
FIG. 14B is a schematic diagram illustrating examples of optical paths in an wedge waveguide in accordance with some embodiments.

FIG. 14B is a schematic diagram illustrating examples of optical paths in an wedge waveguide in accordance with some embodiments. As shown, the image light 1414 enters wedge waveguide 1410 via input surface 1410-1. The image light 1414 is guided via total internal reflection in the guiding portion 1410-G of wedge waveguide 1410. In the output portion 1410-O of wedge waveguide 1410, the image light 1414 is output from the output surface 1410-2. The optical paths for image light 1414 transmitted through wedge waveguide 1410 are illustrated in FIG. 14B with differently dashed lines representing rays with a different incident angle upon input surface 1410-1.

In some embodiments, as shown in FIG. 14B, wedge waveguide 1410 includes a coupling component (e.g., a coupling prism, a coupling optical element, customized optics such as a customized lens or a customized holographic optical element) that is configured to receive the image light 1414 output from the projector 1412 and couple the image light 1414 into wedge waveguide 1410 via input surface 1410-1.

Figure 15:
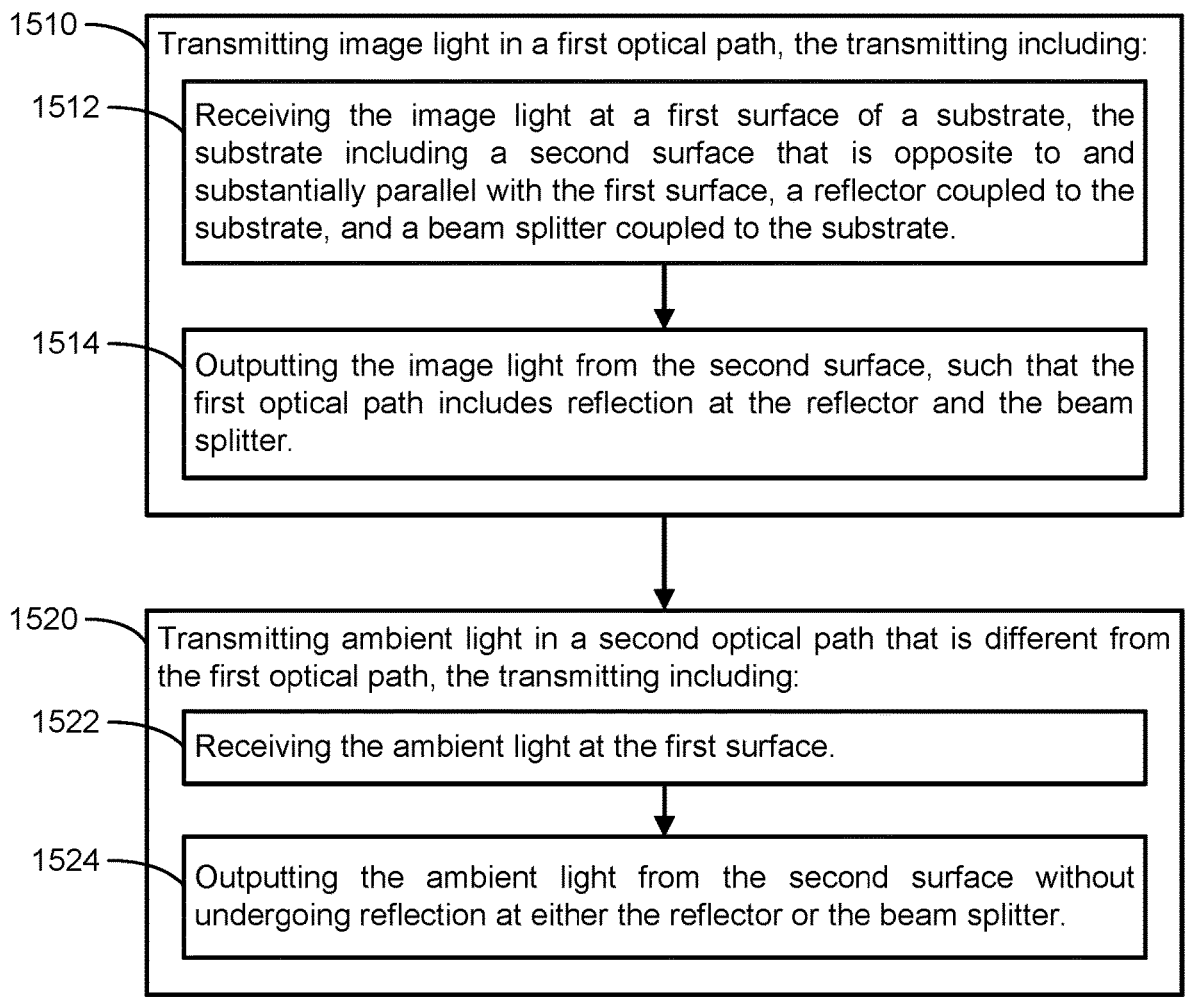
FIG. 15 is a flowchart illustrating a method of transmitting light through an optical assembly in accordance with some embodiments.

FIG. 15 is a flowchart illustrating a method 1500 of transmitting light through an optical assembly (e.g., optical assembly 412, 500-504, 600) in accordance with some embodiments. The method 1500 includes (step 1510) transmitting image light 492 in a first optical path, which includes (step 1512) receiving the image light 492 at a surface 510-1 of a substrate 510. The substrate 510 also includes surface 510-2 that is opposite to and substantially parallel (e.g., forming an angle between 89 degrees and 91 degrees) with surface 510-1, as well as a reflector 512 that is coupled to substrate 510, and a beam splitter 514 that is coupled to substrate 510. The method 1500 also includes (step 1514) outputting the image light from the second surface such that the first optical path includes reflection at the reflector and the beam splitter. The method 1500 further includes (step 1520) transmitting the ambient light 490-1 and 490-2 in a second optical path that is different from the first optical path. Transmitting the ambient light includes (step 1522) receiving the ambient light 490 at surface 510-1 and (step 1524) outputting the ambient light 490-1 and 490-2 from the second surface 510-2 without undergoing reflection at either the reflector 512 or the beam splitter 514.

In some embodiments, the method 1500 also includes outputting the image light 492 at a first optical power and transmitting the ambient light at a second optical power that is less than the first optical power. In some embodiments, the second optical power is zero.

In some embodiments, the method 1500 also includes transmitting the ambient light 490-1 and 490-2 without adding significant optical distortions and/or aberrations.

Figure 16:
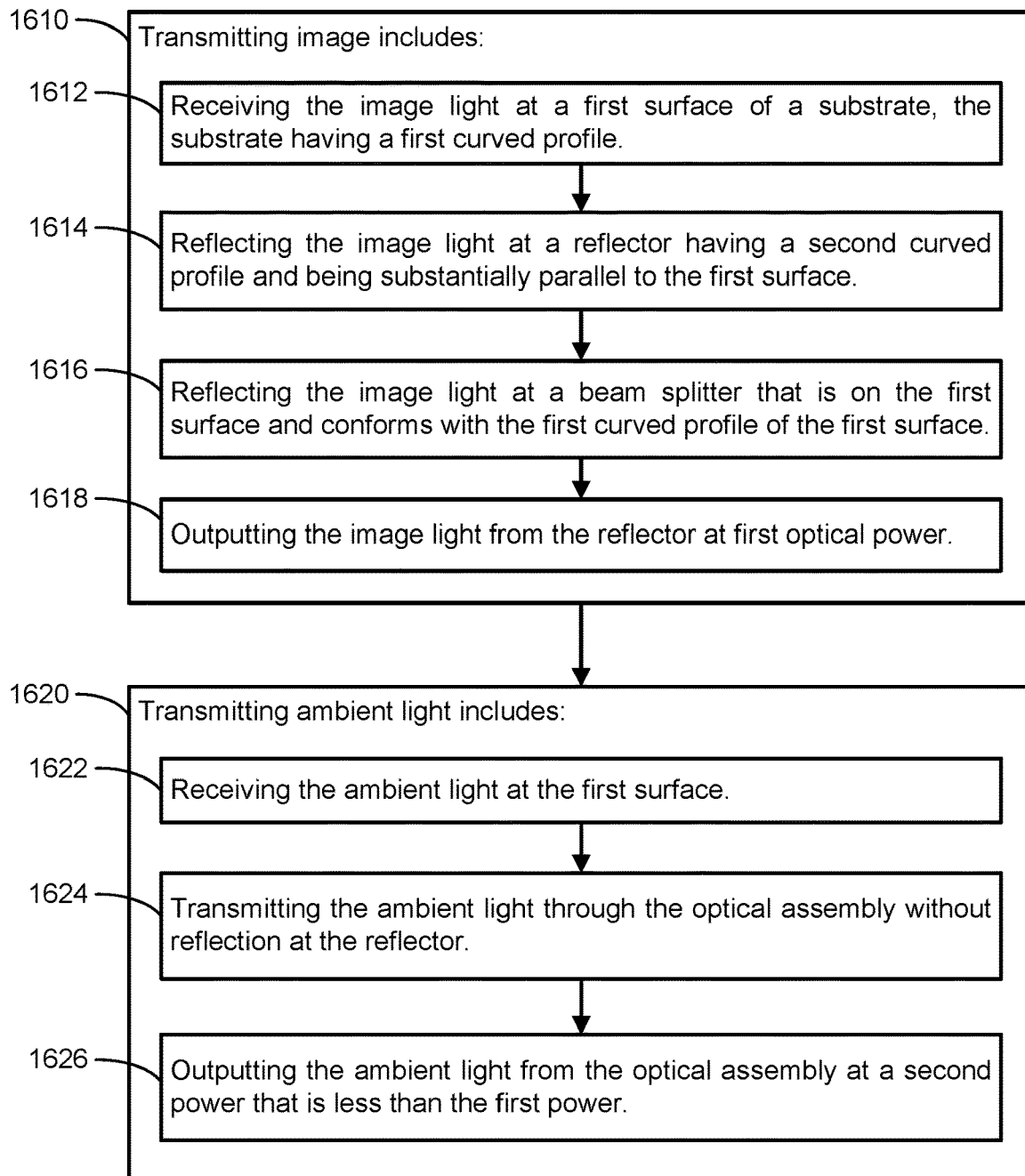
FIG. 16 is a flowchart illustrating a method of transmitting light through an optical assembly in accordance with some embodiments.

FIG. 16 is a flowchart illustrating a method 1600 of transmitting light through an optical assembly (e.g., optical assembly 600) in accordance with some embodiments. The method 1600 of (step 1610) transmitting image light 492 includes (step 1612) receiving the image light 492 at a curved surface 610-1 of a substrate 610. The curved surface 610-1 has a first curved profile. The method 1600 also includes (step 1614) reflecting the image light 492 at a reflector 612 that has a second curved profile and is substantially parallel to curved surface 610-1, and (step 1616) reflecting the image light 492 at a beam splitter 614. The beam splitter 614 is on curved surface 610-1 and conforms to the curved profile of curved surface 610-1. The method 1600 also includes (step 1618) outputting the image light from the reflector 612 at a first optical power. The method 1600 of (step 1620) transmitting the ambient light 490-1 and 490-2 includes (step 1622) receiving the ambient light 490-1 and 490-2 at curved surface 610-1 and (step 1624) transmitting the ambient light 490-1 and 490-2 through the optical assembly 600 without reflection at the reflector 612. The method 1600 also includes (step 1626) outputting the ambient light 490-1 and 490-2 from the optical assembly 600 at a second power that is less than the first power. In some embodiments, the second optical power is zero.

In some embodiments, the method 1500 also includes transmitting the ambient light 490-1 and 490-2 without adding significant optical distortions and/or aberrations.

FIG. 17 is a flowchart illustrating a method 1700 of transmitting light through an optical assembly 700 that includes a VBG 714 in accordance with some embodiments. The method 1700 includes (step 1710) transmitting image light 492 in a first optical path and (step 1720) transmitting ambient light 490-1 in a second optical path that is different from the first optical path. Transmitting the image light 492 includes (step 1712) receiving the image light 492 at a first surface 710-1 of a substrate 710. The substrate 710 also includes a second surface 710-2 that is opposite to and substantially parallel with the first surface 710-1, a reflector 712, and a VBG 714. The VBG 714 is configured to transmit light incident upon the VBG at an incident angle that is within a first predetermined angular range θ1, and reflect light incident upon the VBG at an incident angle that is within a second predetermined angular range θ2 that is distinct from the first predetermined angular range. Transmitting the image light 492 also includes (step 1714) outputting the image light 492 from the second surface 710-2 at a first optical power via an optical path that includes reflection at the reflector 712 and at the VBG 714. The method 1700 also includes (step 1720) transmitting the ambient light 490-1 in a second optical path that is different from the first optical path. Transmitting the ambient light 490-1 includes (step 1722) receiving the ambient light 490-1 at the first surface and (step 1724) outputting the ambient light 490-1 from the second surface 710-2 at a second optical power via a second optical path that does not include reflection at either the reflector 712 or the VBG 714. The second optical power is less than the first optical power.

Figure 18:
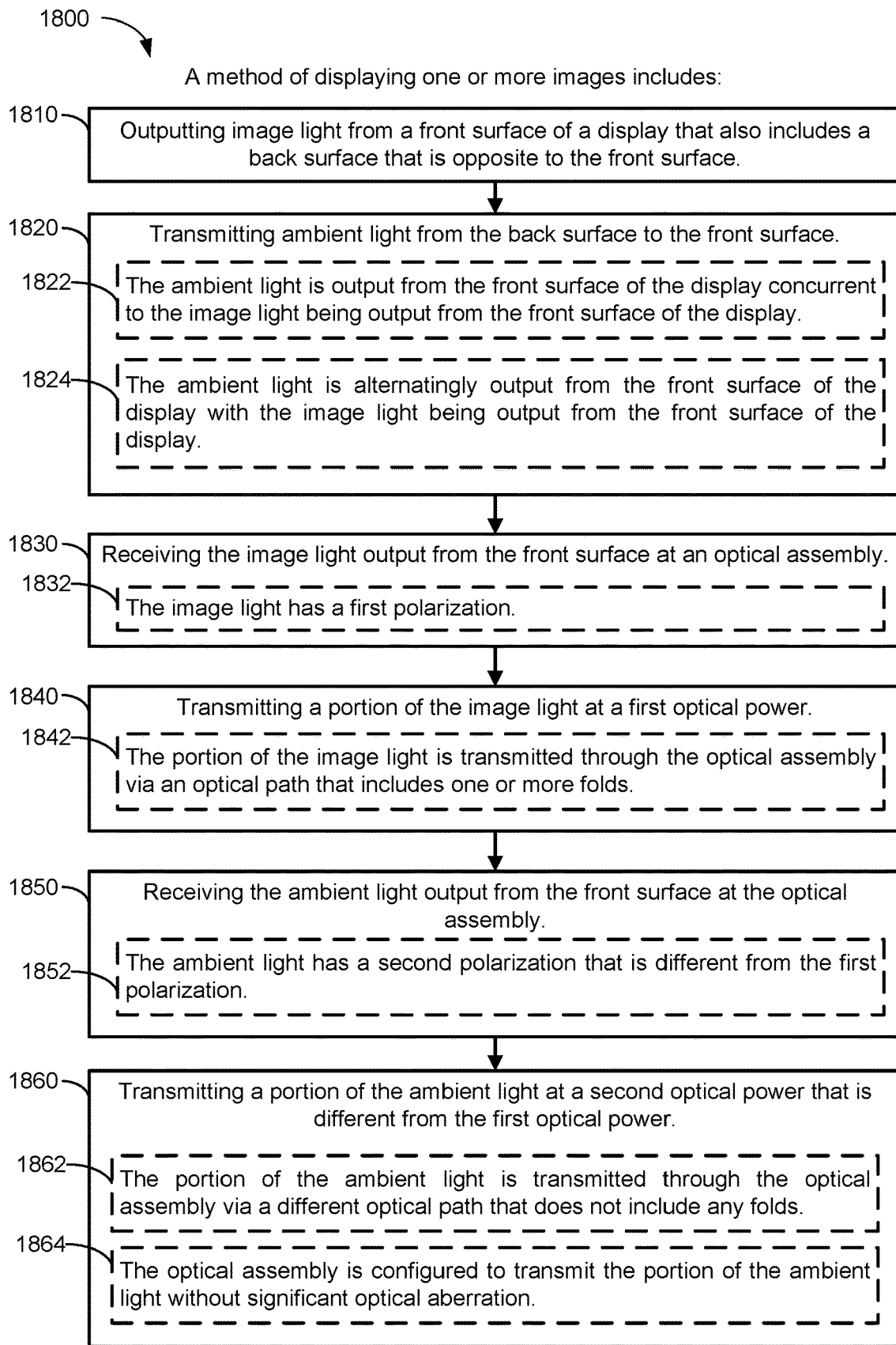
FIG. 18 is a flowchart illustrating a method of operating a display device for augmented reality applications in accordance with some embodiments.

FIG. 18 is a flowchart illustrating a method 1800 of operating a display device 400 for augmented reality applications in accordance with some embodiments. The method 1800 includes (step 1810) outputting image light 492 from a front surface 410-2 of a display 410. The display 410 also includes a back surface 410-1 that is opposite to the front surface 410-2. The method 1800 also includes (step 1820)

transmitting ambient light 490-1 from the back surface 410-1 to the front surface 410-2. The method 1800 further includes (step 1830) receiving the image light 492 output from the front surface 410-2 at an optical assembly 412 and (step 1840) transmitting a portion of the image light 492 at a first optical power. The method 1800 also includes (step 1850) receiving the ambient light 490-1 output from the front surface 410-2 at the optical assembly 412 and (step 1860) transmitting a portion of the ambient light 490-1 at a second optical power that is different from the first optical power. In some embodiments, the second optical power is les than the first optical power. In some embodiments, the second optical power is zero or negligible.

In some embodiments, (step 1822) the ambient light 490-1 is output from the front surface 410-2 of the display 410 concurrent to the image light 492 being output from the front surface 410-2 of the display 410.

In some embodiments, (step 1824) the ambient light 490-1 is alternatingly output from the front surface 410-2 of the display 410 with the image light 492 being output from the front surface 410-2 of the display 410.

In some embodiments, (step 1832) the image light 492 has a first polarization (e.g., RCP) and (step 1852) the ambient light 490-1 has a second polarization that is different from (e.g., orthogonal to) the first polarization.

In some embodiments, (step 1842) the portion of the image light 492 is transmitted through the optical assembly 412 via an optical path that includes one or more folds and (step 1862) the portion of the ambient light 490-1 is transmitted through the optical assembly 412 via a different optical path that does not include any folds.

In some embodiments, the optical assembly 412 is configured to transmit the portion of the ambient light 490-1 without significant optical aberration.

Figure 19:
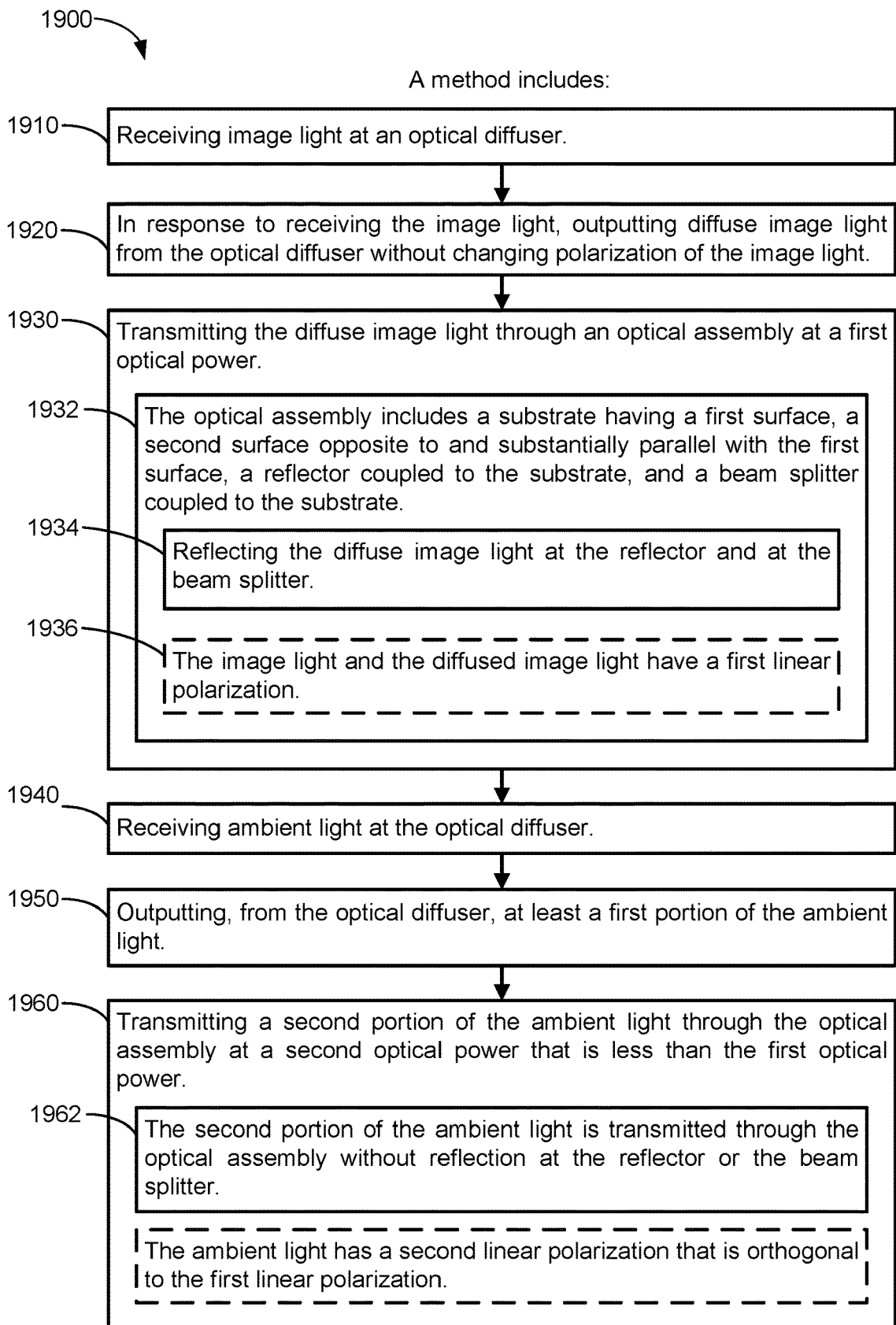
FIG. 19 is a flowchart illustrating a method of transmitting light in a display device that includes an optical diffuser display in accordance with some embodiments.

FIG. 19 is a flowchart illustrating a method 1900 of transmitting light in a display device that includes an optical diffuser display in accordance with some embodiments. Method 1900 includes (step 1910) receiving image light 1090 an optical diffuser display 1020 and in response to receiving the image light 1090, (step 1920) outputting diffused image light 1092 from the optical diffuser display 1020 without changing polarization of the image light. The method 1900 also includes (step 1930) transmitting the diffused image light 1092 through an optical assembly 1030 at the first non-zero optical power. As shown in step 1932, the optical assembly 1030 includes a substrate having a first surface and a second surface opposite to and substantially parallel with the first surface, a reflector coupled to the substrate, and a beam splitter coupled to the substrate. Transmitting the diffused image light 1092 through the optical assembly 1030 at the first non-zero optical power includes (step 1934) reflecting the diffused image light 1092 at the reflector and at the beam splitter. Method 1900 further includes (step 1940) receiving ambient light 490-1 at the optical diffuser display 1020 and (step 1950) outputting, from the optical diffuser display 1020, at least a first portion of the ambient light 490-1. The method 1900 also includes (step 1960) transmitting a second portion of the ambient light 490-1 through the optical assembly 1030 at a second optical power that is less than the first optical power. As shown in step 1962, the second portion of the ambient light 490-1 is transmitted through the optical assembly 1030 without reflection at the reflector or the beam splitter.

In some embodiments, the image light 1090 and the diffused image light 1092 have a first linear polarization, and the ambient light has a second linear polarization that is orthogonal to the first linear polarization.

In some embodiments, the method 1900 also includes projecting the image light 1090 from a projector 1010 towards the optical diffuser display 1020, receiving the image light 1090 at the optical diffuser display 1020, and diffusing the image light 1090 at the optical diffuser display 1020 such that the diffused image light 1092 is output from the optical diffuser display 1020.

In some embodiments, the image light 1090 is received at a second surface 1020-2 of the optical diffuser display 1020 and the diffused image light 1092 is output from the second surface 1020-2 of the optical diffuser display 1020.

In some embodiments, the optical diffuser display 1020 is configured to receive the image light 1090 propagating in a first direction and to diffuse the image light 1090 such that the diffused image light 1092 propagates in a plurality of directions.

In some embodiments, the first portion of the ambient light 490-1 is transmitted through the optical diffuser display 1020 concurrent to the diffused image light 1092 being output from the optical diffuser display 1020 and the second portion of the ambient light 490-1 and diffused image light 1092 are concurrently transmitted through the optical assembly 1030.

In some embodiments, the second optical power is zero.

In some embodiments, the second portion of the ambient light 490-1 is transmitted through the optical assembly 1030 without significant optical aberration, and preferably, no optical aberration.

In some embodiments, the substrate of the optical assembly 1030 has a substantially uniform thickness.

Figure 20A:
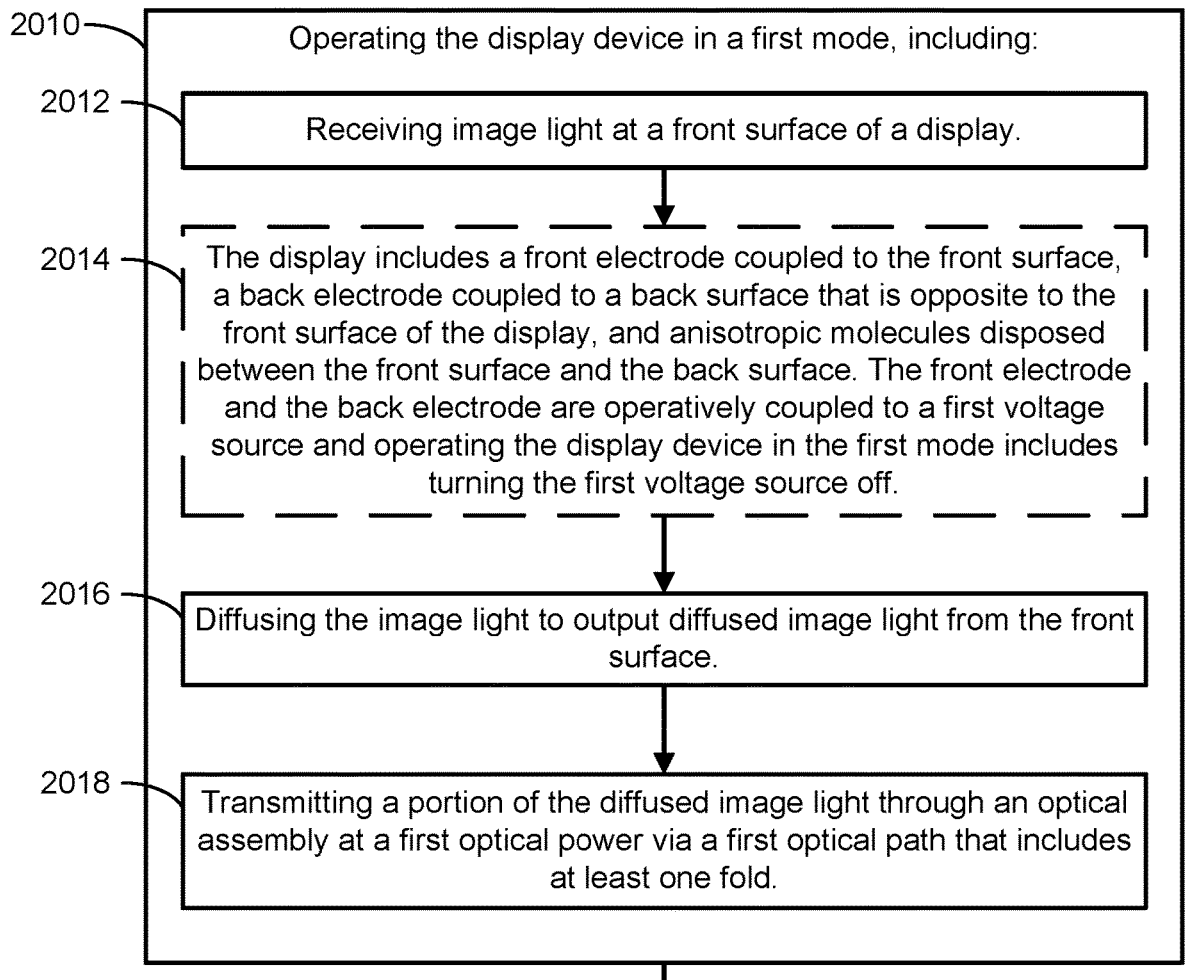
FIGS. 20A-20C are flowcharts illustrating a method of operating a switchable display device in accordance with some embodiments.
Figure 20B:
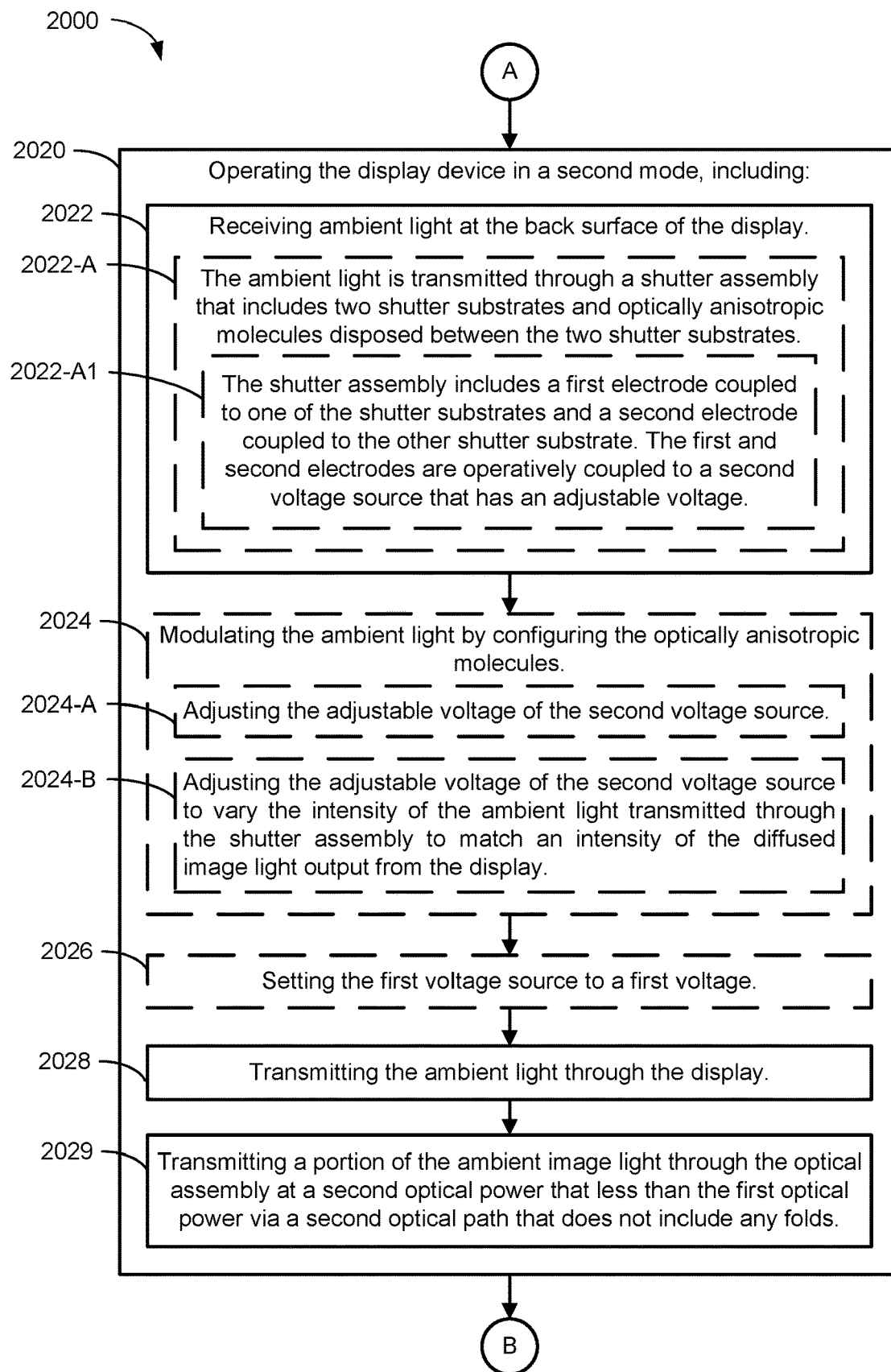
Figure 20C:
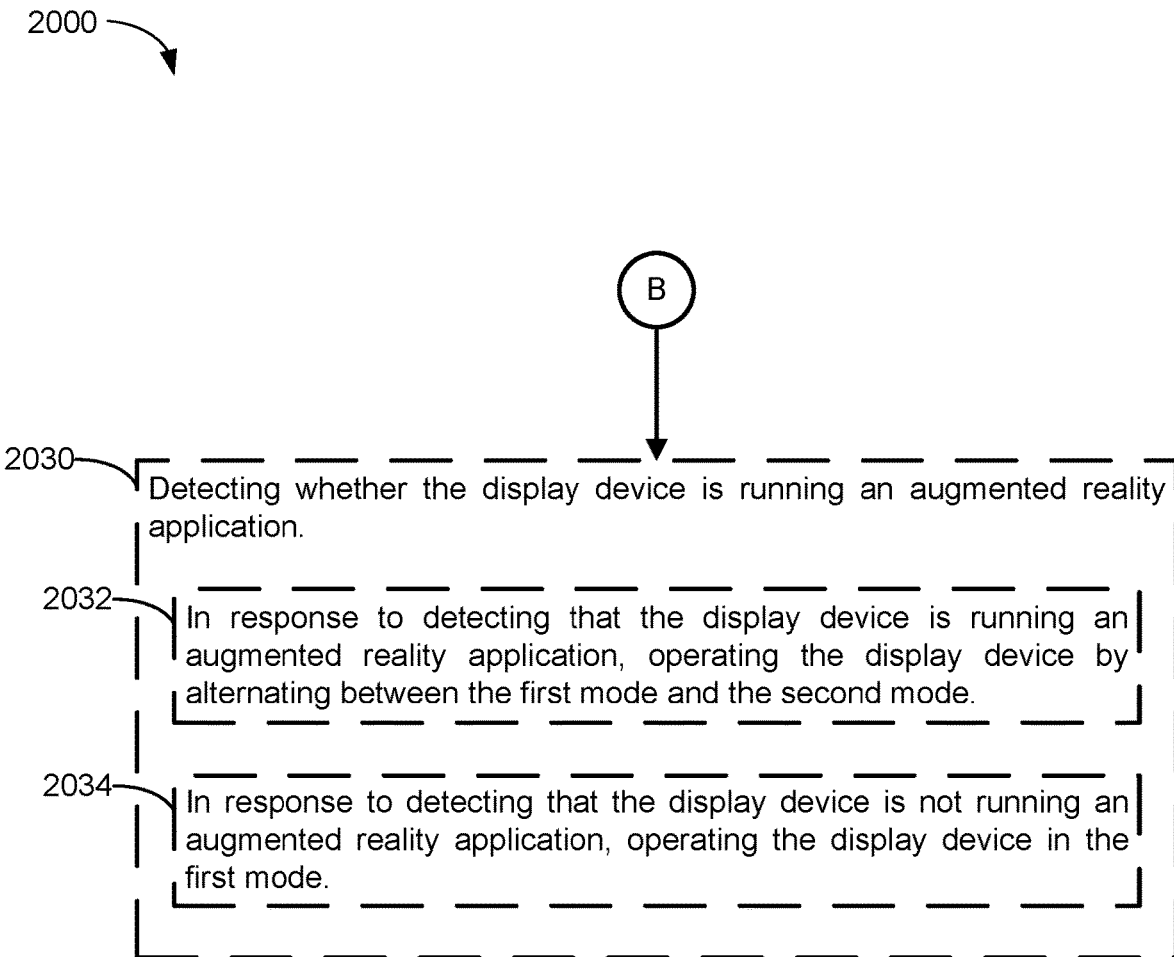

FIGS. 20A-20C are flowcharts illustrating a method 2000 of operating a switchable display device 1100 in accordance with some embodiments. The method 2000 includes (step 2010) operating the switchable display device 1100 in a first mode. Operating the switchable display device 1100 includes (step 2012) receiving the image light 1190 at a front surface 1110-1 of a switchable display 1110, (step 2016) diffusing the image light 1190 to output diffused image light 492 from the front surface 1110-1, and transmitting a portion of the diffused image light 492 through an optical assembly 1130 at a first optical power via a first optical path that includes at least one fold. In some embodiments, (step 2014) the switchable display 1110 includes a front electrode 1112-1 that is coupled to the front surface 1110-1, a back electrode 1112-2 that is coupled to a back surface 1110-2, and optically anisotropic molecules 1110-3 that are disposed between the front surface 1110-1 and the back surface 1110-2. The front electrode 1112-1 and the back electrode 1112-2 are operatively coupled to a first voltage source V1. Operating the display device 1100 in the first mode includes turning the first voltage source V1 off.

The method 2000 also includes (step 2020) operating the display device 1100 in a second mode, which includes (step 2022) receiving ambient light 490-1 at the back surface 1110-2 of the switchable display 1110. In some embodiments, (step 2022-A) the ambient light 490-1 is transmitted through a shutter assembly 1120 that includes two substrates 1120-1 and 1120-2 and optically anisotropic molecules 1120-3 that are disposed between the two shutter substrates. In some embodiments, (step 2022-A1) the shutter assembly 1120 includes a first electrode 1122-1 that is coupled to one of the substrates 1120-1 and a second electrode 1122-2 that is coupled to the other substrate 1120-2. The first and second electrodes are operatively coupled to a second voltage source V2 that has an adjustable voltage. In some embodiments, method 2000 also includes (step 2024) modulating the ambient light 490-1 (e.g., modulating an intensity of the ambient light 490-1) by configuring the optically anisotropic molecules 1120-3. This may include (step 2024-A) adjusting the adjustable voltage of the second voltage source V2. In some embodiments, the adjustable voltage of the second voltage source V2 is adjusted to vary the intensity of the ambient light 490-1' transmitted through the shutter assembly 1120 to match an intensity of the diffused image light 492 output from the switchable display 1110. In some embodiments, operating the display device 1100 in the second mode also includes (step 2026) setting the first voltage source V1 to a first voltage, (step 2028) transmitting the ambient light 490-1' through the switchable display 1110, and (step 2029) Transmitting a portion of the ambient light 490-1' through the optical assembly 1130 at a second optical power that is less than the first optical power via a second optical path that does not include any folds.

In some embodiments, the method 2000 also includes (step 2030) detecting whether the display device 1100 is running an augmented reality application. In response to (step 3032) detecting that the display device 1100 is running an augmented reality application, operating the display device 1100 by alternating between the first mode and the second mode and in response to (step 3034) detecting that the display device 1100 is not running an augmented reality application, operating the display device in the first mode.

FIGS. 21A-21D are flowcharts illustrating a method 2100 of displaying one or more images. The method 2100 includes (step 2112) projecting image light (e.g., image light 1212, 1232, 1314, 1414, 432) from one or more projectors (e.g., one or more projectors 1210, 1222, 1312, 1412). The method 2100 also includes (step 2112) receiving, at a display (e.g., display 1214, 1224, 1310, 1400, 410), the image light projected from the one or more projectors; (step 2114) diffusing the image light at the display; and (step 2116) outputting diffused image light (e.g., diffused image light 492, 1232-1D, 1232-2D, 1232-3D) from a first surface (e.g., surface 1214-1, 1224-1, 1310-1, 1416-2) of the display. The method further includes (step 2118) receiving ambient light (e.g., ambient light 490-1) at a second surface (e.g., surface 1214-2, 1224-2, 1310-2, 1410-2) of the display and (step 2020) outputting the ambient light from the first surface of the display. The second surface is opposite to the first surface. The method 2100 also includes (step 2122) receiving, at an optical assembly (e.g., optical assembly 1218, 1225, 1316, 1240, 412, 500-504, 600), any of the image light and the ambient light; (step 2124) transmitting the image light in a first optical path that includes one or more folds; and (step 2126) transmitting the ambient light in a second optical path that is different from the first optical path.

In some embodiments, the optical assembly is configured to transmit the diffused image light with a first non-zero optical power and to transmit the ambient light at a second optical power that is different from (e.g., less than) the first optical power. In some embodiments, the second optical power is zero.

In some embodiments, (step 2110-A) the one or more projectors are disposed at an off-axis position relative to an optical axis of the display, and the one or more projectors are located less than 2 inches from the display.

Figure 21A:
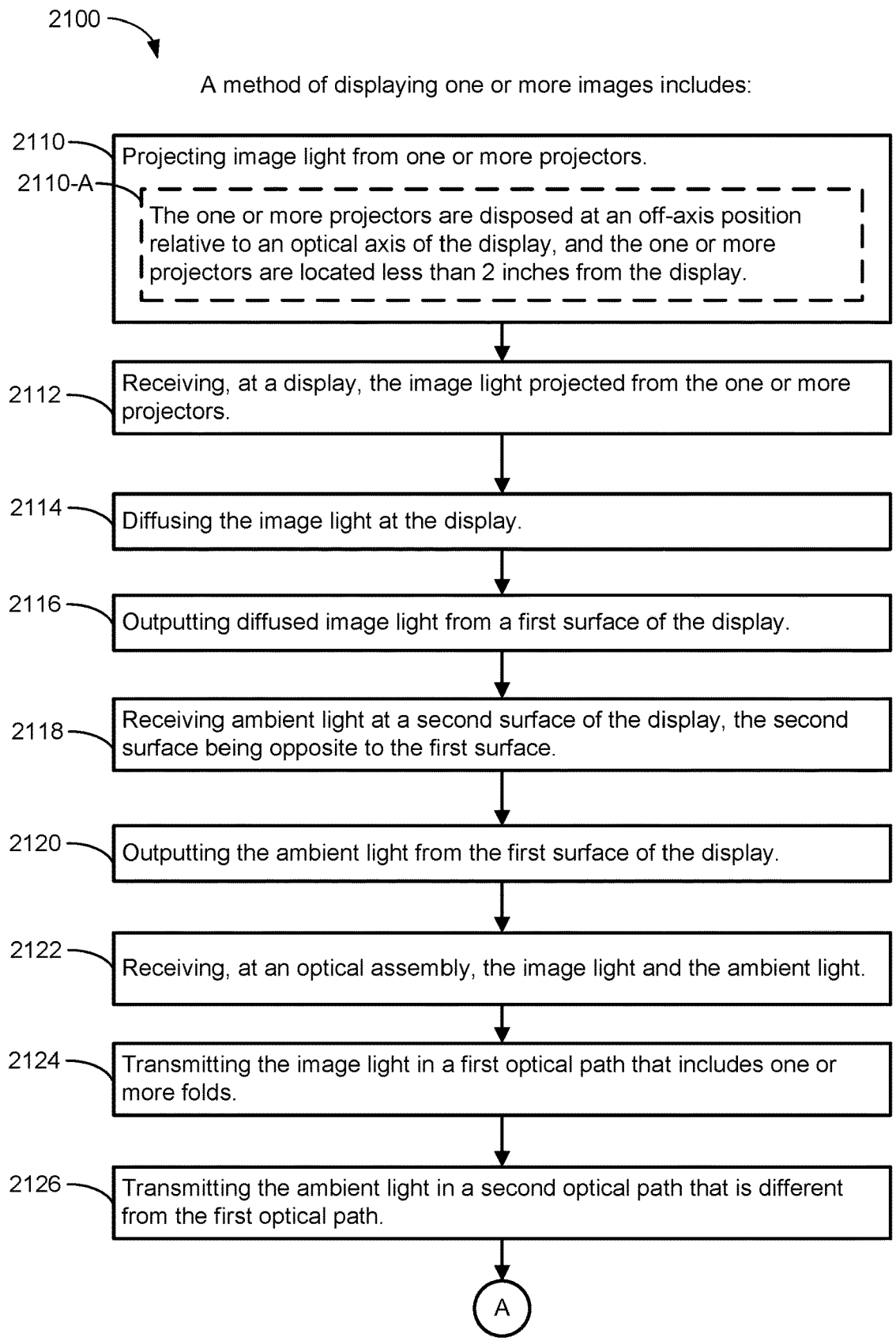
FIGS. 21A-21D are flowcharts illustrating a method of displaying one or more images in accordance with some embodiments.
Figure 21B:
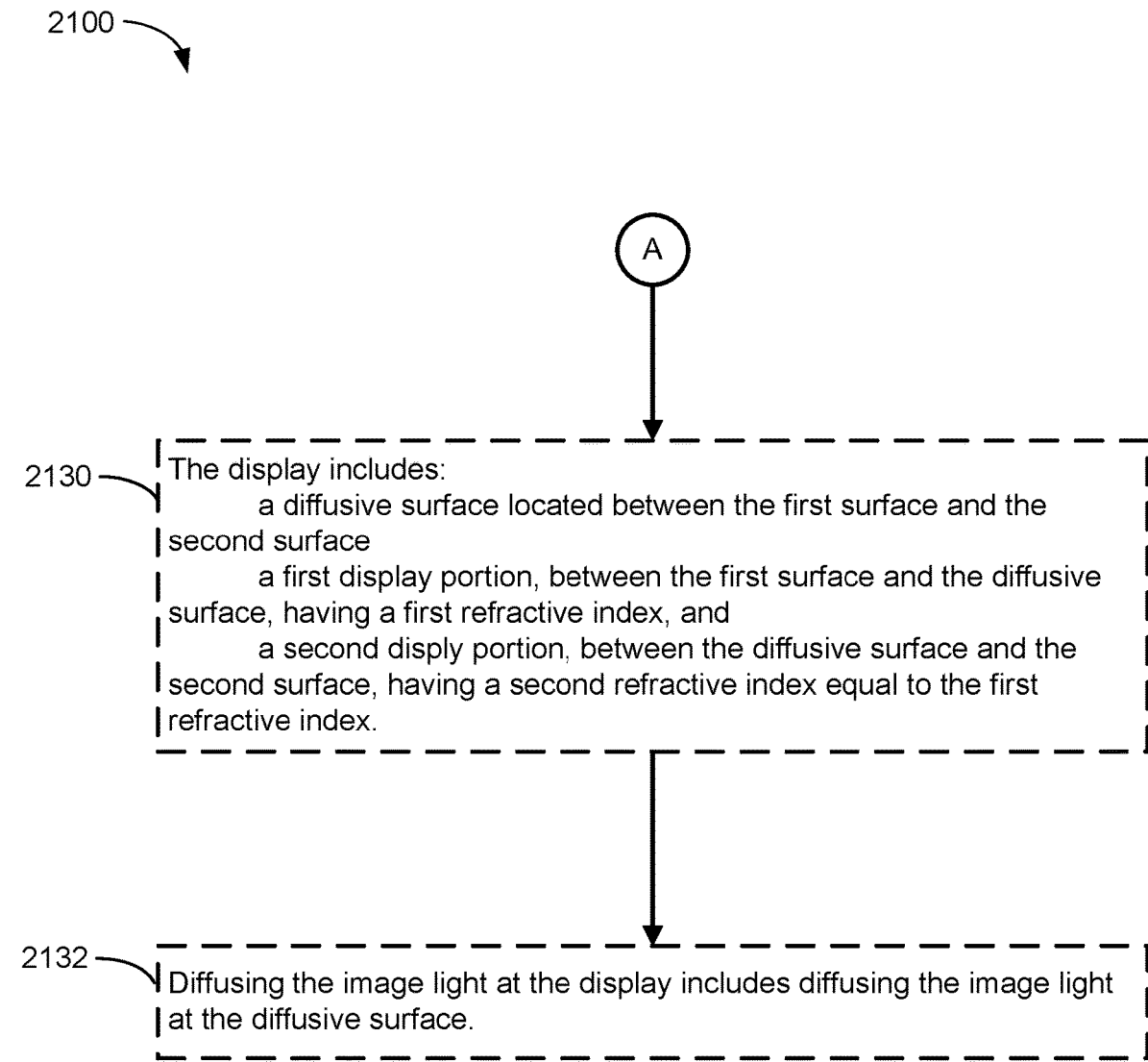

In some embodiments, as shown in FIG. 21B, in step 2130, the display 1310 includes diffusive surface 1310-3 that is located between the first surface 1310-1 and the second surface 1310-2 of the display 1310. The display 1310 also includes a first display portion 1310-4) that is located between the first surface 1310-1 of the display and the diffusive surface 1310-3, and has a first refractive index. The display also includes a second display portion 1310-5 that is located between the diffusive surface 1310-3 and the second surface 1310-2, and has a second refractive index that is equal to the first refractive index. The diffusive surface is configured to diffuse the image light 1314. In such cases, (step 2132) diffusing the image light 1314 at the display 1310 includes diffusing the image light 1314 at the diffusive surface 1310-3.

Figure 21C:
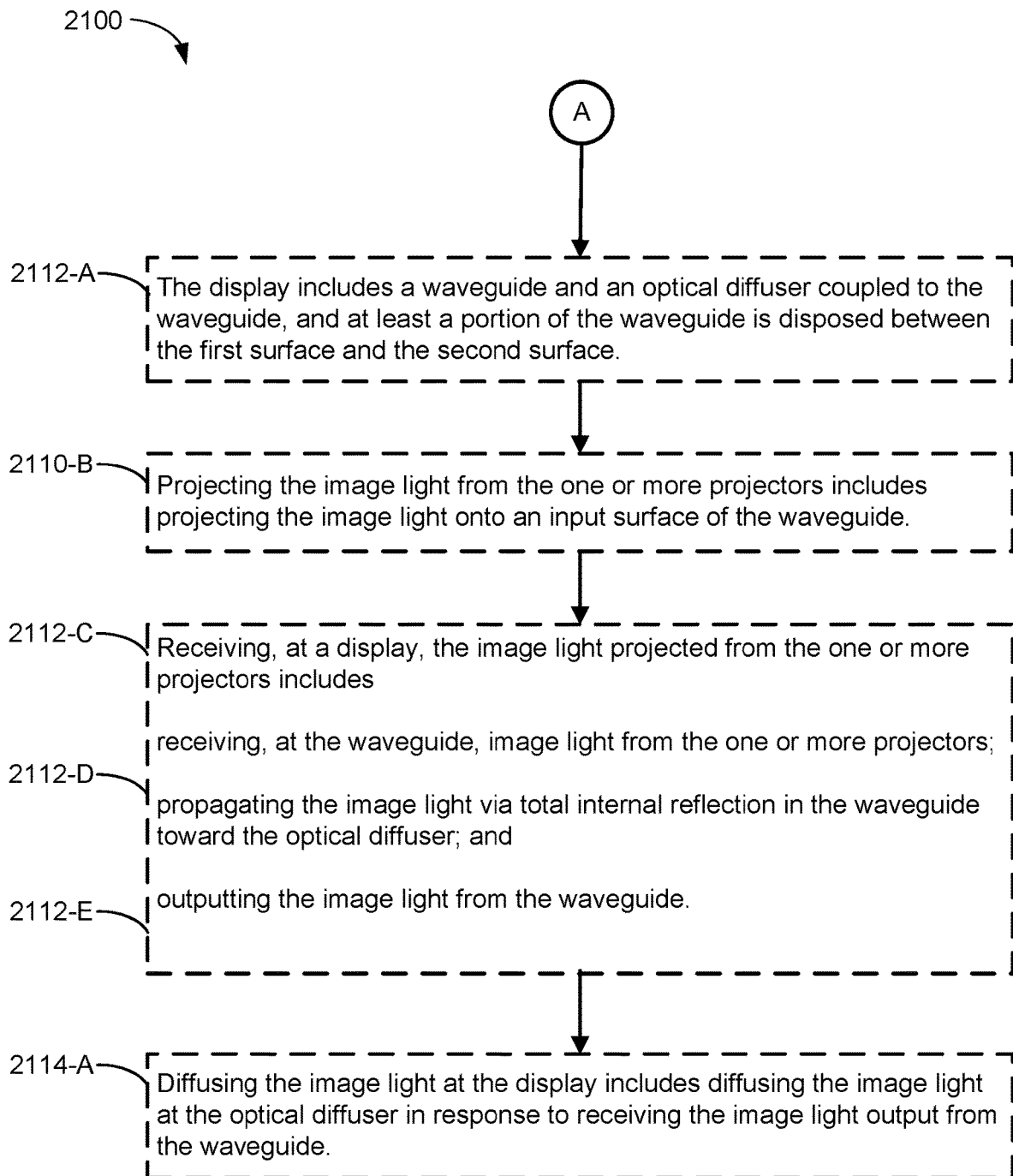

In some embodiments, as shown in FIG. 21C, in step 2112-A, the display includes a wedge waveguide 1410 and an optical diffuser 1416 that is coupled to a surface 1410-2 of the wedge waveguide 1410. At least a portion 1410-O of the wedge waveguide 1410 is disposed between the first surface and the second surface of the display. In such cases, (step 2112-B) projecting the image light 1414 from the one or more projectors 1412 includes projecting the image light 1414 onto the input surface 1410-1 of the wedge waveguide 1410. The method 2100 includes (step 2112-C) receiving, at the wedge waveguide 1410, image light 1414 form the one or more projectors 1412; (step 2112-D) propagating the image light 1414 via total internal reflection toward the optical diffuser 1416; and (step 2112-E) outputting the image light from the surface 1410-2 of the waveguide. In such cases, (step 2114-A) diffusing the image light 1414 at the display includes diffusing the image light 1414 at the optical diffuser 1416 in response to receiving the image light 1414 output from the wedge waveguide 1410.

Figure 21D:
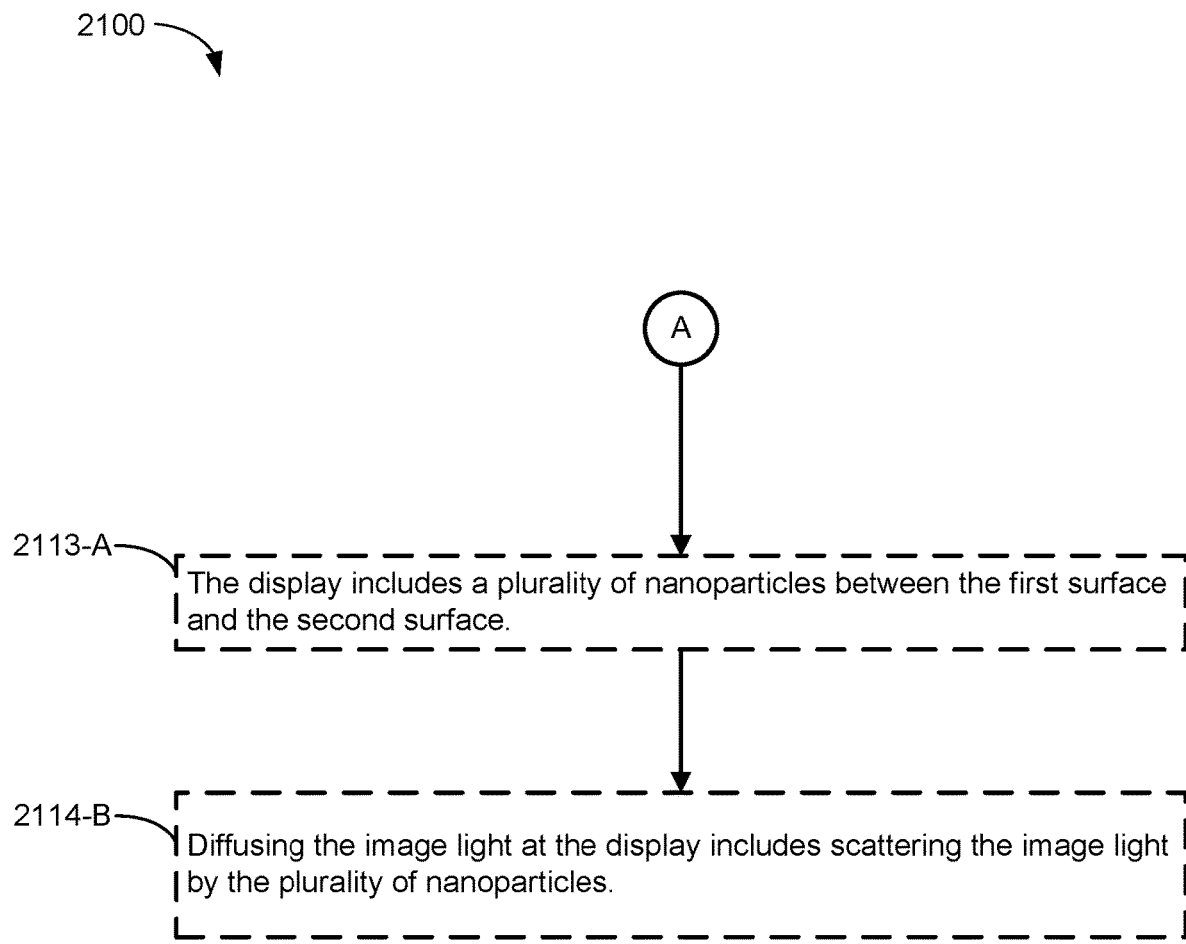

In some embodiments, as shown in FIG. 21D, in step 2113-A, the display 1224 includes a plurality of nanoparticles 1228 between the first surface 1224-1 and the second surface 1224-2. In such cases, (step 2114-B) diffusing the image light 1232 at the display 1224 includes scattering, by the plurality of nanoparticles 1228, the image light 1232 from the one or more projectors 1222.

In light of these principles, we now turn to certain embodiments of an optical assembly and a display device.

In accordance with some embodiments, an optical assembly (e.g., optical assembly 500-504) includes a substrate (e.g., substrate 510). The substrate has a first surface (e.g., first surface 510-1) and a second surface (e.g., second surface 510-2) that is opposite to and substantially parallel (e.g., forming an angle between 89 degrees and 91 degrees) with the first surface. The optical assembly also includes a reflector (e.g., reflector 512B) and a beam splitter (e.g., beam splitter 514), each of which is coupled to the substrate. The optical assembly is configured to transmit first light (e.g., image light 492) received at the first surface in an optical path that includes reflection at the reflector and at the beam splitter before the first light is output from the second surface. The optical assembly is also configured to transmit second light (e.g., ambient light 490-1 and 490-2) received at the first surface such that the second light is output from the second surface without undergoing reflection at either the reflector or the beam splitter.

In some embodiments, the optical assembly (e.g., optical assembly 500-504) is also configured to output the first light (e.g., image light 492) at a first optical power (e.g., a non-zero optical power) and to transmit the second light (e.g., ambient light 490-1 and 490-2) at a second optical power that is less than the first optical power. In some embodiments, the second optical power is zero. In some embodiments, the optical assembly is configured to transmit the second light without adding significant optical aberrations.

In some embodiments, the reflector (e.g., reflector 512) includes a reflective polarizer (e.g., reflective polarizer 512B) and an optical retarder (e.g. optical retarder 512A).

In some embodiments, the beam splitter (e.g., beam splitter 514) is disposed between the first surface (e.g., first surface 510-1) and the second surface (e.g., second surface 510-2). The beam splitter includes a plurality of Fresnel structures that contribute to the first optical power. In some embodiments, the Fresnel structures have one or more of variable pitch and dynamic draft. In some embodiments, the Fresnel structures form a planar (e.g., flat) profile.

In some embodiments, the reflector (e.g., reflector 512) has a curved reflective surface and is disposed between the beam splitter (e.g., beam splitter 514) and the second surface (e.g., second surface 510-2). The curved reflective surface has a first radius of curvature that contributes to the first optical power. In some embodiments, the Fresnel structures have one or more of variable pitch and dynamic draft. In some embodiments, the reflector is spaced apart from each of the first surface and the second surface.

In some embodiments, the reflector (e.g., reflector 512) is disposed between the beam splitter (e.g., beam splitter 514) and the second surface (e.g., second surface 510-2). In some embodiments, the Fresnel structures form a curved profile that has a second radius of curvature that contributes to the first optical power. In some embodiments, the Fresnel structures have one or more of variable pitch and dynamic draft. In some embodiments, the beam splitter is spaced apart from one or more of the first surface (e.g., first surface) and the second surface. In some embodiments, the reflective polarizer (e.g., reflective polarizer 512B) and the optical retarder (e.g. optical retarder 512A) are flat (e.g., have a planar surface profile).

In some embodiments, the beam splitter (e.g., beam splitter 514) is disposed on the first surface (e.g., first surface 510-1) and the reflector (e.g., reflector 512) are disposed on the second surface (e.g., second surface). The reflector includes a polarization sensitive hologram (PSH) (e.g., PSH 512C) that is configured to reflect the first light (e.g., image light 492) such that the first light is output at the first optical power and to transmit the second light (e.g., ambient light 490-1 and 490-2) such that the second light is output at the second optical power.

In some embodiments, the beam splitter (e.g., beam splitter 514) is disposed on the second surface (e.g., second surface 512). The reflector (e.g., reflector 512) is disposed on the first surface (e.g., first surface 510-1) and includes a PSH (e.g., PSH 512C). The PSH is configured to reflect the first light (e.g., image light 492) such that the first light is output at the first optical power and to transmit the second light (e.g., ambient light 490-1 and 490-2) such that the second light is output at the second optical power.

In some embodiments, the first surface (e.g., first surface 510-1) and the second surface (e.g., second surface 510-2) are planar surfaces.

In some embodiments, each of the first surface (e.g., first surface 510-1) and the second surface (e.g., second surface 510-2) has a third radius of curvature. In some embodiments, the third radius of curvature is greater than 75 millimeters.

In some embodiments, a display device (e.g., display device 400) includes a display (e.g., display 410) and an optical assembly (e.g., optical assembly 500-504). The display is configured to output image light (e.g., image light 492) and to transmit ambient light (e.g., ambient light 490-1 and 490-2). The optical assembly includes a substrate (e.g., substrate 510), a reflector (e.g., reflector 512) that coupled to the substrate, and a beam splitter (e.g., beam splitter 514) that is coupled to the substrate. The optical assembly is configured to receive the image light output from the display at the first surface and to transmit the image light in an optical path that includes reflection at the reflector and at the beam splitter before the image light is output from the second surface. The optical assembly is also configured to receive ambient light (e.g., ambient light 490-1 and 490-2) at the first surface and to transmit the ambient light such that the ambient light is output from the second surface without undergoing reflection at either the reflector or the beam splitter.

In some embodiments, the optical assembly (e.g., optical assembly 500-504) is configured to output the image light (e.g., image light 492) at a first optical power (e.g., a non-zero optical power) and transmit the ambient light (e.g., ambient light 490) at a second optical power that is less than the first optical power.

In some embodiments, the beam splitter (e.g., beam splitter 514) is disposed between the first surface (e.g., first surface 510-1) and the second surface (e.g., second surface 510-2). The beam splitter includes a plurality of Fresnel structures that contribute to the first optical power. In some embodiments, the Fresnel structures have one or more of variable pitch and dynamic draft. In some embodiments, the Fresnel structures form a planar (e.g., flat) profile.

In some embodiments, the reflector (e.g., reflector 512) has a curved reflective surface and is disposed between the beam splitter (e.g., beam splitter 514) and the second surface (e.g., second surface 510-2). The curved reflective surface has a first radius of curvature that contributes to the first optical power. In some embodiments, the Fresnel structures have one or more of variable pitch and dynamic draft. In some embodiments, the reflector is spaced apart from each of the first surface and the second surface.

In some embodiments, the reflector (e.g., reflector 512) is disposed between the beam splitter (e.g., beam splitter 514) and the second surface (e.g., second surface 510-2). In some embodiments, the Fresnel structures form a curved profile that has a second radius of curvature that contributes to the first optical power. In some embodiments, the Fresnel structures have one or more of variable pitch and dynamic draft. In some embodiments, the beam splitter is spaced apart from one or more of the first surface (e.g., first surface) and the second surface. In some embodiments, the reflective polarizer (e.g., reflective polarizer 512B) and the optical retarder (e.g. optical retarder 512A) are flat (e.g., have a planar surface profile).

In some embodiments, the beam splitter (e.g., beam splitter 514) is disposed on the first surface (e.g., first surface 510-1) and the reflector (e.g., reflector 512) are disposed on the second surface (e.g., second surface). The reflector includes a PSH (e.g., PSH 512C) that is configured to reflect the first light (e.g., image light 492) such that the first light is output at the first optical power and to transmit the second light (e.g., ambient light 490-1 and 490-2) such that the second light is output at the second optical power.

In some embodiments, the beam splitter (e.g., beam splitter 514) is disposed on the second surface (e.g., second surface 512). The reflector (e.g., reflector 512) is disposed on the first surface (e.g., first surface 510-1) and includes a PSH (e.g., PSH 512C). The PSH is configured to reflect the first light (e.g., image light 492) such that the first light is output at the first optical power and to transmit the second light (e.g., ambient light 490-1 and 490-2) such that the second light is output at the second optical power.

In some embodiments, the first surface (e.g., first surface 510-1) and the second surface (e.g., second surface 510-2) are planar surfaces.

In some embodiments, each of the first surface (e.g., first surface 510-1) and the second surface (e.g., second surface 510-2) has a third radius of curvature. In some embodiments, the third radius of curvature is greater than 75 millimeters.

In accordance with some embodiments, a method (e.g., method 1500) of transmitting light through an optical assembly (e.g., optical assembly 500-504) includes (step 1510) transmitting image light (e.g., image light 492) in a first optical path and (step 1520) transmitting ambient light (e.g., ambient light 490-1 and 490-2) in a second optical path that is different from the first optical path. Transmitting the image light in the first optical path includes (step 1512) receiving the image light at a first surface (e.g., first surface 510-1) of a substrate (e.g., substrate 510). The substrate includes a second surface (e.g., second surface 510-2) opposite to and substantially parallel (e.g., forming an angle between 89 degrees and 91 degrees) with the first surface, a reflector (e.g., reflector 512) coupled to the substrate, and a beam splitter (e.g., beam splitter 514) coupled to the substrate. Transmitting the image light also includes (step 1514) outputting the image light from the second surface. The first optical path includes reflection at both the reflector and at the beam splitter (e.g., the first optical path includes one or more folds). (Step 1520) Transmitting the ambient light in the second optical path includes (step 1522) receiving the ambient light at the first surface and (step 1524) outputting the ambient light from the second surface without undergoing reflection at either the reflector or the beam splitter (e.g., the second optical path does not include any folds).

In accordance with some embodiments, an optical assembly (e.g., optical assembly 600) includes a substrate (e.g., substrate 610) that has a first surface (e.g., first surface 610-1) that has a has a first curved profile. The optical assembly also includes a second surface (e.g., second surface 610-2) that has a second curved profile and is opposite to and parallel with the first surface. The optical assembly also includes a beam splitter (e.g., beam splitter 614) that is disposed on the first surface and conforms with the first curved profile of the first surface. The optical assembly further includes a reflector (e.g., reflective polarizer 612B) that is disposed on the second surface and conforms with the second curved profile of the second surface. The optical assembly is configured to receive first light (e.g., image light 492) at the first surface and to reflect the first light at the reflector and subsequently at the beam splitter before outputting the first light from the reflector. The first light is transmitted through the optical assembly at a first non-zero optical power. The optical assembly is also configured to transmit second light (e.g., ambient light 490-1 and 490-2) through the optical assembly without reflection at the reflector. The second light is transmitted through the optical assembly at a second optical power that is less than the first optical power.

In some embodiments, the optical assembly (e.g., optical assembly 600) further includes an optical retarder (e.g., optical retarder 612A) that is disposed between the beam splitter and reflector (e.g., reflective polarizer 612B).

In some embodiments, the second optical power is zero.

In some embodiments, each of the first surface (e.g., first surface 610-1) and the second surface (e.g., second surface 610-2) has a curvature. The first optical power is dependent on the curvature.

In some embodiments, the first light (e.g., image light 492) received at the first surface (e.g., first surface 610-1) is propagating in a first direction. The first light is output from the reflector (e.g., reflective polarizer 612B) in a second direction that is different from the first direction. The second light (e.g., ambient light 490-1 and 490-2) received at the first surface is propagating in a third direction, and the second light is output from the optical assembly (e.g., optical assembly 600) in a fourth direction that is substantially parallel (e.g., forms an angle less than 1 degree) to the third direction.

In some embodiments, the optical assembly (e.g., optical assembly 600) is configured to transmit the second light (e.g., ambient light 490-1 and 490-2) without significant optical aberration. In some embodiments, the optical assembly is configured to transmit the second light no optical aberration.

In some embodiments, the first light (e.g., image light 492) received at the first surface (e.g., first surface 610-1) has a first polarization, the first light output from the reflector (e.g., reflective polarizer 612B) has a second polarization that is different from the first polarization, the second light received at the first surface has a third polarization different from each of the first polarization and second polarization, and the second light output from the optical assembly (e.g., optical assembly 600) has the second polarization.

In some embodiments, the reflector (e.g., reflective polarizer 612B) is configured to reflect or transmit light incident thereon depending on its polarization.

In some embodiments, the substrate (e.g., substrate 610) has a substantially uniform thickness.

In some embodiments, the first curved profile and the second curved profile are concentric spherical profiles.

In accordance with some embodiments, a display device (e.g., display device 400) includes a display (e.g., display 410) that is configured to output image light (e.g., image light 492) and is configurable to transmit ambient light (e.g., ambient light 490-1). The display device also includes an optical assembly (e.g., optical assembly 600) that includes a first surface (e.g., first surface 610-1) having a first curved profile and a second surface (e.g., second surface 610-2) having a second curved profile and being parallel with the first surface. The optical assembly also includes a beam splitter (e.g., beam splitter 614) that is disposed on the first surface and conforms with the first curved profile of the first surface. The optical assembly also includes a reflector (e.g., reflector 612) that is disposed on second surface and conforms with the second curved profile of the second surface. The optical assembly is configured to receive the image light at the first surface and reflect the image light at the reflector and subsequently at the beam splitter before outputting the image light from the reflector. The image light is transmitted through the optical assembly at a first non-zero optical power. The optical assembly is also configured to transmit the ambient light through the optical assembly without reflection at the reflector. The ambient light is transmitted through the optical assembly at a second optical power that is less than the first optical power. In some embodiments, the display includes a quarter wave plate configured to convert light from a linear polarization to a circular polarization. In some embodiments, the display is transparent to visible light. In some embodiments, the display is also transparent to near-infrared light and/or infrared light.

In some embodiments, the optical assembly (e.g., optical assembly 600) further includes an optical retarder (e.g., optical retarder 612A) that is disposed between the beam splitter and reflective polarizer 612B).

In some embodiments, the second optical power is zero.

In some embodiments, each of the first surface (e.g., first surface 610-1) and the second surface (e.g., second surface 610-2) has a curvature. The first optical power is dependent on the curvature.

In some embodiments, the image light (e.g., image light 492) received at the first surface (e.g., first surface 610-1) is propagating in a first direction. The first light is output from the reflector (e.g., reflective polarizer 612B) in a second direction that is different from the first direction. The ambient light (e.g., ambient light 490-1 and 490-2) received at the first surface is propagating in a third direction, and the second light is output from the optical assembly (e.g., optical assembly 600) in a fourth direction that is substantially parallel (e.g., forms an angle less than 1 degree) to the third direction.

In some embodiments, the optical assembly (e.g., optical assembly 600) is configured to transmit the second light (e.g., ambient light 490-1 and 490-2) without significant optical aberration. In some embodiments, the optical assembly is configured to transmit the second light no optical aberration.

In some embodiments, the image light (e.g., image light 492) received at the first surface (e.g., first surface 610-1) has a first polarization, the image light output from the reflector (e.g., reflective polarizer 612B) has a second polarization that is different from the first polarization, the ambient light received at the first surface has a third polarization different from each of the first polarization and second polarization, and the ambient light output from the optical assembly (e.g., optical assembly 600) has the second polarization.

In some embodiments, the reflector (e.g., reflective polarizer 612B) is configured to reflect or transmit light incident thereon depending on its polarization.

In some embodiments, the display device (e.g., display device 400) is a head-mounted display device.

In accordance with some embodiments, a method (e.g., method 1600) of transmitting light through an optical assembly (e.g., optical assembly 600) includes (step 1610) transmitting image light (e.g., image light 492) in a first optical path and (step 1620) transmitting ambient light (e.g., ambient light 490-1 and 490-2) in a second optical path that is different from the first optical path. Transmitting image light includes (step 1612) receiving the image light at a first surface (e.g., first surface 610-1) of a substrate (e.g., substrate 610) that has a first curved profile. Transmitting the image light also includes (step 1614) reflecting the image light at a reflector (e.g., reflective polarizer 612B) that has a second curved profile and is substantially parallel to the first surface of the substrate, (step 1616) reflecting the image light at a beam splitter (e.g., beam splitter 614) that is disposed on the first substrate and conforms with the first curved profile of the first surface, and (step 1618) outputting the image light from the reflector at a first optical power. Transmitting the ambient light, includes (step 1622) receiving the ambient light at the first surface, (step 1624) transmitting the ambient light through the optical assembly without reflection at the reflector, and (step 1626) outputting the ambient light from the optical assembly at a second optical power that is less than the first optical power.

In accordance with some embodiments, an optical assembly (e.g., optical assembly 700) includes a substrate (e.g., substrate 710) that has a first surface (e.g., surface 710-1) and a second surface (e.g., surface 710-2) that is opposite to and substantially parallel with the first surface, a reflector (e.g., reflector 712) coupled to the substrate, and a volume Bragg grating (VBG) (e.g., VBG 714) coupled to the substrate. The VBG is configured to transmit light incident upon the VBG at an incident angle that is within a first predetermined angular range (e.g., angular range θ1) and to reflect light incident upon the VBG at an incident angle that is within a second predetermined angular range (e.g., angular range θ2) that is distinct from the first angular range. The optical assembly is configured to transmit first light received at the first surface in an optical path that includes reflection at the reflector and at the VBG before the first light is output from the second surface. The optical assembly is also configured to transmit second light received at the first surface such that the second light is output from the second surface without undergoing reflection at either the reflector or the VBG.

In some embodiments, the VBG (e.g., VBG 714) is disposed on the first surface (e.g., surface 710-1) and the reflector (e.g., reflector 712) is disposed on the second surface (e.g., surface 710-2). The first light received at the first surface is incident upon the VBG at an incident angle that is within the first predetermined angular range (e.g., angular range θ1), and the first light, reflected from the reflector, is incident upon the volume Bragg grating at an incident angle that is within the second predetermined angular range (e.g., angular range θ2).

In some embodiments, the first light has a first polarization and the second light has a second polarization that is orthogonal to the first polarization.

In some embodiments, the VBG (e.g., VBG 714) is polarization selective and is configured to transmit light having a polarization that is different from the first polarization regardless of the incident angle of the light.

In some embodiments, the reflector (e.g., reflector 712) includes a polarization sensitive hologram (PSH) (e.g., PSH 512C). The VBG (e.g., VBG 714) is disposed on the second surface (e.g., surface 710-2) and the reflector (e.g., reflector 712) is disposed on the first surface (e.g., surface 710-1). The first light, transmitted through the first surface and the reflector, is incident upon the VBG at an incident angle that is within the second predetermined angular range (e.g., angular range θ2), and the first light, reflected from the reflector, is incident upon the VBG at an incident angle that is within the first predetermined angular range (e.g., angular range θ1).

In some embodiments, the first surface (e.g., surface 710-1) and the second surface (e.g., surface 710-2) are planar surfaces.

In some embodiments, the first surface (e.g., surface 710-1) and the second surface (e.g., surface 710-2) have a same radius of curvature.

In some embodiments, the second light is transmitted without significant optical aberrations.

In some embodiments, the optical assembly (e.g., optical assembly 700) is configured to output the first light at a first optical power and to transmit the second light at a second optical power that is less than the first optical power.

In some embodiments, the second optical power that is zero.

In some embodiments, a display device includes a display (e.g., display 410) and an optical assembly (e.g., optical assembly 700). The display is configured to output image light and to transmit ambient light. The optical assembly (e.g., optical assembly 700) includes a substrate (e.g., substrate 710) that has a first surface (e.g., surface 710-1) and a second surface (e.g., surface 710-2) that is opposite to and substantially parallel with the first surface, a reflector (e.g., reflector 712) coupled to the substrate, and a volume Bragg grating (VBG) (e.g., VBG 714) coupled to the substrate. The VBG is configured to transmit light incident upon the VBG at an incident angle that is within a first predetermined angular range (e.g., angular range θ1) and to reflect light incident upon the VBG at an incident angle that is within a second predetermined angular range (e.g., angular range θ2) that is distinct from the first angular range. The optical assembly is configured to transmit first light received at the first surface in an optical path that includes reflection at the reflector and at the VBG before the first light is output from the second surface. The optical assembly is also configured to transmit second light received at the first surface such that the second light is output from the second surface without undergoing reflection at either the reflector or the VBG.

In some embodiments, the VBG (e.g., VBG 714) is disposed on the first surface (e.g., surface 710-1) and the reflector (e.g., reflector 712) is disposed on the second surface reflector (e.g., surface 710-2). The first light received at the first surface is incident upon the VBG at an incident angle that is within the first predetermined angular range (e.g., angular range θ1) and the first light, reflected from the reflector, is incident upon the VBG at an incident angle that is within the second predetermined angular range (e.g., angular range θ2).

In some embodiments, the first light has a first polarization and the second light has a second polarization that is orthogonal to the first polarization.

In some embodiments, the VBG (e.g., VBG 714) is polarization selective and is configured to transmit light having a polarization that is different from the first polarization regardless of the incident angle of the light.

In some embodiments, the reflector (e.g., reflector 712) includes a PSH (e.g., PSH 512C) that is disposed on the first surface (e.g., surface 710-1) of the substrate (e.g., substrate 710), and a VBG (e.g., VBG 714) is disposed on the second surface (e.g., surface 710-2) of the substrate (e.g., substrate 710). The first light, transmitted through the first surface and the reflector, is incident upon the VBG at an incident angle that is within the second predetermined angular range (e.g., angular range θ2), and the first light, reflected from the reflector, is incident upon the VBG at an incident angle that is within the first predetermined angular range (e.g., angular range θ1).

In some embodiments, the first surface (e.g., surface 710-1) and the second surface (e.g., surface 710-2) are planar surfaces.

In some embodiments, the first surface (e.g., surface 710-1) and the second surface (e.g., surface 710-2) have a same radius of curvature.

In some embodiments, the second light is transmitted without significant optical aberrations.

In some embodiments, the optical assembly (e.g., optical assembly 700) is configured to output the first light at a first optical power and to transmit the second light at a second optical power that is less than the first optical power.

In some embodiments, a method (e.g., method 1700) of transmitting light through an optical assembly (e.g., optical assembly 700) includes transmitting image light (e.g., image light 492). Transmitting image light includes receiving the image light at a first surface (e.g., surface 710-1) of a substrate (e.g., substrate 710). The substrate includes a second surface (e.g., surface 710-2) that is opposite to and substantially parallel with the first surface, a reflector (e.g., reflector 712), and a VBG (e.g., VBG 714). The VBG is configured to transmit light incident upon the VBG at an incident angle that is within a first predetermined angular range (e.g., angular range θ1), and reflect light incident upon the VBG at an incident angle that is within a second predetermined angular range (e.g., angular range θ2) that is distinct from the first angular range. Transmitting the image light also includes outputting the image light from the second surface at a first optical power via an optical path that includes reflection at the reflector and at the VBG. The method further includes transmitting ambient light in a second optical path that is different from the first optical path. Transmitting the ambient light includes receiving the ambient light at the first surface, and outputting the ambient light from the second surface at a second optical power via an optical path that does not include reflection at either the reflector or the VBG. The second optical power is less than the first optical power.

In accordance with some embodiments, a display device (e.g., display device 400) includes a display (e.g., display 410) that has a front surface (e.g., surface 410-2) and a back surface (e.g., surface 410-1) that is opposite to the front surface. The display is configured to output image light (e.g., image light 492) from the front surface and to transmit ambient light (e.g., ambient light 490-1) from the back surface to the front surface. The display device also includes an optical assembly (e.g., optical assembly 412, 500-504, 600). The optical assembly includes a substrate (e.g., substrate 510, 610) having a substantially uniform thickness, a beam splitter (e.g., beam splitter 814, 916, 514, 514', 514", 514''') coupled to the substrate, and a reflector (e.g., reflector 818, 918, 512, 512', 512", 612) coupled to the substrate. The optical assembly is configured to receive the image light and transmit a portion of the image light output from the front surface of the display at a first optical power via an optical path including reflections at the reflector and at the beam splitter. The optical assembly is also configured to receive the ambient light and transmit a portion of the ambient light through the optical assembly at a second optical power without reflection at the reflector, the second optical power being less than the first optical power.

In some embodiments, the display (e.g., display 410) is configured to concurrently output the image light (e.g., image light 492) and the ambient light (e.g., ambient light 490-1) from the front surface (e.g., surface 410-2). In some embodiments, the image light and the ambient light have orthogonal polarizations.

In some embodiments, the display device (e.g., display device 400) is configured to alternate between outputting the image light (e.g., image light 492) from the front surface (e.g., surface 410-2) of the display (e.g., display 410) and outputting the ambient light (e.g., ambient light 490-1) from the front surface of the display. In some embodiments, the image light and the ambient light have orthogonal polarizations. In some embodiments, the image light and the ambient light have the same polarization.

In some embodiments, the image light (e.g., image light 492) received at the optical assembly (e.g., optical assembly 412, 500-504, 600) has a first polarization and the ambient light (e.g., ambient light 490-1) received at the optical assembly has a second polarization that is orthogonal to the first polarization. In some embodiments, the portion of the image light and the portion of the ambient light output from the optical assembly have the same polarization.

In some embodiments, the optical path of the image light (e.g., image light 492) includes one or more folds (e.g., includes reflection at the reflector and the beam splitter or VBG) and the portion of the ambient light (e.g., ambient light 490-1) is transmitted via a different optical path that does not include any folds (e.g., is transmitted through the optical assembly without undergoing reflection).

In some embodiments, the second optical power is zero.

In some embodiments, the optical assembly (e.g., optical assembly 412, 500-504, 600) is configured to transmit the portion of the ambient light (e.g., ambient light 490-1) without significant optical aberration. In some embodiments, the optical assembly is configured to transmit the portion of the ambient light with reduced optical aberration compared to the portion of the image light (e.g., image light 492). In some embodiments, the optical assembly is configured to transmit the portion of the ambient light without significant optical aberrations.

In some embodiments, the substrate (e.g., substrate 510, 610) of the optical assembly (e.g., optical assembly 412, 500-504, 600) includes a first surface (e.g., surface 510-1, 610-1) and a second surface (e.g., surface 510-2, 610-2) that is opposite to and parallel with the first surface.

In some embodiments, the substrate (e.g., substrate 510) of the optical assembly (e.g., optical assembly 412, 600) includes a first surface (e.g., surface 610-1) and a second surface (e.g., surface 610-2) that is opposite to the first surface. The first surface has a first curved profile and the second surface has a second curved profile. The beam splitter (e.g., beam splitter 614) is disposed on the first surface and conforms with the first curved profile of the first surface. The reflector (e.g., reflector 612) includes a reflective polarizer (e.g., reflective polarizer 612B) and a quarter-wave plate (e.g., optical retarder 612A). The reflective polarizer is disposed on the second surface and conforms with the second curved profile of the second surface. In some embodiments, each of the first surface and the second surface has a curvature and the first optical power is dependent on the curvature. In some embodiments, the first curved profile and the second curved profile are concentric spherical profiles. In some embodiments, the reflective polarizer is configured to reflect or transmit light depending on the polarization of the light.

In some embodiments, the substrate (e.g., substrate 510) of the optical assembly (e.g., optical assembly 412, 500-502) includes a first surface (e.g., surface 510-1) and a second surface (e.g., surface 510-1) that is opposite to the first surface. The beam splitter (e.g., beam splitter 514, 514', 514") is disposed between the first surface and the second surface and includes a plurality of the Fresnel structures that contribute to the first optical power.

In some embodiments, the reflective polarizer (e.g., reflective polarizer 512B') has a curved reflective surface and is disposed between the beam splitter (e.g., beam splitter 514) and the second surface (e.g., surface 510-2). The curved reflective surface has a first radius of curvature that contributes to the first optical power.

In some embodiments, the reflector (e.g., reflector 512') is disposed between the beam splitter (e.g., beam splitter 514) and the second surface (e.g., surface 510-2). The Fresnel structures form a curved profile that has a second radius of curvature contributing to the first optical power.

In some embodiments, the substrate (e.g., substrate 510) of the optical assembly includes a first surface (e.g., surface 510-1) and a second surface (e.g., surface 510-2) that is opposite to the first surface. The beam splitter (e.g., beam splitter 512") is disposed on the first surface and the reflector (e.g., reflector 514''') is disposed on the second surface and includes a polarization sensitive hologram (e.g., polarization sensitive hologram 512C). The polarization sensitive hologram is configured to reflect the image light (e.g., image light 492) such that the image light is output with the first optical power. The polarization sensitive hologram is also configured to transmit the ambient light (e.g., ambient light 490-1) such that the ambient light is output at the second optical power.

In some embodiments, the display device (e.g., display device 400) is a head-mounted display device.

In some embodiments, a method (e.g., method 1800) includes outputting image light (e.g., image light 492) from a front surface (e.g., surface 410-2) of a display (e.g., display 410). The display also includes a back surface (e.g., surface 410-1) that is opposite to the front surface. The method also includes transmitting ambient light (e.g., ambient light 490-1) from the back surface to the front surface, receiving the image light output from the front surface at an optical assembly (e.g., optical assembly 412, 500-504, 600), and transmitting a portion of the image light at a first optical power via a folded optical path. The method further includes receiving the ambient light output from the front surface at the optical assembly and transmitting a portion of the ambient light at a second optical power that is different from the first optical power via a second optical path that is different from the first optical path. In some embodiments, the portion of the ambient light is output from the optical assembly in a direction that is substantially parallel to the direction of the ambient light received at the optical assembly. In some embodiments, the ambient light is transmitted without adding significant optical aberrations and without adding optical power. In some embodiments, the second optical power is less than the first optical power. In some embodiments, the second optical power is zero.

In some embodiments, the image light (e.g., image light 492) and the ambient light (e.g., ambient light 490-1) are concurrently output from the front surface (e.g., surface 410-2) of the display (e.g., display 410).

In some embodiments, the portion of the image light (e.g., image light 492) and the portion of the ambient light (e.g., ambient light 490-1) are alternatingly output from the front surface (e.g., surface 410-2) of the display (e.g., display 410).

In some embodiments, the image light (e.g., image light 492) received at the optical assembly (e.g., optical assembly 412, 500-504, 600) has a first polarization and the ambient light (e.g., ambient light 490-1) received at the optical assembly has a second polarization that is orthogonal to the first polarization. In some embodiments, the first polarization and the second polarization are linear polarizations.

In some embodiments, the image light (e.g., image light 492) and the ambient light (e.g., ambient light 490-1) received at the optical assembly (e.g., optical assembly 412, 500-504, 600) have a same polarization. In some embodiments, the polarization is a circular polarization.

In some embodiments, the portion of the image light (e.g., image light 492) is transmitted through the optical assembly (e.g., optical assembly 412, 500-504, 600) via an optical path that includes one or more folds and the portion of the ambient light (e.g., ambient light 490-1) is transmitted through the optical assembly via a different optical path that does not include any folds.

In some embodiments, the optical assembly (e.g., optical assembly 412, 500-504, 600) is configured to transmit the portion of the ambient light (e.g., ambient light 490-1) without significant optical aberration. In some embodiments, the optical assembly is configured to transmit the portion of the ambient light with reduced optical aberration compared to the transmitted image light. In some embodiments, the optical assembly is configured to transmit the portion of the ambient light with no optical aberration.

In accordance with some embodiments, a display device (e.g., display device 1000) includes an optical diffuser (e.g., optical diffuser display 1020) configured to, in response to receiving image light (e.g., image light 1090), diffuse the image light, and output diffused image light (e.g., diffused image light 1022). The diffused image light output from the optical diffuser has a same polarization as the received image light. The optical diffuser is also configured to receive ambient light (e.g., ambient light 490-1) and to output at least a first portion of the ambient light. The display device also includes an optical assembly (e.g., optical assembly 1030) that includes a substrate having a first surface and a second surface opposite to and substantially parallel with the first surface, a reflector coupled to the substrate, and a beam splitter coupled to the substrate. The optical assembly is configured to transmit the diffused image light at a first non-zero optical power by reflecting the diffused image light at the reflector and at the beam splitter. The optical assembly is also configured to transmit a second portion of the ambient light out of the first portion of the ambient light through the optical assembly without reflection at the reflector or the beam splitter such that the second portion of the ambient light is transmitted through the optical assembly at a second optical power that is less than the first optical power.

In some embodiments, the image light has a first linear polarization. The optical diffuser is configured to diffuse the image light having the first linear polarization such that diffused image light having the first linear polarization is output from the optical diffuser. In some embodiments, the first portion of the ambient light has a second linear polarization that is orthogonal to the first linear polarization. In some embodiments, the optical diffuser is configured to transmit the first portion of the ambient light without changing its polarization such that the first portion of the ambient light having the second linear polarization is output from the optical diffuser.

In some embodiments, the display device (e.g., display device 1000) further includes a projector (e.g., projector 1010) configured to project the image light (e.g., image light 1090) toward the optical diffuser (e.g., optical diffuser display 1020).

In some embodiments, the image light (e.g., image light 1090) is incident upon the optical diffuser (e.g., optical diffuser display 1020) at an incident angle within a certain incident angle range and the ambient light (e.g., ambient light 490-1) is incident upon the optical diffuser at an incident angle outside the certain incident angle range.

In some embodiments, the first surface of the optical assembly (e.g., optical assembly 1030) and the second surface of the optical assembly are planar surfaces.

In some embodiments, the first surface of the optical assembly (e.g., optical assembly 1030) has a first curved profile and the second surface of the optical assembly has a second curved profile.

In some embodiments, the first curved profile and the second curved profile have a same radius of curvature and the first optical power is dependent on the radius of curvature.

In some embodiments, the first curved profile and the second curved profile are concentric spherical profiles.

In some embodiments, the second optical power is zero.

In some embodiments, the optical assembly (e.g., optical assembly 1030) is configured to transmit the second portion of the ambient light (e.g., ambient light 490-1) without significant optical aberration.

In some embodiments, the substrate of the optical assembly (e.g., optical assembly 1030) has a substantially uniform thickness.

In some embodiments, the reflector of the optical assembly (e.g., optical assembly 1030) includes a reflective polarizer and an optical retarder (e.g., a quarter-wave plate).

In some embodiments, the reflector of the optical assembly (e.g., optical assembly 1030) includes a polarization sensitive hologram that is configured to reflect the diffused image light (e.g., diffused image light 1092) such that the diffused image light is output with the first optical power. The polarization sensitive hologram is also configured to transmit the second portion of the ambient light (e.g., ambient light 490-1) such that the second portion of the ambient light is output at the second optical power.

In accordance with some embodiments, a method (e.g., method 1900) includes receiving image light (e.g., image light 1090) at an optical diffuser (e.g., optical diffuser display 1020) and in response to receiving the image light, diffusing the image light from the optical diffuser without changing polarization of the image light and outputting diffused image light (e.g., diffused image light 1092). The method also includes transmitting the diffused image light through an optical assembly (e.g., optical assembly 1030) at a first optical power. The method further includes receiving ambient light (e.g., ambient light 490-1) at the optical diffuser and outputting, from the optical diffuser, at least a first portion of the ambient light. The method also includes transmitting a second portion of the ambient light out of the first portion of the ambient light through the optical assembly at a second optical power that is less than the first optical power. The optical assembly includes a substrate having a first surface and a second surface opposite to and substantially parallel with the first surface, a reflector coupled to the substrate, and a beam splitter coupled to the substrate. Transmitting the diffused image light through the optical assembly at the first optical power includes reflecting the diffused image light at the reflector and at the beam splitter. The second portion of the ambient light is transmitted through the optical assembly without reflection at the reflector or the beam splitter such that the second portion of the ambient light is transmitted through the optical assembly at the second optical power less than the first optical power.

In some embodiments, the method (e.g., method 1900) also includes projecting the image light (e.g., image light 1090) from a projector (e.g., projector 1010) towards the optical diffuser (e.g., optical diffuser display 1020), receiving the image light at the optical diffuser, and diffusing the image light at the optical diffuser such that the diffused image light is output from the optical diffuser.

In some embodiments, the image light (e.g., image light 1090) is received at a surface (e.g., first surface 1020-1) of the optical diffuser (e.g., optical diffuser display 1020) and the diffused image light is output from the surface of the optical diffuser.

In some embodiments, the image light (e.g., image light 1090) is incident upon the optical diffuser (e.g., optical diffuser display 1020) at an incident angle within a certain incident angle range and the ambient light (e.g., ambient light 490-1) is incident upon the optical diffuser at an incident angle outside the certain incident angle range.

In some embodiments, the first portion of the ambient light (e.g., ambient light 490-1) is transmitted through the optical diffuser (e.g., optical diffuser display 1020) concurrent to the diffused image light (e.g., diffused image light 1092) being output from the optical diffuser and the second portion of the ambient light and diffused image light are concurrently transmitted through the optical assembly (e.g., optical assembly 1030).

In some embodiments, the second optical power is zero.

In some embodiments, the second portion of the ambient light (e.g., ambient light 490-1) is transmitted through the optical assembly (e.g., optical assembly 1030) without significant optical aberration.

In some embodiments, the substrate of the optical assembly (e.g., optical assembly 1030) has a substantially uniform thickness.

In accordance with some embodiments, a display device (e.g., display device 1100) includes a display (e.g., switchable display 1110) and an optical assembly (e.g., optical assembly 1130). The display includes a front surface (e.g., front surface 1110-1), a back surface (e.g., back surface 1110-2) that is opposite to the front surface, and first optically anisotropic molecules (e.g., optically anisotropic molecules 1110-3) that are disposed between the front surface and the back surface. The display is configurable to either receive image light (e.g., image light 1190) at the front surface and diffuse the image light to output diffused image light (e.g., diffused image light 492) from the front surface or receive ambient light 490-1' at the back surface and output the ambient light from the front surface. The optical assembly includes an optical assembly substrate (e.g., substrate 510, 610, 710) having a substantially uniform thickness, a reflector (e.g., reflector 818, 918, 512, 512', 512'', 612) that is coupled to the optical assembly substrate, and a beam splitter (e.g., beam splitter 814, 916, 514, 514', 514'', 514''') that is coupled to the optical assembly substrate. The optical assembly is configurable to transmit a portion of the diffused image light at a first optical power via an optical path including reflections at the reflector and at the beam splitter and to transmit a portion of the ambient light output from the front surface of the display at a second optical power without reflection at the reflector, the second optical power being less than the first optical power.

In some embodiments, a shutter assembly (e.g., shutter assembly 1120) includes a first shutter substrate (e.g., substrate 1120-1), a second shutter substrate (e.g., substrate 1120-2), and second optically anisotropic molecules (e.g., optically anisotropic molecules 1120-3) that are disposed between the first shutter substrate and the second shutter substrate. The ambient light (e.g., ambient light 490-1') received at the back surface (e.g., surface 1110-1) of the display (e.g., switchable display 1110) is transmitted through the shutter assembly, the second optically anisotropic molecules are configurable to modulate the ambient light, and the display is disposed between the shutter assembly and the optical assembly (e.g., optical assembly 1130).

In some embodiments, the display device (e.g., display device 1100) is configured to alternate between a first mode and a second mode. In the first mode, the shutter assembly (e.g., shutter assembly 1120) is configured to block the ambient light (e.g., ambient light 490-1) from being transmitted through the shutter assembly and the display (e.g., switchable display 1110) is configured to diffuse the image light. In the second mode, the shutter assembly is configured to transmit the ambient light at a variable intensity and the display is configured to transmit the ambient light.

In some embodiments, the display (e.g., switchable display 1110) further includes a front electrode (e.g., front electrode 1112-1) that is coupled to the front surface (e.g., front surface 1110-1) and a back electrode (e.g., back electrode 1112-2) that is coupled to the back surface (e.g., back surface 1110-2). The front electrode and the back electrode are operatively coupled to a first voltage source (e.g., voltage source V1). The first optically anisotropic molecules (e.g., optically anisotropic molecules 1110-3) are configured to diffuse the image light (e.g., image light 1190) when the first voltage source is off and to transmit the ambient light (e.g., ambient light 490-1') when the first voltage source is set to a first voltage. The shutter assembly (e.g., shutter assembly 1120) further includes a first electrode (e.g., electrode 1122-1) coupled to the first shutter substrate (e.g., substrate 1120-1) and a second electrode (e.g., electrode 1122-2) coupled to the second shutter substrate (e.g., substrate 1120-2). The first electrode and the second electrode are operatively coupled to a second voltage source (e.g., voltage source V2) that has an adjustable voltage that allows modulation of the intensity of the ambient light by adjusting the adjustable voltage.

In some embodiments, the shutter assembly (e.g., shutter assembly 1120) includes a plurality of shutters (e.g., shutters 1120-A1, 1120-A2, 1120-A3, 1120-A4, 1120-A5, 1120-A6, 1120-B1, 1120-B4, 1120-B5) and each respective shutter of the plurality of shutters is independently configurable to modulate intensity (e.g., intensity I) of a respective portion of the ambient light (e.g., the ambient light 490-1') transmitted through the respective shutter. The respective shutter (e.g., shutter 1120-A1) includes a respective first electrode (e.g., electrode 1122-1A) and a respective second electrode (e.g., electrode 1122-2A). The respective first and second electrodes are coupled to a respective adjustable voltage source (e.g., adjustable voltage source VA).

In some embodiments, the ambient light (e.g., ambient light 490-1') is modulated to match the intensity of the diffused image light (e.g., diffused image light 492) output from the display (e.g., switchable display 1110).

In some embodiments, the shutter assembly (e.g., shutter assembly 1120) further includes any of: (i) a dye (e.g., dye 1126) that is disposed between the first shutter substrate (e.g., substrate 1120-1) and the second shutter substrate (e.g., substrate 1120-2), and interspersed with the second optically anisotropic molecules (e.g., optically anisotropic molecules 1120-3, 1124); (ii) a polymer matrix (e.g., polymer matrix 1116) disposed between the first shutter substrate and the second shutter substrate, and the second optically anisotropic molecules (e.g., optically anisotropic molecules 1120-3) are liquid crystal molecules organized in domains (e.g., liquid crystal domains 1114) that are suspended in the polymer matrix; (iii) a polymer network (e.g., polymer network 1119) disposed between the first shutter substrate and the second shutter substrate, and configured to stabilize the second optically anisotropic molecules (e.g., optically anisotropic molecules 1120-3, liquid crystal molecules 1118); or (iv) liquid crystals (e.g., liquid crystals 1128) that are disposed between the first shutter substrate and the second shutter substrate, and form a 90 degree twist between the first shutter substrate and the second shutter substrate.

In some embodiments, the display (e.g., switchable display 1110) further includes a polymer matrix (e.g., polymer matrix 1116) disposed between the front surface (e.g., surface 1110-1) and the back surface (e.g., surface 1110-2), and the first optically anisotropic molecules (e.g., optically anisotropic molecules 1110-3) are liquid crystal molecules forming domains (e.g., liquid crystal domains 1114) suspended in the polymer matrix.

In some embodiments, the display (e.g., switchable display 1110) further includes a polymer network (e.g., polymer network 1119) disposed between the front surface (e.g., surface 1110-1) and the back surface (e.g., surface 1110-2), and the first optically anisotropic molecules (e.g., liquid crystal molecules 1110-3) are stabilized by the polymer.

In some embodiments, a method (e.g., method 2000) of operating the display device (e.g., switchable display 1110) includes operating the display device in a first mode and operating the display device in a second mode. Operating the display device includes receiving image light (e.g., image light 1190) at a front surface (e.g., surface 1110-1) of a display (e.g., switchable display 1110), diffusing the image light to output diffused image light (e.g., diffused image light 492) from the front surface, and transmitting a portion of the diffused image light through an optical assembly (e.g., optical assembly 1130) at a first optical power via a first optical path. The first optical path includes at least one fold. Operating the display device in the second mode, includes receiving ambient light (e.g., ambient light 490-1') at a back surface (e.g., surface 1110-2) that is opposite to the front surface of the display, transmitting the ambient light through the display, and transmitting a portion of the ambient light through the optical assembly at a second optical power via a second optical path. The second optical power is less than the first optical power and the second optical path does not include any folds.

In some embodiments, the display (e.g., switchable display 1110) further includes a front electrode (e.g., front electrode 1112-1) that is coupled to the front surface (e.g., surface 1110-1), a back electrode (e.g., back electrode 1112-2) that is coupled to the back surface (e.g., surface 1110-1), and optically anisotropic molecules (e.g., optically anisotropic molecules 1110-3) that are disposed between the front surface and the back surface. The front electrode and the back electrode are operatively coupled to a first voltage source (e.g., voltage source V1), operating the display device in the first mode includes turning the first voltage source off, and operating the display device in the second mode includes setting the first voltage source to a first voltage.

In some embodiments, the ambient light (e.g., ambient light 490-1') is transmitted through a shutter assembly (e.g., shutter assembly 1120) including a first shutter substrate (e.g., substrate 1120-1), a second shutter substrate (e.g., substrate 1120-2), and optically anisotropic molecules (e.g., optically anisotropic molecules 1120-3) that are disposed between the first shutter substrate and the second shutter substrate. The method further includes modulating the ambient light by configuring the optically anisotropic molecules.

In some embodiments, the shutter assembly (e.g., shutter assembly 1120) further includes a first electrode (e.g., electrode 1122-1) that is coupled to the first shutter substrate and a second electrode (e.g., electrode 1122-2) that is coupled to the second shutter substrate. The first electrode and the second electrode are operatively coupled to a second voltage source (e.g., voltage source V2) that has an adjustable voltage, and modulating the ambient light (e.g., ambient light 490-1) includes adjusting the adjustable voltage of the second voltage source.

In some embodiments, adjusting the adjustable voltage of the second voltage source (e.g., voltage source V2) to vary the intensity (e.g., intensity I) of the ambient light (e.g., ambient light 490-1') transmitted through the shutter assembly (e.g., shutter assembly 1120) to match an intensity of the diffused image light (e.g., diffused image light 492) output from the display (e.g., switchable display 1110).

In some embodiments, the shutter assembly (e.g., shutter assembly 1120) includes a plurality of shutters (e.g., shutters 1120-A1, 1120-A2, 1120-A3, 1120-A4, 1120-A5, 1120-A6, 1120-B1, 1120-B4, 1120-B5). Each respective shutter of the plurality of shutters is independently configurable to modulate a respective portion of the ambient light (e.g., ambient light 490-1') transmitted through the respective shutter. The respective shutter (e.g., shutter 1120-A1) includes a respective first electrode (e.g., electrode 1122-1A) and a respective second electrode (e.g., electrode 1122-2A). The respective first and second electrodes are coupled to a respective adjustable voltage source (e.g., adjustable voltage source VA).

In some embodiments, in the first mode, the shutter assembly (e.g., shutter assembly 1120) is configured to block the ambient light (e.g., ambient light 490-1) and the display (e.g., switchable display 1110) is configured to diffuse the image light (e.g., image light 1190). In the second mode, the shutter assembly is configured to transmit at least a portion of the ambient light and the display is configured to transmit the ambient light without diffusing the ambient light.

In some embodiments, the shutter assembly (e.g., shutter assembly 1120) further includes any of: (i) a dye (e.g., dye 1126) that is disposed between the first shutter substrate (e.g., substrate 1120-1) and the second shutter substrate (e.g., substrate 1120-2), and interspersed with the second optically anisotropic molecules (e.g., optically anisotropic molecules 1120-3); (ii) a polymer matrix (e.g., polymer matrix 1116) disposed between the first shutter substrate and the second shutter substrate, and the second optically anisotropic molecules are liquid crystal molecules forming domains (e.g., liquid crystal domains 1114) that are suspended in the polymer matrix; (iii) a polymer network (e.g., polymer network 1119) disposed between the first shutter substrate and the second shutter substrate, and configured to stabilize the second optically anisotropic molecules (e.g., liquid crystal molecules 1118); or (iv) liquid crystals (e.g., liquid crystals 1128) that are disposed between the first shutter substrate and the second shutter substrate, and form a 90 degree twist between the first shutter substrate and the second shutter substrate.

In some embodiments, the display (e.g., switchable display 1110) further includes a polymer matrix (e.g., polymer matrix 1116) disposed between the front surface (e.g., surface 1110-1) and the back surface (e.g., surface 1110-2), and liquid crystal domains (e.g., liquid crystal domains 1114) suspended in the polymer matrix.

In some embodiments, the display (e.g., switchable display 1110) further includes optically anisotropic molecules (e.g., optically anisotropic molecules 1110-3) disposed between the front surface (e.g., surface 1110-1) and the back surface (e.g., surface 1110-2), a polymer network (e.g., polymer network 1119) disposed between the front surface (e.g., surface 1110-1) and the back surface (e.g., surface 1110-2). The optically anisotropic molecules (e.g., optically anisotropic molecules 1110-3) are stabilized by the polymer.

In some embodiments, the method (e.g., method 2000) further includes detecting whether the display device (e.g., display device 1100) is running an augmented reality application. In response to detecting that the display device is running an augmented reality application, operating the display device by alternating between the first mode and the second mode. In response to detecting that the display device is not running an augmented reality application, operating the display device in the first mode.

In accordance with some embodiments, a display device (e.g., display devices, such as display device 100, that include display assemblies 1200, 1202, 1300, and 1400) includes one or more projectors (e.g., one or more projectors 1210, 1222, 1312, 1412) configured to project image light (e.g., image light 1212, 1232, 1314, 1414, 432), and a display (e.g., display 1214, 1224, 1310, 1410, 410) having a first surface (e.g., surface 1214-1, 1224-1, 1310-1, 1410-1) and a second surface (e.g., surface 1214-2, 1224-2, 1310-2, 1410-2). The display is configured to receive the image light from the one or more projectors, output diffused image light (e.g., diffused image light 492, 1232-1D, 1232-2D, 1232-3D) from the first surface, receive ambient light (e.g., ambient light 490-1) at the second surface, and output the ambient light from the first surface. The display device also includes an optical assembly (e.g., optical assembly 1218, 1225, 1316, 1240, 412, 500-504, 600) that has a substrate (e.g., substrate 510, 610) having a substantially uniform thickness, a beam splitter (e.g., beam splitter 814, 916, 514, 514', 514", 514''') coupled to the substrate, and a reflector (e.g., reflector 818, 918, 512, 512', 512", 612) coupled to the substrate. The optical assembly is configured to receive the diffused image light and transmit a portion of the diffused image light output from the first surface of the display at a first optical power via an optical path including reflections at the reflector and at the beam splitter. The optical assembly is also configured to receive the ambient light and transmit a portion of the ambient light through the optical assembly at a second optical power without reflection at the reflector. The second optical power is less than the first optical power.

In some embodiments, the optical assembly is configured to transmit the diffused image light (e.g., diffused image light 492, 1232-1D, 1232-2D, 1232-3D) with a first non-zero optical power and to transmit the ambient light at a second optical power that is different from (e.g., less than) the first optical power. In some embodiments, the second optical power is zero.

In some embodiments, the display (e.g., display 1310) further includes a diffusive surface (e.g., diffusive surface 1310-3) located between the first surface (e.g., surface 1310-1) and the second surface (e.g., surface 1310-2) of the display. The display also includes a first display portion (e.g., first display portion 1310-4) that is located between the first surface of the display and the diffusive surface, and has a first refractive index. The display also includes a second display portion (e.g., second display portion 1310-5) that is located between the diffusive surface and the second surface, and has a second refractive index that is equal to the first refractive index. The diffusive surface is configured to diffuse the image light.

In some embodiments, the display (e.g., diffusive display 1214) is disposed at an image plane of the optical assembly (e.g., optical assembly 1218).

In some embodiments, the one or more projectors (e.g., one or more projectors 1210) are disposed at an off-axis position relative to an optical axis (e.g., optical axis 1216) of the display (e.g., diffusive display 1214).

In some embodiments, each projector of the one or more projectors (e.g., one or more projectors 1210) is smaller than 2 inches in any its dimensions.

In some embodiments, the one or more projectors (e.g., one or more projectors 1210) are located less than 2 inches from the display (e.g., diffusive display 1214).

In some embodiments, the display includes a waveguide (e.g., wedge waveguide 1410) and an optical diffuser (e.g., optical diffuser 1416) that is coupled to an output surface (e.g., output surface 1410-2) of the waveguide. At least a portion (e.g., output portion 1410-O) of the waveguide is disposed between the first surface and the second surface of the display. The one or more projectors (e.g., one or more projectors 1412) are configured to project the image light (e.g., image light 1414) onto the input surface (e.g., input surface 1410-1) of the waveguide. The waveguide is configured to receive the image light from the one or more projectors, propagate the image light via total internal reflection toward the optical diffuser, and output the image light from the output surface of the waveguide. The optical diffuser is configured to diffuse the image light in response to receiving the image light output from the waveguide.

In some embodiments, the first surface forms an acute angle with respect to the second surface (e.g., output surface 1410-2 and surface 1410-3 form an acute angle with respect to one another).

In some embodiments, the display (e.g., nanoparticle display 1224) includes a plurality of nanoparticles (e.g., nanoparticles 1228) that is located between the first surface and the second surface of the display. The plurality of nanoparticles are configured to scatter (e.g., diffusely scatter) the image light (e.g., image light 1232) from the one or more projectors such that the diffused image light is output from the first surface of the display. In some embodiments, the nanoparticles are embedded in a transparent material (e.g., transparent material 1226).

In some embodiments, the one or more projectors (e.g., one or more projectors 1222) includes a first projector (e.g., projector 1222-1) configured to emit first image light (e.g., image light 1232-1) having a first wavelength. The plurality of nanoparticles (e.g., nanoparticles 1228) includes nanoparticles (e.g., nanoparticles 1228-1) having a first size. The nanoparticles having the first size are configured to scatter (e.g., diffusely scatter) the first image light that is incident upon the first surface (e.g., surface 1224-1) of the display (e.g., display 1224) such that diffused first image light (e.g., diffused light 1232-1D) is output from the first surface of the display.

In some embodiments, the one or more projectors (e.g., one or more projectors 1222) includes a second projector (e.g., projector 1222-2) that is distinct from the first projector. The one or more projectors are configured to output second image light (e.g., image light 1232-2) having a second wavelength that is distinct from the first wavelength. The plurality of nanoparticles (e.g., nanoparticles 1228) includes nanoparticles (e.g., nanoparticles 1228-2) having a second size. The nanoparticles having the second size are configured to scatter the second image light incident upon the first surface (e.g., surface 1224-1) of the display (e.g., display 1224) such that diffused second image light (e.g., diffused light 1232-2D) is output from the first surface of the display. The nanoparticles having the second size are transparent to the first image light, and the nanoparticles having the first size are transparent to the second image light.

In some embodiments, the first image light and the second image light (e.g., image light 1232-1 and 1232-2) are visible light, and the nanoparticles (e.g., nanoparticles 1228, 1228-1, 1228-2) are configured to be transparent to infrared light.

In some embodiments, the nanoparticles (e.g., nanoparticles 1228, 1228-1, 1228-2, 1228-3) are configured to scatter image light within a spectral bandwidth that is less than or equal to 40 nanometers.

In some embodiments, the nanoparticles (e.g., nanoparticles 1228, 1228-1, 1228-2, 1228-3) are configured to transmit ambient light (e.g., ambient light 490-1) such that less than 8% of the ambient light is scattered by the nanoparticles.

In accordance with some embodiments, a method of displaying one or more images includes projecting image light from one or more projectors; receiving, at a display, the image light projected from the one or more projectors; diffusing the image light at the display; and outputting diffused image light from a first surface of the display. The method also includes receiving ambient light at a second surface of the display and outputting ambient light from the first surface of the display. The second surface is opposite to the first surface. The method further includes receiving, at an optical assembly, any of the image light and the ambient light, transmitting the image light in a first optical path that includes one or more folds, and transmitting the ambient light in a second optical path that is different from the first optical path.

In some embodiments, the display includes a diffusive surface located between the first surface and the second surface; a first display portion located between the first surface and the diffusive surface and having a first refractive index; and a second display portion located between the diffusive surface and the second surface and having a second refractive index equal to the first refractive index. In such cases, diffusing the image light at the display includes diffusing the image light at the diffusive surface.

In some embodiments, the one or more projectors are disposed at an off-axis position relative to an optical axis of the display, and the one or more projectors are located less than 2 inches from the display.

In some embodiments, the display includes a waveguide and an optical diffuser coupled to an output surface of the waveguide. At least a portion of the waveguide is disposed between the first surface and the second surface of the display. In some embodiments, the method further includes receiving, at an input surface of the waveguide, image light from the one or more projectors; propagating the image light via total internal reflection toward the optical diffuser; and outputting the image light from the output surface of the waveguide. In such cases, projecting the image light from the one or more projectors includes projecting the image light onto the input surface of the waveguide and diffusing the image light at the display includes diffusing the image light at the optical diffuser in response to receiving the image light output from the waveguide.

In some embodiments, the display includes a plurality of nanoparticles that are located between the first surface and the second surface of the display. In such cases, diffusing the image light at the display includes scattering, by the plurality of nanoparticles, the image light from the one or more projectors.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device comprising:
   one or more projectors configured to project image light;
   a display element having a first surface and a second surface opposite to the first surface, the display element being configured to:
      receive the image light from the one or more projectors;
      diffuse the image light by scattering the image light and output the diffused image light from the first surface; and
      receive ambient light at the second surface, and output the ambient light from the first surface; and
   an optical assembly comprising:
      a substrate having a substantially uniform thickness;
      a beam splitter coupled to the substrate; and
      a reflector coupled to the substrate, wherein the optical assembly is configured to:
         receive the diffused image light and transmit a portion of the diffused image light output from the first surface of the display element at a first optical power via an optical path including reflections at the reflector and at the beam splitter; and
         receive the ambient light and transmit a portion of the ambient light through the optical assembly at a second optical power without reflection at the reflector, the second optical power being different from the first optical power,
   wherein:
      the display element includes a waveguide and an optical diffuser coupled to an output surface of the waveguide, and at least a portion of the waveguide is disposed between the first surface and the second surface;
      the one or more projectors are configured to project light onto an input surface of the waveguide;
      the waveguide is configured to:
         receive the image light from the one or more projectors;
         propagate the image light via total internal reflection toward the optical diffuser; and
         output the image light from the output surface of the waveguide; and
      the optical diffuser is configured to diffuse the image light in response to receiving the image light output from the waveguide.

2. The display device of claim 1, wherein the optical assembly is configured to:
   transmit the diffused image light with a first optical power; and
   transmit the ambient light at a second optical power that is less than the first optical power.

3. The display device of claim 1, wherein the first surface forms an angle with respect to the second surface.

4. The display device of claim 1, wherein:
   the display element includes a plurality of nanoparticles between the first surface and the second surface; and
   the plurality of nanoparticles are configured to scatter the image light from the one or more projectors such that the diffused image light is output from the first surface of the display element.

5. The display device of claim 4, wherein:
the one or more projectors includes a first projector configured to emit first image light having a first wavelength;
the plurality of nanoparticles includes nanoparticles having a first size; and
the nanoparticles having the first size are configured to scatter the first image light that is incident upon the first surface such that diffused first image light is output from the first surface of the display element.

6. The display device of claim 5, wherein:
the one or more projectors includes a second projector, distinct from the first projector, that is configured to output second image light having a second wavelength;
the second wavelength is distinct from the first wavelength;
the plurality of nanoparticles includes nanoparticles having a second size;
the nanoparticles having the second size are configured to scatter the second image light incident upon the first surface of the display element such that diffused second image light is output from the first surface of the display element;
the nanoparticles having the second size are transparent to the first image light; and
the nanoparticles having the first size are transparent to the second image light.

7. The display device of claim 6, wherein:
the first image light and the second image light are visible light; and
the nanoparticles are configured to be transparent to infrared light.

8. The display device of claim 4, wherein the nanoparticles are configured to scatter image light within a spectral bandwidth that is less than or equal to 40 nanometers.

9. The display device of claim 8, wherein the nanoparticles are configured to transmit ambient light such that less than 8% of the ambient light is scattered by the nanoparticles.

10. A display device comprising:
one or more projectors configured to project image light;
a display element comprising:
a first surface;
a second surface opposite to the first surface;
a diffusive surface located between the first surface and the second surface;
a first display element portion, between the first surface and the diffusive surface, having a first refractive index; and
a second display element portion, between the diffusive surface and the second surface, having a second refractive index equal to the first refractive index, wherein the diffusive surface configured to diffuse the image light, wherein the display element is configured to:
receive the image light from the one or more projectors;
diffuse the image light by scattering the image light at the diffusive surface and output the diffused image light from the first surface; and
receive ambient light at the second surface and output the ambient light from the first surface; and
an optical assembly comprising:
a substrate having a substantially uniform thickness;
a beam splitter coupled to the substrate; and
a reflector coupled to the substrate, wherein the optical assembly is configured to:
receive the diffused image light and transmit a portion of the diffused image light output from the first surface of the display element at a first optical power via an optical path including reflections at the reflector and at the beam splitter; and
receive the ambient light and transmit a portion of the ambient light through the optical assembly at a second optical power without reflection at the reflector, the second optical power being different from the first optical power.

11. The display device of claim 10, wherein the display element is disposed at an image plane of the optical assembly.

12. The display device of claim 11, wherein the one or more projectors are disposed at an off-axis position relative to an optical axis of the display element.

13. The display device of claim 12, wherein each projector of the one or more projectors is smaller than 2 inches in any its dimensions.

14. The display device of claim 12, wherein the one or more projectors are located less than 2 inches from the display element.

15. A method of displaying one or more images, the method comprising:
projecting image light from one or more projectors;
receiving, at a display element, the image light projected from the one or more projectors;
diffusing the image light by scattering the image light at the display element;
outputting diffused image light from a first surface of the display element;
receiving ambient light at a second surface of the display element, the second surface being opposite to the first surface;
outputting ambient light from the first surface of the display element;
receiving, at an optical assembly, any of the image light and the ambient light;
transmitting the image light in a first optical path that includes one or more folds; and
transmitting the ambient light in a second optical path that is different from the first optical path, wherein:
the display element includes:
a diffusive surface located between the first surface and the second surface:
a first display element portion, between the first surface and the diffusive surface, having a first refractive index; and
a second display element portion, between the diffusive surface and the second surface, having a second refractive index equal to the first refractive index; and
diffusing the image light at the display element includes diffusing the image light at the diffusive surface.

16. The method of claim 15, wherein:
the one or more projectors are disposed at an off-axis position relative to an optical axis of the display element; and
the one or more projectors are located less than 2 inches from the display element.

17. The method of claim 15, wherein the display element includes a waveguide and an optical diffuser coupled to an output surface of the waveguide, and at least a portion of the waveguide is disposed between the first surface and the second surface, the method further comprising:
receiving, at an input surface of the waveguide, image light from the one or more projectors;

propagating the image light via total internal reflection toward the optical diffuser; and outputting the image light from the output surface of the waveguide, wherein projecting the image light from the one or more projectors includes projecting the image light onto the input surface of the display element; and diffusing the image light at the display element includes diffusing the image light, at the optical diffuser, in response to receiving the image light output from the waveguide.

18. The method of claim 15, wherein:

the display element includes a plurality of nanoparticles between the first surface and the second surface; and diffusing the image light at the display element includes scattering, by the plurality of nanoparticles, the image light from the one or more projectors.

* * * * *